United States Patent
Park et al.

(10) Patent No.: US 12,289,445 B2
(45) Date of Patent: *Apr. 29, 2025

(54) VIDEO OR IMAGE CODING FOR INDUCING WEIGHT INDEX INFORMATION FOR BI-PREDICTION

(71) Applicant: LG Electronics Inc., Seoul (KR)

(72) Inventors: Naeri Park, Seoul (KR); Junghak Nam, Seoul (KR); Hyeongmoon Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/530,724

(22) Filed: Dec. 6, 2023

(65) Prior Publication Data

US 2024/0121382 A1    Apr. 11, 2024

Related U.S. Application Data

(63) Continuation of application No. 18/100,267, filed on Jan. 23, 2023, now Pat. No. 11,876,960, which is a continuation of application No. 17/472,101, filed on Sep. 10, 2021, now Pat. No. 11,595,640, which is a continuation of application No. PCT/KR2020/003323, filed on Mar. 10, 2020.

(60) Provisional application No. 62/817,513, filed on Mar. 12, 2019.

(51) Int. Cl.
| | | |
|---|---|---|
| H04N 19/105 | (2014.01) | |
| H04N 19/132 | (2014.01) | |
| H04N 19/137 | (2014.01) | |
| H04N 19/159 | (2014.01) | |
| H04N 19/176 | (2014.01) | |

(52) U.S. Cl.
CPC ......... H04N 19/105 (2014.11); H04N 19/132 (2014.11); H04N 19/137 (2014.11); H04N 19/159 (2014.11); H04N 19/176 (2014.11)

(58) Field of Classification Search
CPC .. H04N 19/105; H04N 19/132; H04N 19/137; H04N 19/159; H04N 19/176
See application file for complete search history.

(56) References Cited

U.S. PATENT DOCUMENTS

| | | | |
|---|---|---|---|
| 2020/0244978 A1* | 7/2020 | Li | H04N 19/52 |
| 2020/0296415 A1* | 9/2020 | Chen | H04N 19/577 |
| 2021/0274208 A1* | 9/2021 | Zhang | H04N 19/139 |

* cited by examiner

*Primary Examiner* — Hesham K Abouzahra
(74) *Attorney, Agent, or Firm* — Fish & Richardson P.C.

(57) ABSTRACT

According to the disclosure of the present document, when the inter prediction type of a current block indicates biprediction, weight index information for candidates in a merge candidate list or a sub-block merge candidate list can be induced or derived, and coding efficiency can be increased.

9 Claims, 15 Drawing Sheets

VIDEO OR IMAGE CODING FOR INDUCING WEIGHT INDEX INFORMATION FOR BI-PREDICTION

CROSS-REFERENCE TO RELATED APPLICATIONS

This application is a continuation of U.S. application Ser. No. 18/100,267, filed on Jan. 23, 2023, which is a continuation of U.S. application Ser. No. 17/472,101, filed on Sep. 10, 2021, now U.S. Pat. No. 11,595,640, which is a continuation pursuant to 35 U.S.C. § 119(e) of International Application PCT/KR2020/003323, with an international filing date of Mar. 10, 2020, which claims the benefit of U.S. Provisional Patent Application No. 62/817,513, filed on Mar. 12, 2019, the contents of which are hereby incorporated by reference herein in their entirety.

BACKGROUND OF THE DISCLOSURE

Field of the Disclosure

The present technology relates to video or image coding for deriving weight index information for bi-prediction.

Related Art

Recently, the demand for high resolution, high quality image/video such as 4K or 8K Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

According to an embodiment of this document, a method and apparatus for improving image/video coding efficiency are provided.

According to an embodiment of this document, a method and apparatus using bi-prediction based on a weight upon image coding are provided.

According to an embodiment of this document, method and apparatus for deriving weight index information for bi-prediction in inter prediction are provided.

According to an embodiment of this document, a method and apparatus for deriving weight index information for a candidate within a merge candidate list or an affine merge candidate list upon bi-prediction are provided.

According to an embodiment of this document, a video/image decoding method performed by a decoding apparatus is provided.

According to an embodiment of this document, a decoding apparatus performing video/image decoding is provided.

According to an embodiment of this document, a video/image encoding method performed by an encoding apparatus is provided.

According to an embodiment of this document, an encoding apparatus performing video/image performs encoding is provided.

According to an embodiment of this document, there is provided a computer-readable digital storage medium in which encoded video/image information generated according to a video/image encoding method disclosed in at least one of embodiments of this document has been stored.

According to an embodiment of this document, there is provided a computer-readable digital storage medium in which encoded information or encoded video/image information causing the decoding apparatus to perform a video/image decoding method disclosed in at least one of embodiments of this document has been stored.

According to an embodiment of this document, overall image/video compression efficiency can be improved.

According to an embodiment of this document, upon inter prediction, a motion vector candidate can be efficiently constructed.

According to an embodiment of this document, weight-based bi-prediction can be efficiently performed.

DESCRIPTION OF EXEMPLARY EMBODIMENTS

Figure 1:
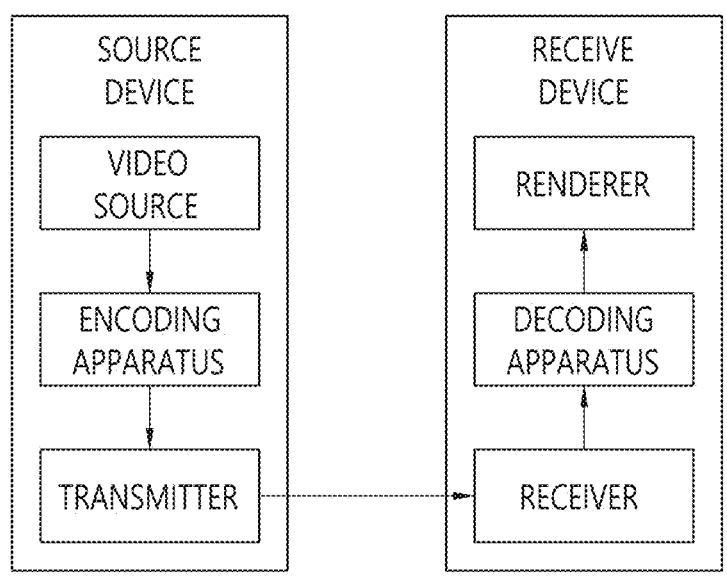
FIG. 1 schematically illustrates an example of a video/image coding system to which an embodiment of this document may be applied.

A disclosure of this document may be modified in various ways and may have various embodiments, and specific embodiments will be illustrated in the drawings and described in detail. However, it is not intended to limit the present disclosure to the specific embodiments. Terms commonly used in this document are used to describe a specific embodiment and is not used to limit the technical spirit of this document. An expression of the singular number includes plural expressions unless evidently expressed otherwise in the context. A term, such as "include" or "have" in this document, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in this document are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of this document unless it deviates from the essence of this document.

Hereinafter, preferred embodiments of this document are described more specifically with reference to the accompanying drawings. Hereinafter, in the drawings, the same reference numeral is used in the same element, and a redundant description of the same element may be omitted.

FIG. 1 is schematically illustrating a video/image coding system to which embodiments of the present document may be applied.

Referring to FIG. 1, a video/image coding system may include a first apparatus (a source device) and a second apparatus (a receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, a method/embodiment disclosed in this document may be applied to a method disclosed in the versatile video coding (VVC) standard. Furthermore, the method/embodiment disclosed in this document may be applied to methods disclosed in the essential video coding (EVC) standard, the AOMedia Video 1 (AV1) standard, the $2^{nd}$ generation of audio video coding standard (AVS2) or the next-generation video/image coding standard (e.g., H.267 or H.).

In this document, various embodiments about video/image coding are presented. The embodiments may be combined and performed unless described otherwise.

In this document, video may mean a set of a series of image over time. In general, a picture means a unit indicating one image in a specific time zone. A slice/tile is a unit that constitutes some of a picture in coding. A slice/tile may include one or more coding tree units (CTUs). One picture may consist of one or more slices/tiles. A tile is a rectangular region of CTUs within a particular tile column and a particular tile row in a picture. The tile column is a rectangular region of CTUs having the same height as a picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of complete tiles or an integer number of consecutive complete CTU rows within a tile of a picture that may be exclusively contained in a single NAL unit.

Meanwhile, one picture may be divided into two or more subpictures. The subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (e.g., Cb, Cr) blocks. The unit may be used interchangeably with terms such as block or area in some cases. In a general case, an M×N block may include samples (or sample arrays) or a set (or array) of transform coefficients of M columns and N rows.

In this document, "A or B" may mean both "only A", "only B" or "both A and B." In other words, in this document, "A or B" may be interpreted as "A and/or B." For example, in this document, "A, B or C" may mean "only A", "only B", "only C", or "any combination of A, B and C."

A slash "/" or a comma used in this document may mean "and/or." For example, "A/B" may mean "A and/or B." Accordingly, "A/B" may mean "only A", "only B", or "both A and B." For example, "A, B, C" may mean "A, B or C."

In this document, "at least one of A and B" may mean "only A", "only B" or "both A and B." Furthermore, in this document, an expression, such as "at least one of A or B" or "at least one of A and/or B", may be interpreted identically with "at least one of A and B."

Furthermore, in this document, "at least one of A, B and C" may mean "only A", "only B", "only C", or "any combination of A, B and C." Furthermore, "at least one of A, B or C" or "at least one of A, B and/or C" may mean "at least one of A, B and C."

Furthermore, parentheses used in this document may mean "for example." Specifically, if "prediction (intra prediction)" is indicated, it may mean that "intra prediction" may have been suggested as an example of "prediction." In other words in this document, "prediction" is not limited to "intra prediction", and "intra prediction" may be proposed as an example of "prediction." Furthermore, if "prediction (i.e., intra prediction)" is indicated, "intra prediction" may have been suggested as an example of "prediction."

In this document, a technical characteristic individually described within one drawing may be individually implemented or may be simultaneously implemented.

Figure 2:
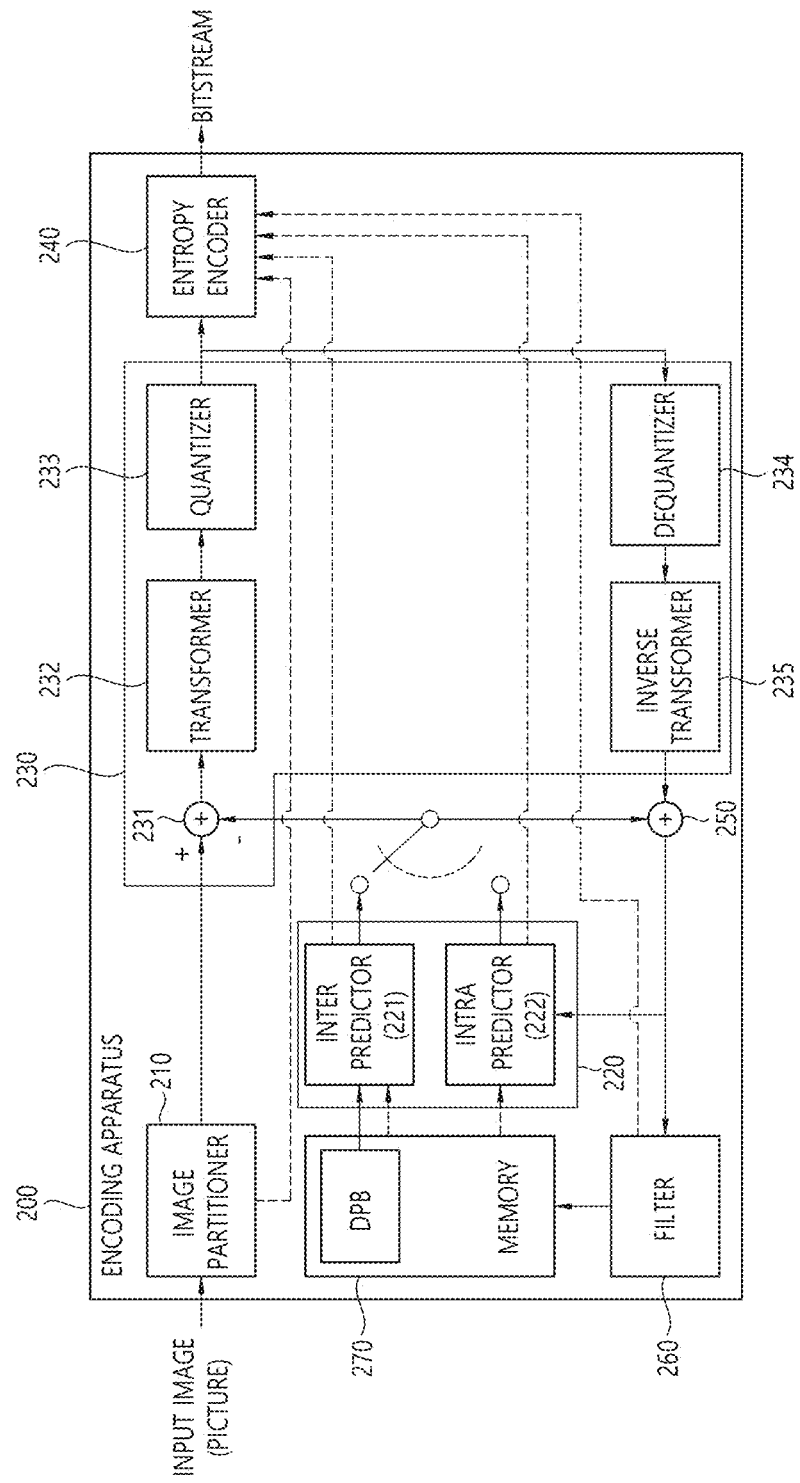
FIG. 2 is a diagram schematically describing a construction of a video/image encoding apparatus to which an embodiment of this document may be applied.

FIG. 2 is a diagram schematically describing a construction of a video/image encoding apparatus to which an embodiment of this document may be applied.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various kinds of information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

A prediction signal generated through the predictor (including the inter predictor 221 and/or the intra predictor 222) may be used to generated a reconstruction signal or may be used to generate a residual signal. The transformer 232 may generate transform coefficients by applying a transform scheme to a residual signal. For example, the transform scheme may include at least one of a discrete cosine transform (DCT), a discrete sine transform (DST), a graph-based transform (GBT), or a conditionally non-linear transform (CNT). In this case, the GBT means a transform obtained from a graph when relation information between pixels is represented as the graph. The CNT means a transform obtained based on a prediction signal after the prediction signal is generated using all previously reconstructed pixels. Furthermore, a transform process may be applied to a pixel block, which is a square and has the same size, and may be applied to a block which is not a square and has a variable size.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. Encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various kinds of information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
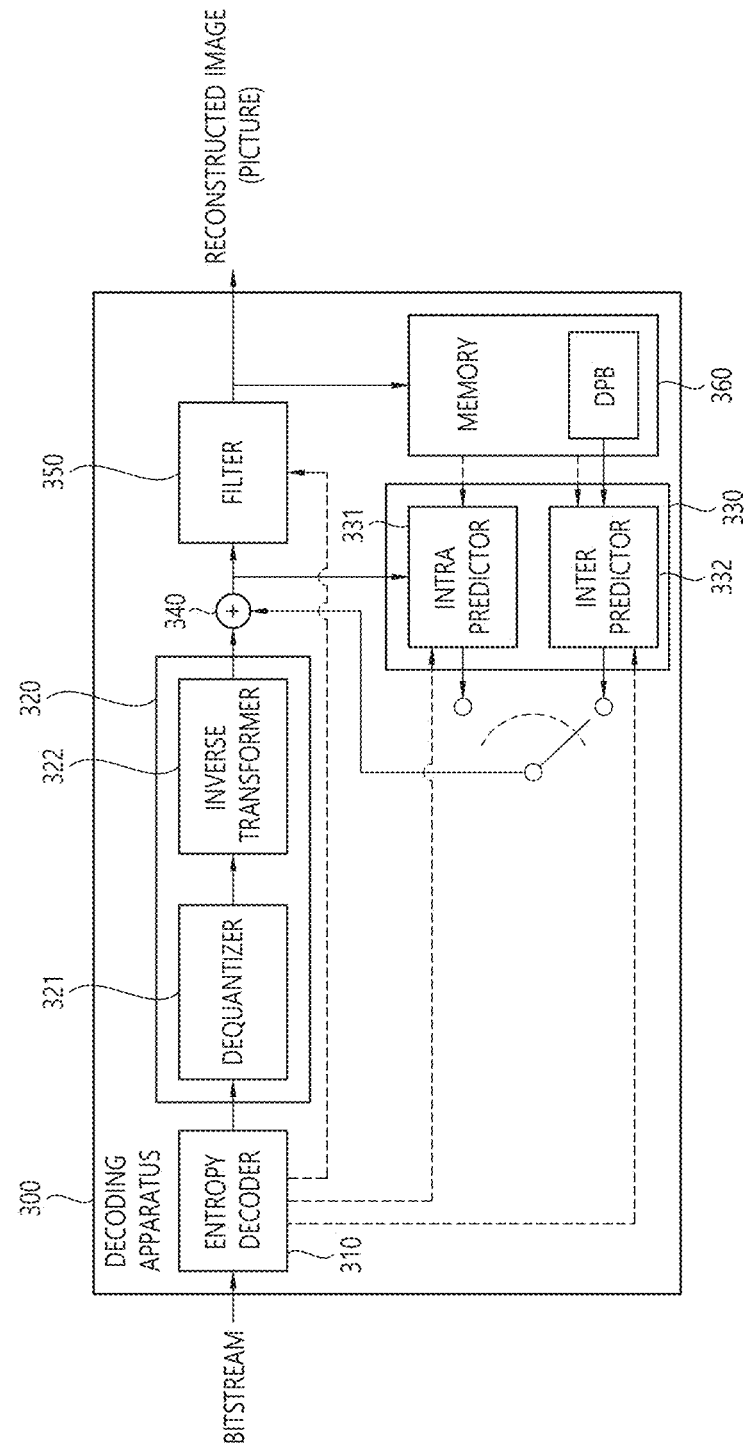
FIG. 3 is a diagram schematically describing a construction of a video/image decoding apparatus to which an embodiment of this document may be applied.

FIG. 3 is a diagram schematically describing a construction of a video/image decoding apparatus to which an embodiment of this document may be applied. Hereinafter, the decoding apparatus may include an image decoding apparatus and/or a video decoding apparatus.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block. The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present document, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

When inter prediction is applied, the predictor of the encoding apparatus/decoding apparatus may derive a prediction sample by performing inter prediction in a block unit. The inter prediction can be a prediction derived in a manner that is dependent on data elements (e.g., sample values or motion information) of picture(s) other than the current picture). When inter prediction is applied to a current block, a predicted block (prediction sample array) for the current block may be derived based on a reference block (reference sample array) specified by a motion vector in a reference picture indicated by a reference picture index. In this case, in order to reduce the amount of motion information transmitted in the inter prediction mode, motion information of the current block may be predicted based in a block, sub-block or a sample unit based on a correlation of motion information between a neighboring block and the current block. The motion information may include a motion vector and a reference picture index. The motion information may further include inter prediction type (L0 prediction, L1 prediction, Bi prediction, etc.) information. When inter prediction is applied, a neighboring block may include a spatial neighboring block present within a current picture and a temporal neighboring block present within a reference picture. The reference picture including the reference block and the reference picture including the temporal neighboring block may be the same or different. The temporal neighboring block may be called a collocated reference block, a colCU (CU), etc. The reference picture including the temporal neighboring block may be called a collocated picture (colPic). For example, a motion information candidate list may be constructed based on neighboring blocks of a current block. In order to derive a motion vector and/or reference picture index of a current block, a flag or index information indicating which candidate is selected (used) may be signaled. Inter prediction may be performed based on various prediction modes. For example, in the case of a skip mode and a merge mode, motion information of a current block may be the same as motion information of a selected neighboring block. In the case of the skip mode, unlike in the merge mode, a residual signal may not be transmitted. In the case of a motion vector prediction (MVP) mode, a motion vector of a selected neighboring block may be used as a motion vector predictor, and a motion vector difference may be signaled. In this case, a motion vector of a current block may be derived using the sum of the motion vector predictor and the motion vector difference.

The motion information may include L0 motion information and/or L1 motion information depending on an inter prediction type (L0 prediction, L1 prediction, Bi prediction, etc.). A motion vector in an L0 direction may be called an L0 motion vector or MVL0. A motion vector in an L1 direction may be called an L1 motion vector or MVL1. Prediction based on the L0 motion vector may be called L0 prediction. Prediction based on the L1 motion vector may be called L1 prediction. Prediction based on both the L0 motion vector and the L1 motion vector may be called bi-prediction. In this case, the L0 motion vector may indicate a motion vector associated with a reference picture list L0 (L0). The L1 motion vector may indicate a motion vector associated with a reference picture list L1 (L1). The reference picture list L0 may include, as reference pictures, pictures before a current picture in their output order. The reference picture list L1 may include pictures after the current picture in their output order. The previous pictures may be called a forward (reference) picture. The subsequent pictures may be called a backward (reference) picture. The reference picture list L0 may further include, as reference pictures, pictures after a current picture in their output order. In this case, the previous pictures may be first indexed within the reference picture list L0, and the subsequent pictures may be then indexed. The reference picture list L1 may further include, as reference pictures, pictures prior to a current picture in their output order. In this case, the subsequent pictures may be first indexed within the reference picture list1, and the previous pictures may be then indexed. In this case, the output order may correspond to a picture order count (POC) order.

In order to predict a current block within a picture, various inter prediction modes may be used. For example, various modes, such as a merge mode, a skip mode, a motion vector prediction (MVP) mode, an affine mode, a sub-block merge mode, a merge with MVD (MMVD) mode, etc. may be used. A decoder side motion vector refinement (DMVR) mode, an adaptive motion vector resolution (AMVR) mode, a Bi-prediction with CU-level weight (BCW), a bi-directional optical flow (BDOF), etc. may be further or instead used as additional modes. The affine mode may be called an affine motion prediction mode. The MVP mode may be called an advanced motion vector prediction (AMVP) mode. In this document, some mode and/or a motion information candidate derived by some mode may be also included as one of motion information-related candidates of another mode. For example, the HMVP candidate may be added as a merge candidate of the merge/skip mode or may be added as an mvp candidate of the MVP mode. When the HMVP candidate is used as a motion information candidate of the merge mode or the skip mode, the HMVP candidate may be called an HMVP merge candidate.

Prediction mode information indicating an inter prediction mode of a current block may be signaled from the encoding apparatus to the decoding apparatus. The prediction mode information may be included in a bitstream and received by the decoding apparatus. The prediction mode information may include index information indicating one of multiple candidate modes. Alternatively, an inter prediction mode may be indicated through hierarchical signaling of flag information. In this case, the prediction mode information may include one or more flags. For example, whether the skip mode is applied may be indicated by signaling a skip flag. When the skip mode is not applied, whether the merge mode is applied may be indicated by signaling a merge flag. When the merge mode is not applied, a flag for indicating or additionally identifying that the MVP mode is applied may be further signaled. The affine mode may be signaled as an independent mode or may be signaled as a mode dependent on the merge mode, the MVP mode, etc. For example, the affine mode may include an affine merge mode and an affine MVP mode.

Meanwhile, information indicating whether the aforementioned list0 (L0) prediction, list1 (L1) prediction, or bi-prediction is used in a current block (current coding unit) may be signaled. The information may be called motion prediction direction information, inter prediction direction information or inter prediction indication information, and may be constructed/encoded/signaled in the form of an inter_pred_idc syntax element, for example. That is, the inter_pred_idc syntax element may indicate whether the aforementioned L0 prediction, L1 prediction, or the bi-prediction is used in a current block (current coding unit). In this document, for convenience of description, an inter prediction type (L0 prediction, L1 prediction, or BI prediction) indicated by the inter_pred_idc syntax element may be indicated as a motion prediction direction. For example, the L0 prediction may be indicated as pred_L0, the L1 prediction may be indicated as pred_L1, and the bi-prediction may be indicated as pred_BI.

As described above, one picture may include one or more slices. A slice may have one of slice types, including an intra slice (I slice), a predictive slice (P slice) and a bi-predictive slice (B slice). The slice type may be indicated based on slice type information. With respect to blocks within the I slice, inter prediction is not used for prediction, and only intra prediction may be used. Even in this case, signaling may be performed by coding the original sample value without prediction. Intra prediction or inter prediction may be used for blocks within the P slice. When inter prediction is used, only uni prediction may be used. Meanwhile, intra prediction or inter prediction may be used for blocks within the B slice. When inter prediction is used, up maximum bi-prediction may be used. That is, if inter prediction is used for blocks within the B slice, single prediction or bi-prediction may be used.

L0 and L1 may include reference pictures encoded/decoded prior to a current picture. In this case, L0 may indicate a reference picture list 0, and L1 may indicate a reference picture list 1. For example, L0 may include reference pictures prior to and/or posterior to a current picture in a picture order count (POC) order. L1 may include reference pictures posterior to and/or prior to a current picture in the POC order. In this case, in L0, a relatively lower reference picture index may be assigned to previous reference pictures than to a current picture in the POC order. In L1, a relatively lower reference picture index may be assigned to subsequent reference pictures than to the current picture in the POC order. Bi-prediction may be applied to the B slice. Even in this case, unidirectional bi-prediction may be applied or bi-directional bi-prediction may be applied. The bi-directional bi-prediction may be called true bi-prediction.

Meanwhile, inter prediction may be performed using motion information of a current block. The encoding apparatus may derive the best motion information for a current block through a motion estimation procedure. For example, the encoding apparatus may search a predetermined search range within a reference picture for a similar reference block having a high correlation in a fraction pixel unit by using an original block within an original picture for a current block, and may derive motion information based on the similar reference block. The similarity of a block may be derived based on a difference between phase-based sample values. For example, the similarity of a block may be calculated based on the sum of absolute differences (SAD) between a current block (or a template of a current block) and a reference block (or a template of a reference block). In this case, motion information may be derived based on a reference block having the smallest SAD within the search region. The derived motion information may be signaled to the decoding apparatus according to several methods based on the inter prediction mode.

Figure 4:
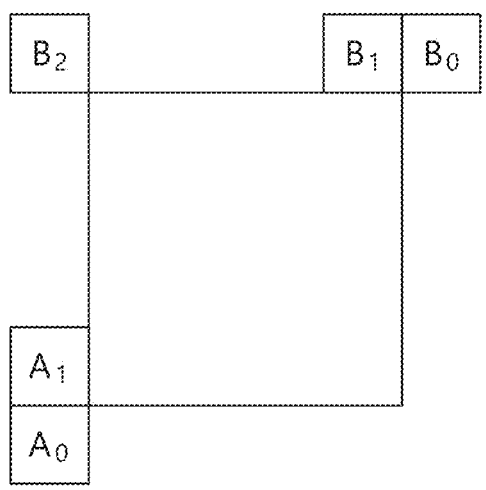
FIG. 4 is a diagram for describing a merge mode in inter prediction.

FIG. 4 is a diagram for describing a merge mode in inter prediction.

When the merge mode is applied, motion information of a current prediction block is not directly transmitted, and motion information of the current prediction block is derived using motion information of a neighboring prediction block. Accordingly, motion information of the current prediction block may be indicated by transmitting flag information providing notification that the merge mode has been used and a merge index providing notification of whether which neighboring prediction block has been used. The merge mode may be called a regular merge mode. For example, the merge mode may be applied when a value of a regular_merge_flag syntax element is 1.

The encoding apparatus needs to search for a merge candidate block used to derive motion information of a current prediction block in order to perform the merge mode. For example, a maximum of five merge candidate blocks may be used, but an embodiment(s) of this document is not limited thereto. Furthermore, a maximum number of merge candidate blocks may be transmitted in a slice header or a tile group header, but an embodiment(s) of this document is not limited thereto. After searching for the merge candidate blocks, the encoding apparatus may generate a merge candidate list, and may select, as the final merge candidate block, a merge candidate block having the smallest cost in the merge candidate list.

This document may provide various embodiments of a merge candidate block constituting a merge candidate list.

For example, the merge candidate list may use five merge candidate blocks. For example, the merge candidate list may use four spatial merge candidates and one temporal merge candidate. As a detailed example, in the case of a spatial merge candidate, blocks illustrated in FIG. 4 may be used as spatial merge candidates. Hereinafter, the spatial merge candidate or a spatial MVP candidate to be described later may be called as an SMVP, and a temporal merge candidate or a temporal MVP candidate to be described later may be called a TMVP.

A merge candidate list for the current block may be constructed based on the following procedure, for example.

The coding apparatus (encoding apparatus/decoding apparatus) may search for spatial neighboring blocks of a current block and insert derived spatial merge candidates into a merge candidate list. For example, the spatial neighboring blocks may include a bottom-left corner neighboring block, a left neighboring block, a top-right corner neighboring block, a top neighboring block, and a top-left corner neighboring blocks of the current block. However, this is an example, in addition to the aforementioned spatial neighboring blocks, additional neighboring blocks, such as a right neighboring block, a bottom neighboring block, a bottom-right neighboring block, etc. may be further used as the spatial neighboring blocks. The coding apparatus may detect available blocks by searching for the spatial neighboring blocks based on priority, and may derive motion information of detected blocks as the spatial merge candidates. For example, the encoding apparatus or the decoding apparatus may sequentially search for five blocks illustrated in FIG. 4 like A1→B1→B0→A0→B2, and may construct available candidates as a merge candidate list by sequentially indexing the available candidates.

The coding apparatus may search for a temporal neighboring block of the current block, and may insert the derived temporal merge candidate into the merge candidate list. The temporal neighboring block may be located in a reference picture, that is, a picture different from a current picture in which the current block is located. The reference picture in which the temporal neighboring block is located may be called a collocated picture or a col picture. The temporal neighboring block may be searched for in order of a bottom-right corner neighboring block and bottom-right center block of a co-located block for the current block in the col picture. Meanwhile, when motion data compression is applied, specific motion information may be stored in the col picture as representative motion information for each given storage unit. In this case, it is not necessary to store motion information of all blocks within the given storage unit, so that a motion data compression effect can be obtained. In this case, the given storage unit may be previously determined as a 16×16 sample unit, an 8×8 sample unit, etc. or size information for the given storage unit may be signaled from the encoding apparatus to the decoding apparatus. If the motion data compression (motion data compression) is applied, motion information of the temporal neighboring block may be replaced with representative motion information of the given storage unit in which the temporal neighboring block is located. That is, in this case, from a viewpoint of an implementation, the temporal merge candidate may be derived based on motion information of a prediction block that covers a location that is arithmetically shifted to the right and then shifted to the left by a given value based on coordinates (top-left sample location) of the temporal neighboring block, not a prediction block located in the coordinates of the temporal neighboring block. For example, when the given storage unit is a 2n×2n sample unit, assuming that the coordinates of the temporal neighboring block is (xTnb, yTnb), motion information of a prediction block located in ((xTnb>>n)<<n), (yTnb>>n)<<n)), that is, a modified location, may be used for the temporal merge candidate. Specifically, for example, if the given storage unit is a 16×16 sample unit, assuming that coordinates of the temporal neighboring block are (xTnb, yTnb), motion information of a prediction block located in ((xTnb>>4)<<4), (yTnb>>4)<<4)), that is, a modified location, may be used for the temporal merge candidate. Alternatively, for example, if the given storage unit is an 8×8 sample unit, assuming that coordinates of the temporal neighboring block are (xTnb, yTnb), motion information of a prediction block located in ((xTnb>>3)<<3), (yTnb>>3)<<3)), that is, a modified location, may be used for the temporal merge candidate.

The coding apparatus may check whether the number of current merge candidates is smaller than a maximum number of merge candidates. The maximum number of merge candidates may be pre-defined or may be signaled from the encoding apparatus to the decoding apparatus. For example, the encoding apparatus may generate information on a maximum number of merge candidates, may encode the information, and may deliver the encoded information to the decoder in a bitstream form. When the maximum number of merge candidates is fully filled, a subsequent candidate addition process may not be performed.

If, as a result of the check, the number of current merge candidates is smaller than the maximum number of merge candidates, the coding apparatus may insert an additional merge candidate into the merge candidate list. For example, the additional merge candidate may include at least one of a history based merge candidate(s), a pair-wise average merge candidate(s), an ATMVP, a combined bi-predictive merge candidate (when a current slice/slice of a tile group/tile group type is a B type) and/or a zero vector merge candidate to be described later.

If, as a result of the check, the number of current merge candidates is not smaller than the maximum number of merge candidates, the coding apparatus may terminate the construction of the merge candidate list. In this case, the encoding apparatus may select the best merge candidate among merge candidates constituting the merge candidate list based on a rate-distortion (RD) cost, and may signal, to the decoding apparatus, selection information (e.g., merge index) indicating the selected merge candidate. The decoding apparatus may select the best merge candidate based on the merge candidate list and the selection information.

Motion information of the selected merge candidate may be used as motion information of the current block. As described above, prediction samples of the current block may be derived based on motion information of the current block. The encoding apparatus may derive residual samples of the current block based on the prediction samples, and may signal, to the decoding apparatus, the residual information about the residual samples. As described above, the decoding apparatus may generate reconstruction samples based on the residual samples derived based on the residual information and the prediction samples, and may generate a reconstruction picture based on the reconstruction samples.

When the skip mode is applied, motion information of a current block may be derived using the same method as that the merge mode is applied. However, when the skip mode is applied, a residual signal for a corresponding block may be omitted, so that prediction samples may be directly used as reconstruction samples. The skip mode may be applied when a value of a cu_skip_flag syntax element is 1, for example.

Meanwhile, the pair-wise average merge candidate may be called a pair-wise average candidate or a pair-wise candidate. The pair-wise average candidate(s) may be generated by averaging pairs of pre-defined candidates in the existing merge candidate list. Furthermore, the pre-defined pairs may be defined like {(0, 1), (0, 2), (1, 2), (0, 3), (1, 3), (2, 3)}. In this case, the numbers may indicate merge indices for a merge candidate list. An averaged motion vector may be separately calculated with respect to each reference list. For example, if two motion vectors are available within one list, the two motion vectors may be averaged although they indicate different reference pictures. For example, if only one motion vector is available, only the one motion vector may be directly used. For example, if an available motion vector is not present, a list may maintain an invalid state.

For example, even after pair-wise average merge candidates are added, if a merge candidate list is fully filled, that is, when the number of current merge candidates within the merge candidate list is smaller than a maximum number of merge candidates, a zero vector (zero MVP) may be inserted up to the final until a maximum merge candidate number appears. That is, a zero vector may be inserted until the number of current merge candidates within the merge candidate list becomes a maximum number of merge candidates.

Meanwhile, in a conventional technology, in order to represent a motion of a coding block, only one motion vector can be used. That is, a translation motion model may be used. However, such a method may represent the best motion in a block unit, but the best motion is actually not for each sample. If the best motion vector can be determined in a sample unit, coding efficiency can be improved. To this end, the affine motion model may be used. An affine motion prediction method for performing coding using the affine motion model may be as follows.

The affine motion prediction method may represent a motion vector in each sample unit of a block by using two, three or four motion vectors. For example, the affine motion model may represent four motions. An affine motion model that represents three motions (translation, scale, and rotate) among motions which may be represented by the affine motion model may be called a similarity (or simplified) affine motion model. A description will be given based on the affine motion model, but the present disclosure is not limited to the aforementioned motion model.

Figure 5A:
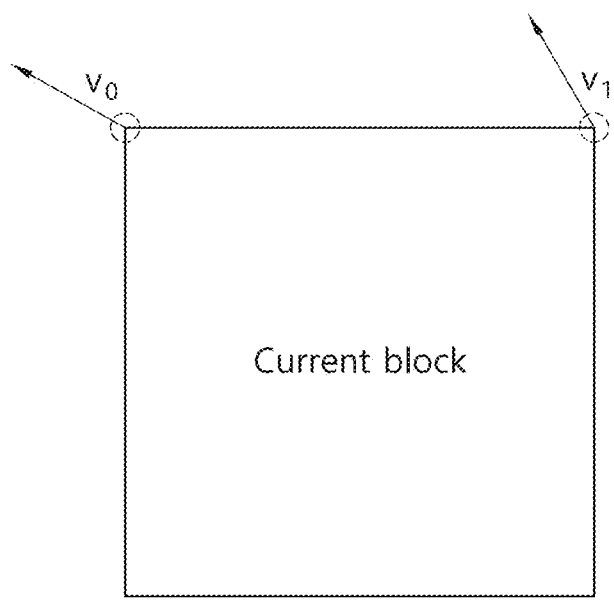
FIGS. 5a and 5b exemplarily illustrate a CPMV for affine motion prediction.
Figure 5B:
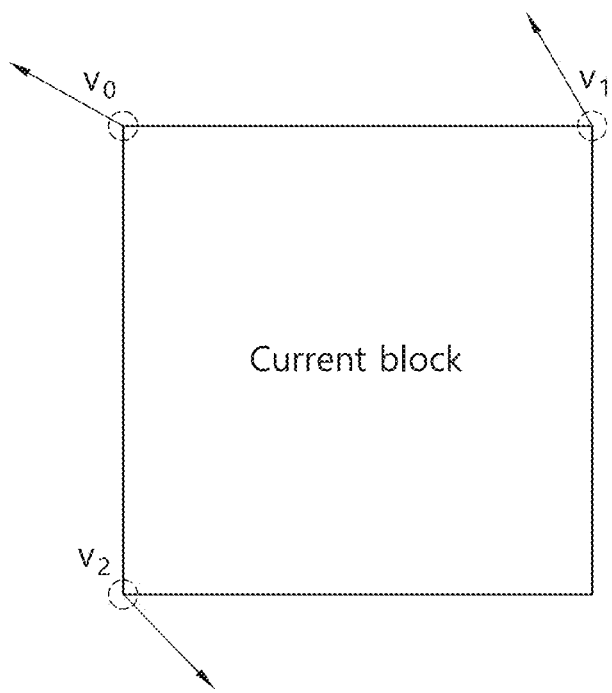

FIGS. 5a and 5b exemplarily illustrate a CPMV for affine motion prediction.

Affine motion prediction may determine a motion vector at the location of a sample included in a block by using two or more control point motion vectors (CPMVs). In this case, a set of motion vectors may be indicated as an affine motion vector field (MVF).

For example, FIG. 5a may indicate a case where two CPMVs are used, which may be called as a 4-parameter affine model. In this case, a motion vector at an (x, y) sample location may be determined as in Equation 1, for example.

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1x} - mv_{0x}}{W}y + mv_{0y} \end{cases} \quad \text{[Equation 1]}$$

For example, FIG. 5b may indicate a case where three CPMVs are used, and may be called a 6-parameter affine model. In this case, a motion vector at a (x, y) sample location may be determined as in Equation 2, for example.

$$\begin{cases} mv_x = \dfrac{mv_{1x} - mv_{0x}}{W}x + \dfrac{mv_{2x} - mv_{0x}}{W}y + mv_{0x} \\ mv_y = \dfrac{mv_{1y} - mv_{0y}}{W}x + \dfrac{mv_{2y} - mv_{0y}}{W}y + mv_{0y} \end{cases} \quad \text{[Equation 2]}$$

In Equations 1 and 2, $\{v_x, v_y\}$ may indicate motion vector at an (x, y) location. Furthermore, $\{v_{0x}, v_{0y}\}$ may indicate the CPMV of a control point (CP) at the top-left corner location of a coding block. $\{v_{1x}, v_{1y}\}$ may indicate the CPMV of a CP at a top-right corner location. $\{v_{2x}, v_{2y}\}$ may indicate the CPMV of a CP at a bottom-left corner location. Furthermore, W may indicate the width of a current block. H may indicate the height of the current block.

Figure 6:
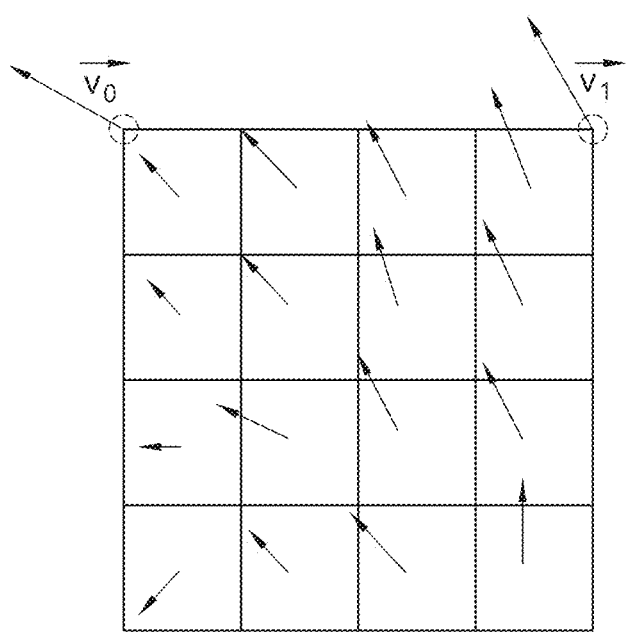
FIG. 6 exemplarily illustrates a case where an affine MVF is determined in a sub-block unit.

FIG. 6 exemplarily illustrates a case where an affine MVF is determined in a sub-block unit.

In an encoding/decoding process, an affine MVF may be determined in a sample unit or an already defined sub-block unit. For example, if the affine MVF is determined in the sample unit, a motion vector may be obtained based on each sample value. Alternatively, for example, if the affine MVF is determined in the sub-block unit, a motion vector of a corresponding block may be obtained based on the center (a center bottom-right, that is, a bottom-right sample of center four samples) sample value of a sub-block. That is, in affine motion prediction, a motion vector of a current block may be derived in a sample unit or in a sub-block unit.

In an embodiment, a case where an affine MVF is determined in a 4×4 sub-block unit may be assumed and described, but this is for convenience of description. The size of a sub-block may be variously changed.

That is, if affine prediction is available, a motion model which may be applied to a current block may include three types (a translation motion model, a 4-parameter affine motion model, and a 6-parameter affine motion model). In this case, the translation motion model may indicate a model in which the existing block unit motion vector is used. The 4-parameter affine motion model may indicate a model in which two CPMVs are used. The 6-parameter affine motion model may indicate a model in which three CPMVs are used.

Meanwhile, affine motion prediction may include an affine MVP (or affine inter) mode or an affine merge mode.

Figure 7:
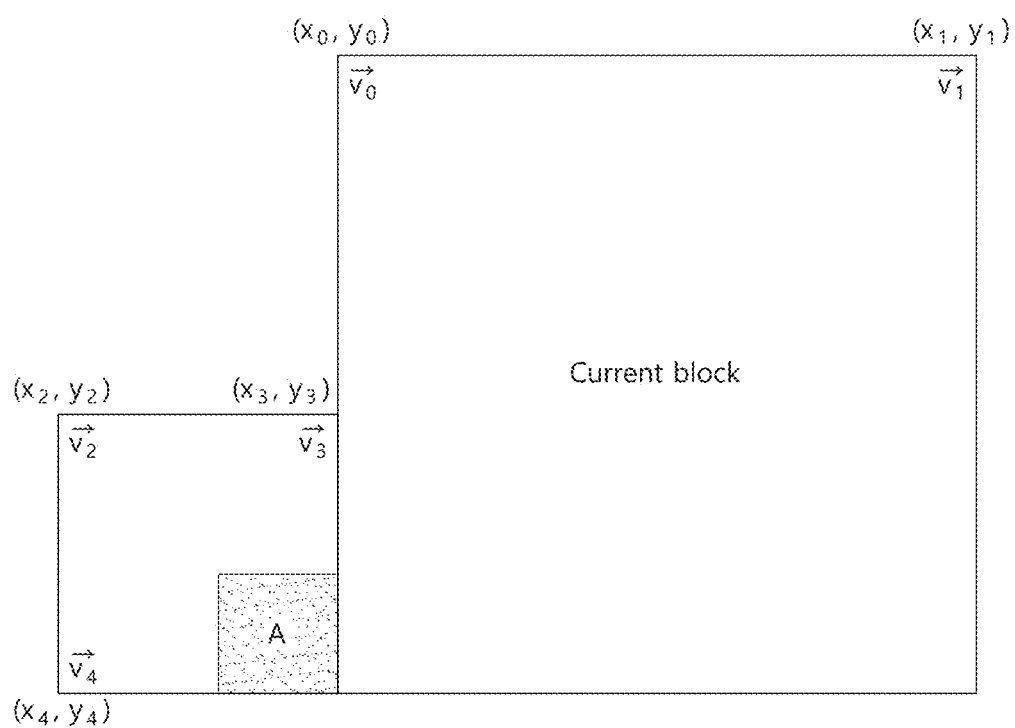
FIG. 7 is a diagram for describing an affine merge mode in inter prediction.

FIG. 7 is a diagram for describing the affine merge mode in inter prediction.

For example, in the affine merge mode, a CPMV may be determined based on an affine motion model of a neighboring block coded by affine motion prediction. For example, a neighboring block coded by affine motion prediction in the search order may be used for an affine merge mode. That is, if at least one of neighboring blocks is coded by affine motion prediction, a current block may be coded in the affine merge mode. In this case, the affine merge mode may be called AF_MERGE.

When the affine merge mode is applied, CPMVs of a current block may be derived using CPMVs of a neighboring block. In this case, the CPMVs of the neighboring block may be used as the CPMVs of the current block without any change, or the CPMVs of the neighboring block may be modified based on the size of the neighboring block, the size of the current block, etc. and may be used as the CPMVs of the current block.

Meanwhile, in the case of the affine merge mode in which a motion vector (MV) is derived in a sub-block unit, this may be called a sub-block merge mode. This may be indicated based on a sub-block merge flag (or merge_sub-block_flag syntax element). Alternatively, when a value of the merge_sub-block_flag syntax element is 1, it may indicate that the sub-block merge mode is applied. In this case, an affine merge candidate list to be described later may be called a sub-block merge candidate list. In this case, the sub-block merge candidate list may further include a candidate derived as an SbTMVP to be described later. In this case, the candidate derived as the SbTMVP may be used as a candidate having a No. 0 index in the sub-block merge candidate list. In other words, the candidate derived as the SbTMVP may be located ahead of an inherited affine candidate or a constructed affine candidate to be described in the sub-block merge candidate list.

When the affine merge mode is applied, an affine merge candidate list may be constructed in order to derive CPMVs of a current block. For example, the affine merge candidate list may include at least one of the following candidates. 1) an inherited affine merge candidate. 2) a constructed affine merge candidate. 3) a zero motion vector candidate (or a zero vector). In this case, when a neighboring block is coded in the affine mode 로, the inherited affine merge candidate is a candidate derived based on CPMVs of a neighboring block. The constructed affine merge candidate is a candidate derived by constructing CPMVs based on the MV of a neighboring block of a corresponding CP in each CPMV unit. The zero motion vector candidate may indicate a candidate consisting of CPMVs whose values are 0.

The affine merge candidate list may be constructed as follows, for example.

A maximum of two inherited affine candidates may be the same. An inherited affine candidate may be derived from an affine motion model of neighboring blocks. The neighboring blocks may include one left neighboring block and the above neighboring block. Candidate blocks may be located as in FIG. 4. A scan order for a left predictor may be A1→A0. A scan order for the above predictor may be B1→B0→B2. Only one inherited candidate from each of the left and the above may be selected. A pruning check may not be performed between two inherited candidates.

If a neighboring affine block is confirmed, control point motion vectors of the confirmed block may be used to derive a CPMVP candidate within the affine merge list of a current block. In this case, the neighboring affine block may indicate a block coded in the affine prediction mode among neighboring blocks of the current block. For example, referring to FIG. 7, if the bottom-left neighboring block A is coded in the affine prediction mode, motion vectors $v_2$, $v_3$ and $v_4$ at the top-left corner, top-right corner and bottom-left corner of the neighboring block A may be obtained. If the neighboring block A is coded as a 4-parameter affine motion model, two CPMVs of the current block may be calculated based on $v_2$ and $v_3$. If the neighboring block A is coded as a 6-parameter affine motion model, three CPMVs $v_2$, $v_3$ and $v_4$ of the current block may be calculated.

Figure 8:
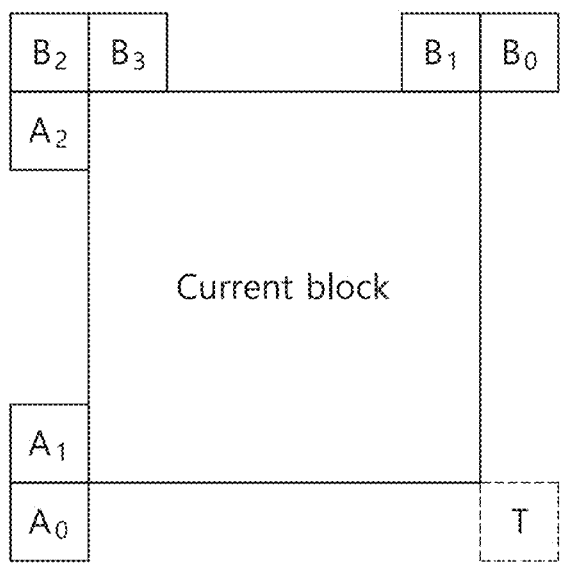
FIG. 8 is a diagram for describing the locations of candidates in the affine merge mode.

FIG. 8 is a diagram for describing the locations of candidates in the affine merge mode.

A constructed affine candidate may mean a candidate constructed by combining neighboring translational motion information of respective control points. Motion information of the control points may be derived from specific spatial neighbors and temporal neighbors. $CPMV_{k\ (k=1,\ 2,\ 3,\ 4)}$ may indicate a k-th control point.

Referring to FIG. 8, for CPMV1, blocks may be checked in order of B2→B3→A2. A motion vector a block that may be first available may be used. For CPMV2, blocks may be checked in order of B1→B0. For CPMV3, blocks may be checked in order of A1→A0. A temporal motion vector predictor (TMVP) may be used as CPMV4 if it is available.

After motion vectors of the four control points are obtained, affine merge candidates may be constructed based on the pieces of obtained motion information. Combinations of the control point motion vectors may be constructed like {CPMV1, CPMV2, CPMV3}, {CPMV1, CPMV2, CPMV4}, {CPMV1, CPMV3, CPMV4}, {CPMV2, CPMV3, CPMV4}, {CPMV1, CPMV2} and {CPMV1, CPMV3}, and may be constructed in a listed order.

A combination of three CPMVs may construct a 6-parameter affine merge candidate. A combination of two CPMVs may construct a 4-parameter affine merge candidate. In order to avoid a motion scaling process, if reference indices of control points are different, related combinations of control point motion vectors may be discarded.

Figure 9:
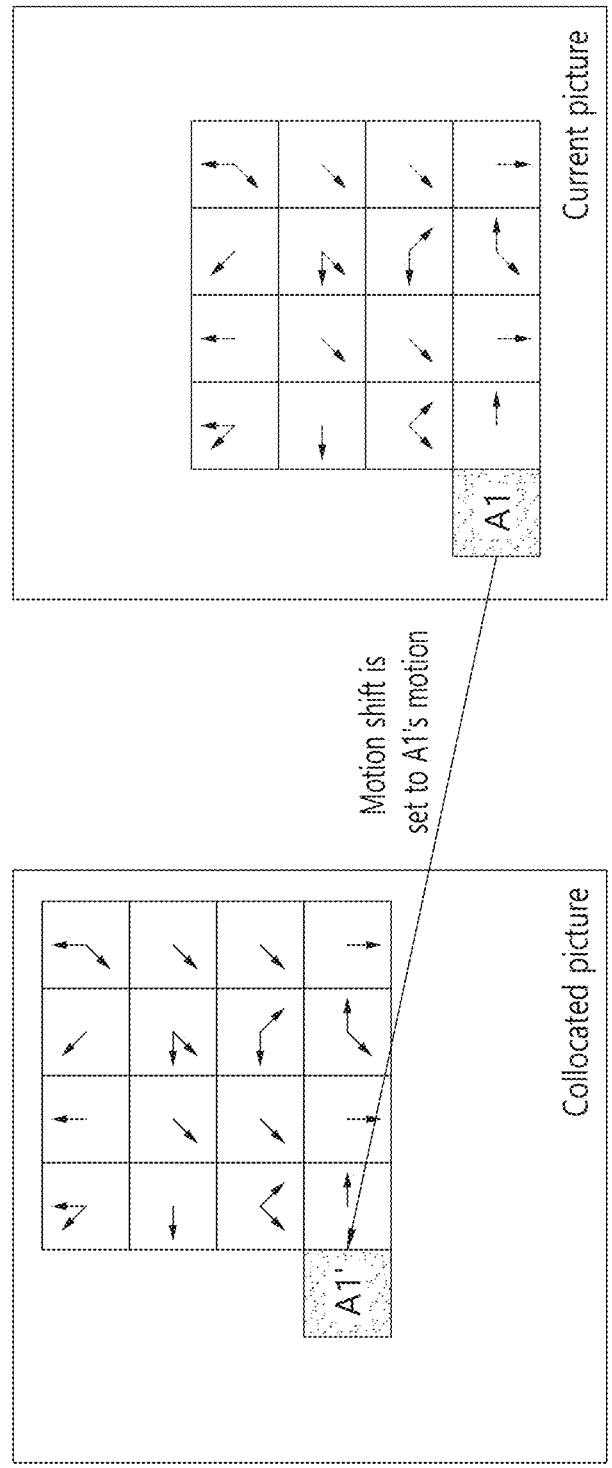
FIG. 9 is a diagram for describing an SbTMVP in inter prediction.

FIG. 9 is a diagram for describing an SbTMVP in inter prediction.

Meanwhile, a sub-block-based temporal motion vector prediction (SbTMVP) method may be used. For example, the SbTMVP may be called advanced temporal motion vector prediction (ATMVP). The SbTMVP may use a motion field within a collocated picture in order to improve motion vector prediction and the merge mode for CUs within a current picture. In this case, the collocated picture may be called a col picture.

For example, the SbTMVP may predict a motion in a sub-block (or sub CU) level. Furthermore, the SbTMVP may apply a motion shift before fetching temporal motion information from a col picture. In this case, the motion shift may be obtained from one of spatial neighboring blocks of a current block.

The SbTMVP may predict a motion vector of a sub-block (or a sub CU) within a current block (or CU) according to two steps.

In the first step, spatial neighboring blocks may be tested in order of A1, B1, B0 and A0 in FIG. 4. The first spatial neighboring block having a motion vector using a col picture as its reference picture may be confirmed. The motion vector may be selected as a motion shift to be applied. If such a motion is not confirmed from a spatial neighboring block, a motion shift may be set to (0, 0).

In the second step, a motion shift confirmed in the first step may be applied to obtain sub-block level motion information (a motion vector and reference indices) from a collocated picture. For example, a motion shift may be added to the coordinates of a current block. For example, a motion shift may be set as a motion of A1 in FIG. 4. In this case, motion information of a corresponding block within a collocated picture with respect to each sub-blocks may be used to derive motion information of a sub-block. Temporal motion scaling may be applied to arrange reference pictures of temporal motion vectors and reference pictures of a current block.

A combined sub-block-based merge list including both an SbTVMP candidate and affine merge candidates may be used for the signaling of an affine merge mode. In this case, the affine merge mode may be called a sub-block-based merge mode. The SbTVMP mode may be available or unavailable based on a flag included in a sequence parameter set (SPS). If the SbTMVP mode is available, an SbTMVP predictor may be added as the first entry of a list of sub-block-based merge candidates ㅇ|, and affine merge candidates may follow. A maximum permitted size of the affine merge candidate list may be five.

The size of a sub CU (or a sub-block) used in the SbTMVP may be fixed to 8×8. As in the affine merge mode, the SbTMVP mode may be applied to only a block whose width and height are 8 or more. Encoding logic of an additional SbTMVP merge candidate may be the same as other merge candidates. That is, an RD check using an additional rate-distortion (RD) cost may be performed whether to use an SbTMVP candidate with respect to each CU within a P or B slice.

Meanwhile, a predicted block of a current block may be derived based on motion information derived in the prediction mode. The predicted block may include prediction samples (a prediction sample array) of a current block. If a motion vector of the current block indicates a faction sample unit, an interpolation procedure may be performed, so that prediction samples of the current block may be derived based on reference samples of a faction sample unit within a reference picture. If affine inter prediction (affine prediction mode) is applied to a current block, prediction samples may be generated based on a sample/sub-block unit MV. If bi-prediction is applied, prediction samples derived based on a weighted sum or weighted average (according to a phase) of prediction samples derived based on L0 prediction (i.e., prediction using a reference picture within a reference picture list L0 and MVL0) and prediction samples derived based on L1 prediction (i.e., prediction using a reference picture within a reference picture list L1 and MVL1) may be used as prediction samples of a current block. In this case, a motion vector in an L0 direction may be called an L0 motion vector or MVL0. A motion vector in an L1 direction may be called an L1 motion vector or MVL1. If Bi-prediction is applied, when a reference picture used for L0 prediction and a reference picture used for L1 prediction are located at different temporal directions on the basis of a current picture (i.e., if the reference pictures are bi-prediction and correspond to bi-directional prediction), this may be called true bi-prediction.

Furthermore, reconstruction samples and a reconstruction picture may be generated based on derived prediction samples. Thereafter, a procedure, such as in-loop filtering, may be performed as described above.

Meanwhile, if bi-prediction is applied to a current block, prediction samples may be derived based on a weighted average. For example, bi-prediction using a weighted average may be called a bi-prediction with CU-level weight (BCW), a bi-prediction with weighted average (BWA) or weighted averaging bi-prediction.

In a conventional technology, a bi-prediction signal (i.e., bi-prediction samples) was derived through a simple average of an L0 prediction signal (L0 prediction samples) and an L1 prediction signal (L1 prediction samples). That is, bi-prediction samples were derived as an average of L0 prediction samples based on an L0 reference picture and MVL0 and L1 prediction samples based on an L1 reference picture and MVL1. However, if bi-prediction is applied, a bi-prediction signal (bi-prediction samples) may be derived through a weighted average of an L0 prediction signal and an L1 prediction signal as follows. For example, a bi-prediction signal (bi-prediction samples) may be derived as in Equation 3.

$$P_{bi\text{-}pred} = ((8-w)*P_0 + w*P_1 + 4) >> 3 \qquad [\text{Equation 3}]$$

In Equation 3, $P_{bi\text{-}pred}$ may indicate a value of a bi-prediction signal, that is, a prediction sample value derived by applying bi-prediction. w may indicate a weight. Furthermore, $P_0$ may indicate a value of an L0 prediction signal, that is, a prediction sample value derived by applying L0 prediction. $P_1$ may indicate a value of an L1 prediction signal, that is, a prediction sample value derived by applying L1 prediction.

For example, in weighted average bi-prediction, five weights may be permitted. For example, the five weights w may include −2, 3, 4, 5 or 10. That is, the weight w may be determined as one of weight candidates including −2, 3, 4, 5 or 10. The weight w may be determined by one of two methods with respect to each CU to which bi-prediction is applied. In the first method, a weight index may be signaled after a motion vector difference with respect to a not-merged CU. In the second method, a weight index may be inferred from neighboring blocks based on a merge candidate index with respect to a merged CU.

For example, weighted average bi-prediction may be applied to a CU having 256 or more luma samples. That is, when the product of the width and height of the CU is greater than or equal to 256, weighted average bi-prediction may be applied. In the case of a low-delay picture, five weights may be used. In the case of a non-low-delay picture, three weights may be used. For example, the three weights may include 3, 4 or 5.

For example, in the encoding apparatus, a fast search algorithm may be applied to find a weight index while not greatly increasing the complexity of the encoding apparatus. Such an algorithm may be summarized as follows. For example, when being combined with adaptive motion vector resolution (AMVR) (when AMVR is used in the inter prediction mode), if a current picture is a low-delay picture, an inequal weight may be checked conditionally with respect to the precision of a 1-pel and 4-pel motion vector. For example, when being combined with affine (when the affine prediction mode is used as an inter prediction mode), if the affine prediction mode is selected as a current best mode, affine motion estimation (ME) may be performed on inequal weights. For example, when two reference pictures of bi-prediction are not identical, inequal weights may be conditionally checked. For example, when a specific condition is satisfied based on a POC distance between a current picture and a reference picture, a coding quantization parameter (QP) and a temporal level, inequal weights may not be searched for.

For example, a BCW weight index (or weight index) may be coded using one context coded bin and a following bypass coded bin. The first context coded bin may indicate whether the same weight is used. If an inequal weight is used based on the first context coded bin, an additional bin may be signaled using bypass coding in order to indicate an inequal weight to be used.

Meanwhile, according to an embodiment of this document, when a motion vector candidate for the merge mode is constructed, if a temporal motion vector candidate is used for bi-prediction, a weight index for a weighted average may be induced or derived. That is, if an inter prediction type is bi-prediction, weight index information for a temporal merge candidate (or temporal motion vector candidate) within a merge candidate list may be induced or derived.

For example, a weight index for a weighted average may be always derived as 0 with respect to a temporal motion vector candidate. In this case, what the weight index is 0 may mean that weights in respective reference directions (i.e., the L0 prediction direction and the L1 prediction direction in bi-prediction) are the same. For example, in this case, a procedure of deriving a motion vector of a luma component for a merge mode may be the same as the following tables.

TABLE 1

8.4.2.2 Derivation process for luma motion vectors for merge mode
This process is only invoked when merge_flag[ xCb ][ yPb ] is equal to 1,
where ( xCb, yCb ) specifiy the top-left sample of the current luma coding
block relative to the top-left luma sample of the current picture.
Inputs to this process are:
- a luma location ( xCb, yCb ) of the top-left sample of the current luma
  coding block relative to the top-left sample of the current picture.
- a variable cbWidth specifying the width of the current block in luma samples.
- a variable cbHeight specifying the height of the current coding block in
  luma samples.
Outputs of this process are:
- the luma motion vectors in 1/16 fractional-sample accuracy mvL0[ 0 ][ 0 ]
  and mvL1[ 0 ][ 0 ].
- the reference indices refIdxL0 and refIdxL1.
- the prediction list utilization flags prefFlagL0[ 0 ][ 0 ] and predFladL1[ 0 ][ 0 ].
- the bi-prediction weight index gbiIdx.
The bi-prediction weight index gbiIdx is set equal to 0.
The motion vectors mvL0[ 0 ][ 0 ] and mvL1[ 0 ][ 0 ], the reference indices
refIdxL0 and refIdxL1 and the prediction utilization flags predFlagL0[ 0 ][ 0 ]
and prefFLagL1[ 0 ][ 0 ] are derived by the following ordered steps:
  1. The derivation process for merging candidates from neighbouring coding
     units as specified in clause 8.4.2.3 is invoked with the luma coding block
     location ( xCb, yCb ). the luma coding block width cbWidth, and the luma
     coding block heigh cbHeight as inputs, and the output being the availability
     flags availableFlag$A_0$. available Flag$A_1$, availableFlag$B_0$, availableFlag$B_1$ and
     availableFlag$B_2$. the reference indices refIdxLX$A_0$, refIdxLX$A_1$, refIdxLX$B_0$,
     refIdxLX$B_1$ and refIdxLX$B_2$. the prediction list utilization flags predFlagLX$A_0$,
     predFlagLXA1, predFlagLX$B_0$, predFlagLX$B_1$ and predFlagLX$B_2$, and the
     motion vectors mvLX$A_0$, mvLX$A_1$, mvLX$B_0$, mvLX$B_1$ and mvLX$B_2$. with
     X being 0 or 1, and the bi-prediction weight indices gbiIdx$A_0$, gbIdx$A_1$, gbIdx$B_0$,
     gbiIDX$B_1$, gbIdx$B_2$.

TABLE 1-continued

2. The reference indices, refIdxLXCol, with X being 0 or 1, and the bi-prediction weight index gbIdxCol for the temporal merging candidate Col are set equal to 0.
3. The derivation process for temporal luma motion vector prediction as specified in in clause 8.4.2.11 is invoked with the luma location ( xCb, yCb ), the luma coding block width cbWidth, the luma coding block height cbHeight and the variable refIdxL0Col as inputs, and the output being the availability flag availableFlagL0Col and the temporal motion vector mvL0Col. The variables availableFlagCol, predFlagL0Col and predFlagL1Col are derived as follows:

availableFlagCol = availableFlagL0Col        (8-283)
   predFlagL0Col = availableFlagL0Col           (8-284)
   predFlagL1Col = 0                            (8-285)
   gbiIdxCol = 0
                                                (8-xxx)

4. When tile_group_type is equal to B, the derivation process for temporal luma motion vector prediction as specified in clause 8.4.2.11 is invoked with the luma location ( xCb, yCb ), the luma coding block width cbWidth, the luma coding block
   height cbHeight and the variable refIdxL1Col as inputs, and the output being the availability flag availableFlagL1Col and the temporal motion vector mvL1Col. The variables availableFlagCol and predFlagL1Col are derived as follows:

availableFlagCol = availableFlagL0Col || availableFlagL1Col    (8-286)
   predFlagL1Col = availableFlagL1Col                              (8-287)

TABLE 2

5. The merding candidate list, mergeCandList, is constructed as follows:

```
   i = 0
   if( availableFlagA₁ )
       mergeCandList[ i++ ] = A₁
   if( availableFlagB₁ )
       mergeCandList[ i++ ] = B₁
   if( availableFlagB₀ )
       mergeCandList[ i++ ] = B₀
   if( availableFlagA₀ )
       mergeCandList[ i++ ] = A₀
   if( availableFlagB₂ )
       mergeCandList[ i++ ] = B₂
   if( availableFlagCol )
       mergeCandList[ i++ ] = Col
   ```

6. The variable numCurrMergeCand and numOrigMergeCand are set equal to the number of merging candidates in the mergeCandList.
7. When numCurrMergeCand is less than (MaxNumMergeCand − 1) and NumHmvpCand is greater than 0, the following applies:
   - The derivation process of history-based merging candidates as specified in 8.4.2.6 is invoked with mergeCandList, and numCurrMergeCand as inputs and modified mergCandList and numCurrMergeCand as outputs.
   - numOrigMergeCand is set equal to numCurrMergeCand.
8. The derivation process for pariwise average merging candidates specified in clause 8.4.2.4 is invoked with mergeCandList, the rference indices refIdxL0N and refIdxL1N. the prediction list utilization flags predFlag0N and predFlagL1N. the motion vectors mvL0N and mvL1N of every candidate N in mergeCandList, numCurrMergeCand and numOrigMergeCand as inputs, and the output is assigned to mergeCandList, numCurrMergeCand, the reference indices refIdxL0avgCandk and refIdxL1avgCandk, the prediction list utilization flags predFlagL0avgCandk and predFlagL1avgCandk and the motion vectors mvL0avgCandk and mvL1avgCandk of every new candidate avgCandk being added into mergeCandList. The bi-prediction weight index gbiIdx of every new candidate avgCandk being added into mergeCandList is set equal to 0. The number of candidates beign added, numAvgMergeCand, is set equal to ( numCurrMergeCand − numOrigMergeCand ). When numAvgMergeCand is greater than 0, k ranges from 0 to numAvgMergeCand − 1, inclusive.
9. The derivation process for zero motion vector merging candidates specified in 8.4.2.5 is invoked with the mergeCandList, the reference indices refIdxL0N and refIdxL1N, the prediction list utilization flags predFlagL0N and predFlagL1N, the motion vectors mvL0N and mvL1N of every candidate N in mergeCandList and numCurrMergeCand as inputs, and the output is assigned to mergeCandList, numCurrMergeCand. the reference indices refIdxL0zeroCandm and refIdxL1zeroCandm the prediction list utilization flags predFlagL0zeroCandm and predFlagL1zeroCandm and the motion vectors vmvL0zeroCandm and mvL1zeroCandm of every new candidate zeroCandm being added into mergeCandList. The bi-prediction weight index gbiIdx of every new candidate zeroCandm being added into mergeCandList is set equal to 0. The number of candidates being added, numZeroMergeCand, is set equal to ( numCurrMergeCand − numOrigMergeCand − numAvgMergeCand ). When numZeroMergeCand is greater than 0, m ranges from 0 to numZeroMergeCand − 1, inclusive.

TABLE 2-continued

10. The variable mergeIdxOffset is set equal to 0.
11. When mmvd_flag[ xCb ][ yCb ] is equal to 1. the variable mmvdCnt is set
    equal to 0 and The following applies until mmvdCnt is greater than ( merge_idx
    [ xCb ][ yCb ] − mergeIdxOffset ) or mmvdCnt is equal to MaxNumMergeCand:
    - When candidate mergeCandList[ mmvdCnt ] uses the current decoded picture
      as its reference picture, mergeIdxOffset is incremented by 1.
    - The variable mmvdCnt is incremented by 1.

TABLE 3

12. The following assignments are made with N being the candidate at position
    merge_Idx[ xCb ][ yCb ] + mergeIdxOffset in the merging candidate list mergeCandList
    ( N = mergeCandList[ merge_Idx[ xCb ][ yCb ] + mergeIdxOffset ] ) and X being replaced by 0 or 1:
        refIdxLX = refIdxLXN    (8-289)
        predFlagLX[ 0 ][ 0 ] = predFlagLXN    (8-290)
        mvLX[ 0 ][ 0 ][ 0 ] = mvLXN[ 0 ]    (8-291)
        mvLX[ 0 ][ 0 ][ 1 ] = mLXN[ 1 ]    (8-292)
        gbiIdx = gbiIdxN    (8-293)
13. When mmvd_flag[ xCb ][ yCb ] is equal to 1, the following applies:
    The derivation process for merge motion vector difference as specified in 8.4.2.7 is invoked with
    the luma location (xCb, yCb), the luma motion vectors mvL0[ 0 ][ 0 ], mvL1[ 0 ][ 0 ] the
    reference indices refIdxL0, refIdxL1 and the prediction list utilization flags predFlagL0[ 0 ][ 0 ]
    and predFlagL1[ 0 ][ 0 ] as inputs, and the motion vector differences mMvdL0 and mMvdL1 as
    outputs.
    The motion vector difference mMvdLX is added to the merge motion vectors mvLX for X being
    0 and 1 as follows:
        mvLX[ 0 ][ 0 ][ 0 ] += mMvdLX[ 0 ]    (8-294)
        mvLX[ 0 ][ 0 ][ 1 ] += mMvdLX[ 1 ]    (8-295)

Tables 1 to 3 may indicate one procedure, and the procedure may be continuously performed in order of the tables. The procedure may include a procedure (8.4.2.2) of deriving a motion vector of a luma component for a merge mode.

Referring to Tables 1 to 3, gbiIdx may indicate a bi-prediction weight index. gbiIdxCol may indicate a bi-prediction weight index for a temporal merge candidate (e.g., a temporal motion vector candidate within a merge candidate list). The gbiIdxCol may be derived as 0 in a procedure (a third step in 8.4.2.2) of deriving a motion vector of a luma component for a merge mode. That is, a weight index of a temporal motion vector candidate may be derived as 0.

Alternatively, for example, a weight index of a weighted average for a temporal motion vector candidate may be derived as a weight index of a collocated block. In this case, the collocated block may be called a col block, a co-located block or a collocated reference block. The col block may indicate a block at the same location as a current block in a reference picture. For example, in this case, a procedure of deriving a motion vector of a luma component for a merge mode may be the same as the following tables.

TABLE 4

8.4.2.2 Derivation process for luma motion vectors for merge mode
This process is only invoked when merge_flag[ xCb ][ yPb ] is equal to 1, where ( xCb, yCb ) specify the top-
left sample of the current luma coding block relative to the top-left luma sample of the current picture.
Inputs to this process are:
    a luma location (xCb, yCb ) of the top-left sample of the current luma coding block relative to the top-
    left luma sample of the current picture.
    a variable cbWidth specifying the width of the current coding block in luma samples.
    a variable cbHeight specifying the height of the current coding block in luma samples.
Outputs of this process are:
    the luma motion vectors in 1/16 fractional-sample accuracy mvL0[ 0 ][ 0 ] and mvL1[ 0 ][ 0 ]
    the reference indices refIdxL0 and refIdxL1
    the prediction list utilization flags predFlagL0[ 0 ][ 0 ] and predFlagL1[ 0 ][ 0 ]
    the bi-prediction weight index gbiIdx.
The bi-prediction weight index gbiIdx is set equal to 0.
The motion vectors mvL0[ 0 ][ 0 ] and vL[ 0 ][ 0 ]. the reference indices refIdxL0 and refIdxL1 and the
prediction utilization flags predFlagL0[ 0 ][ 0 ] and predFlagL1[ 0 ][ 0 ] are derived by the following ordered
steps:
    1.   The derivation process for merging candidates from neighbouring coding units as specified in
        clause 8.4.2.3 is invoked with the luma coding block location ( xCb, yCb ), the luma coding block
        width. cbWidth, and the luma coding block height cbHeight as inputs, and the output being the
        availability flags availableFlag$A_0$, availableFlag$A_1$, availableFlag$B_0$, availableFlag$B_1$ and
        availableFlag$B_2$, the reference indices refIdxLX$A_0$, refIdxLX$A_1$, refIdxLX$B_0$, refIdxLX$B_1$ and
        refIdxLX$B_2$, the prediction list utilization flags predFlagLX$A_0$, predFlagLX$A_1$, predFlagLX$B_0$,
        predFlagLX$B_1$ and predFlagLX$B_2$, and the motion vectors mvLX$A_0$, mvLX$A_1$, mvLX$B_0$, mvLX$B_1$
        and mvLX$B_2$, with X being 0 or 1. and the bi-prediction weight indices gbiIdx$A_0$, gbiIdx$A_1$, gbiIdx$B_0$,
        gbiIdx$B_1$, gbiIdx$B_2$.

TABLE 4-continued

2. The reference indices, refIdxLXCol, with X being 0 or 1, and the bi-prediction weight index gbiIdxCol for the temporal merging candidate Col are set equal to 0.

3. The derivation process for temporal luma motion vector prediction as specified in in clause 8.4.2.11 is invoked with the luma location ( xCb, yCb ), the luma coding block width cbWidth, the luma coding block height cbHeight and the variable refIdxL0Col as inputs, and the output being the availability flag availableFlagL0Col and the temporal motion vector mvL0Col. The variables availableFlagCol, predFlagL0Col and predFlagL1Col are derived as follows:

availableFlagCol = availableFlagL0Col (8-283)
predFlagL0Col = availableFlagL0Col (8-284)
predFlagL1Col = 0 (8-285)
gbiIdxCol = 0 (8-xxx)

4. When tile_group_type is equal to B. the derivation process for temporal luma motion vector prediction as specified in clause 8.4.2.11 is invoked with the luma location ( xCb, yCb ), the luma coding block width cbWidth, the luma coding block height cbHeight and the variable refIdxL1 Col as inputs, and the output being the availability flag availableFlagL1Col and the temporal motion vector mvL1Col. The variables availableFlagCol and predFlagL1Col are derived as follows:

availableFlagCol = availableFlagL0Col || availableFlagL1Col (8-286)
predFlagL1Col = availableFlagL1Col (8-287)

TABLE 5 gbiIdxCol = gbiIdxCol (x-xxx)

5. The merging candidate list, mergeCandList, is constructed as follows:
i = 0
if( availableFlag$A_1$ )
  mergeCandList[ i-+ ] = $A_1$
if( availableFlag$B_1$ )
  mergeCandList[ i-+ ] = $B_1$
if( availableFlag$B_0$ )
  mergeCandList[ i-+ ] = $B_0$ (8-288)
if( availableFlag$A_0$ )
  mergeCandList[ i-+ ] = $A_0$
if( availableFlag$B_2$ )
  mergeCandList[ i-+ ] = $B_2$
if( availableFlagCol )
  mergeCandList[ i-+ ] = Col 6. The variable numCurrMergeCand and numOrigMergeCand are set equal to the number of merging candidates in the mergeCandList.

7. When numCurrMergeCand is less than (MaxNumMergeCand − 1) and NumHmvpCand is greater than 0, the following applies:
The derivation process of history-based merging candidates as specified in 8.4.2.6 is invoked with mergeCandList, and numCurrMergeCand as inputs, and modified mergeCandList and numCurrMergeCand as outputs.
numOrigMergeCand is set equal to numCurrMergeCand.

8. The derivation process for pairwise average merging candidates specified in clause 8.4.2.4 is invoked with mergeCandList, the reference indices reflxL0N and refIdxL1N, the prediction list utilization flags predFlagL0N and predFlagL1N, the motion vectors mL0N and mvL1N of every candidate N in mergeCandList, numCurMergeCand and numOrigMergeCand as inputs, and the output is assigned to mergeCandList, numCurrMergeCand, the reference indices refIdxL0avgCand$_k$ and refIdxL1avgCandg the prediction list utilization flags predFlagL0avgCand; and predFlagL1avgCand$_k$ and the motion vectors mvL0avgCand and mxvL1avgCand, of every new candidate avgCand being added into mergeCandList. The bj-prediction weight index gbiIdx of every new candidate avgCand$_k$ being added into mergeCandList is set equal to 0. The number of candidates being added. numAvgMergeCand, is set equal to ( numCurrMergeCand − numOrigMergeCand ). When numAvgMergeCand is greater than 0, k ranges from 0 to numAvgMergeCand − 1, inclusive.

9. The derivation process for zero motion vector merging candidates specified in clause 8.4.2.5 is invoked with the mergeCandList, the reference indices refIdxL0N and retIdxL1N, the prediction list utilization flags predFlagL0N and predFlagL1N, the motion vectors mvL0N and mvL1N of every candidate N in mergeCandList and numCurrMergeCand as inputs, and the output is assigned to mergeCandList, numCurrMergeCand, the reference indices refIdxL0zeroCand$_m$ and retIdxL1zeroCand$_m$, the prediction list utilization flags predFlagL0zeroCand$_m$ and predFlagL1zeroCand$_m$ and the motion vectors mvL0zeroCand$_m$ and mv1zeroCand$_m$ of every new candidate zeroCand$_m$ being added into mergeCandList The bi-prediction weight index gbiIdx of every new candidate zeroCand$_m$ being added into mergeCandList is set equal to 0. The number of candidates being added, numZeroMergeCand, is set equal to ( numCurrMergeCand − numOrigMergeCand − nuivgMergeCand L When numZeroMergeCand is greater than 0, m ranges from 0 to numZeroMergeCand − 1. inclusive.

10. The variable mergeIdxOffset is set equal to 0.

11. When mmvd_flag[ xCb ][ yCb ] is equal to 1, the variable mmvdCnt is set equal to 0 and The following applies until mmvdCnt is greater than ( merge_Idx[ xCb ][ yCb ] − mergeIdxOffset ) or mmvdCnt is equal to MaxNumMergeCand:
When candidate mergeCandList[ mmvdCnt ] uses the current decoded picture as its reference picture, mergeIdxOffset is incremented by 1.

TABLE 6

The variable mmvdCnt is incremented by 1.
12. The following assignments are made with N being the candidate at position
   merge_Idx[ xCb ][ yCb ] + mergeIdxOffset in the merging candidate list mergeCandList
   ( N = mergeCandList[ merge_Idx[ XCb ][ yCb ] + mergeIdxOffset ] ) and X being replaced by 0 or 1:
       refIdxLX = refIdxLXN     (8-289)
       predFlagLX[ 0 ][ 0 ] = predFlagLXN     (8-290)
       mvLX[ 0 ][ 0 ][ 0 ] = mvLXN[ 0 ]     (8-291)
       mvLX[ 0 ][ 0 ][ 1 ] = mvLXN[ 1 ]     (8-292)
       gbiIdx = gbiIdxN     (8-293)
13. When mmvd_flag[ xCb ][ yCb ] is equal to 1, the following applies:
   The derivation process for merge motion vector difference as specified in 8.4.2.7 is invoked with
   the luma location ( xCb, yCb ), the luma motion vectors mvL0[ 0 ][ 0 ], mvL1[ 0 ][ 0 ], the
   reference indices refIdxL0, refIdxL1 and the prediction list utilization flags predFlagL0[ 0 ][ 0 ]
   and predFlagL1[ 0 ][ 0 ] as inputs, and the motion vector differences mMvdL0 and mMvdL1 as
   outputs
   The motion vector difference mMvdLX is added to the merge motion vectors mvLX for X being
   0 and 1 as follows:
       mvLX[ 0 ][ 0 ][ 0 ] += mMvdLX[ 0 ]     (8-294)
mvLX[ 0 ][ 0 ][ 1 ] += mMvdLX[ 1 ]     (8-295)

Tables 4 to 6 may indicate one procedure. The procedure may be continuously performed in order of the tables. The procedure may include a procedure (8.4.2.2) of deriving a motion vector of a luma component for a merge mode.

Referring to Tables 4 to 6, gbiIdx may indicate a bi-prediction weight index. gbiIdxCol may indicate a bi-prediction weight index for a temporal merge candidate (e.g., a temporal motion vector candidate within a merge candidate list). The gbiIdxCol may be derived as 0 in a procedure (a third step in 8.4.2.2) of deriving a motion vector of a luma component for a merge mode. However, when the type of slice or the type of tile group is B (a four step in 8.4.2.2), the gbiIdxCol may be derived as gbiIdxCol. That is, a weight index of a temporal motion vector candidate may be derived as a weight index of a col block.

Meanwhile, according to another embodiment of this document, when a motion vector candidate for a merge mode of a sub-block unit is constructed, if a temporal motion vector candidate uses bi-prediction, a weight index for a weighted average may be induced or derived. In this case, the merge mode of a sub-block unit may be called an affine merge mode (of a sub-block unit). The temporal motion vector candidate may indicate a sub-block-based temporal motion vector candidate, and may be called an SbTMVP candidate. That is, if an inter prediction type is bi-prediction, weight index information for an SbTMVP candidate (or a sub-block-based temporal motion vector candidate) within an affine merge candidate list or a sub-block merge candidate list may be induced or derived.

For example, a weight index for a weighted average of sub-block-based temporal motion vector candidates may always be derived as 0. In this case, what the weight index is 0 may mean that weights in respective reference directions (i.e., the L0 prediction direction and the L1 prediction direction in bi-prediction) are the same. For example, in this case, a procedure of deriving a motion vector and a reference index in a sub-block merge mode or a procedure of deriving a sub-block-based temporal merge candidate may be the same as the following tables.

TABLE 7

8.4.4.2 Derivation process for motion vectors and reference indices in sabblock merge mode
Inputs to this process are:
    a luma location ( xCb, yCb ) of the top-left sample of the current luma coding block relative to the top-
    left luma sample of the current picture.
    two variables cbWidth and cbHeight specifying the width and the height of the tuna coding block.
Outputs of this process are:
    the number of luma coding subblocks in horizontal direction numSbX and in vertical direction numSbY,
    the reference indices refIdxL0 and refIdxL1.
    the prediction list utilization flag arrays predFlagL0[ xSbIdx ][ ySbIdx ] and
    predFlagL1[ xSbIdx ][ ySbIdx ].
    the luma subblock motion vector arrays in 1/16 fractional-sample accuracy mvL0[ xSbIdx ][ ySbIdx ] and
    mv[ xSbIdx ][ ySbIdx ] with xSbIdx = 0..numSbX − 1, ySbIdx = 0..numSbY − 1.
    the chroma subblock motion vector arrays in 1/32 fractional-sample accuracy mvCL0[ xSbIdx ][ ySbIdx ]
    and mCL1[ xSbIdx ][ ySbIdx ] with xSbIdx = 0..nmSbX − 1, ySbIdx = 0..numSbY − 1.
    the bi-prediction weight index gbiIdx.
The variables numSbX, numSbY and the subblock merging candidate list, subblockMergeCandList are derived
by the following ordered steps:
        1.    When sps_sbtmvp_enabled_flag is equal to 1, the following applies:
            The derivation process for merging candidates from neighbouring coding units as specified in
            clause 8.4.2.3 is invoked with the luma coding block location ( xCb, yCb ), the luma coding
            block width cbWidth, the luma coding block height cbHeight and the uma coding block width
            as inputs, and the output being the availability flags availableFlag$A_0$, availableFlag$A_1$,
            availableFlag$B_0$, availableFlag$B_1$, and availableFlag$B_2$, the reference indices refIdxLX$A_0$,
            reflxLX$A_1$, refIdxLX$B_0$, refIdxLX$B_1$ and refIdxLX$B_2$, the prediction list utilization flags
            predFlagLX$A_0$, predFlagLX$A_1$, predFlagLX$B_0$, predFlagLX$B_1$ and predFlagLX$B_2$, and the
            motion vectors mvLX$A_0$, mvLX$A_1$, mvLX$B_0$, mvLX$B_1$ and mvLX$B_2$, with X being 0 or 1.
            The derivation process for subblock-based temporal merging candidates as specified in
            clause 8.4.4.3 is invoked with the huma location ( xCb, yCb ), the luma coding block width
            cbWidth, the luma coding block height cbHeight, the availability flags availableFlag$A_0$,
            availableFlag$A_1$, availableFlag$B_0$, availableFlag$B_1$, the reference indices refIdxLX$A_0$, TABLE 7-continued refIdxLXA$_1$, refIdxLXB$_0$, refIdxLXB$_1$, the prediction list utilization flags predFlagLXA$_0$, predFlagLXA$_1$, predFlagLXB$_0$, predFlagLXB$_1$ and the motion vectors mvLXA$_0$, VLXA$_1$, mvLXB$_0$, mvLXB$_1$ as inputs and the output being the availability flag availableFlagSbCol. the bi-prediction weight index gbiIdxSbCol, the number of luma coding subblocks in horizontal direction numSbX and in vertical direction munSbY, the reference indices refIdxLXSbCol, the luma motion vectors mvLXSbCol[ xSbIdx ][ ySbIdx ] and the prediction list utilization flags predFlagLXSbCol[ xSbIdx ][ ySbIdx ]   with   xSbIdx = 0..numSbX − 1, ySbIdx = 0 .. numSbY − 1 and X being 0 or 1.

2. When sps_affine_enabled_flag is equal to 1, the sample locations ( xNbA$_0$, yNbA$_0$ ), ( xNbA$_1$, yNbA$_1$ ), ( xNbA$_2$, yNbA$_2$ ), ( xNbB$_0$, yNbB$_0$, ) ( xNbB$_1$, yNbB$_1$ ) ( xNbB$_2$, yNbB$_2$ ), ( xNbB$_3$, yNbB$_3$ ), and the variables numSbX and numSbY are derived as follows:

| | |
|---|---|
| ( xA$_0$, yA$_0$ ) = ( xCb − 1, yCb + cbHeight ) | (8-536) |
| ( xA$_1$, yA$_1$ ) = ( xCb − 1, yCb + cbHeight − 1 ) | (8-537) |
| ( xA$_2$, yA$_2$ ) = ( xCb − 1, yCb ) | (8-538) |
| ( xB$_0$, yB$_0$ ) = ( xCb − cbWidth , yCb − 1 ) | (8-539) |
| ( xB$_1$, yB$_1$ ) = ( xCb − cbWidth − 1, yCb − 1 ) | (8-540) |
| ( xB$_2$, yB$_2$ ) = ( xCb − 1, yCb − 1 ) | (8-541) |
| ( xB$_3$, yB$_3$ ) = ( xCb, yCb − 1 ) | (8-542) |
| numSbX = cbWidth >> 2 | (8-543) |

TABLE 8

| | |
|---|---|
| numSbY = cbHeight >> 2 | (8-544) |

3. When sps_affine_enabled_flag is equal to 1, the variable availableFlagA is set equal to FALSE and the following applies for ( xNbA$_k$, yNbA$_k$ ) from ( xNbA$_0$, yNbA$_0$ ) to ( xNbA$_1$, yNbA$_1$ ):
   - The availability derivation process for a block as specified in clause 6.4.X [Ed. (BB): Neighbouring blocks availability checking process tbd] is invoked with the current luma location ( xCurr, yCurr ) set equal to ( xCb, yCb ) and the neighbouring luma location ( xNbA$_k$, yNbA$_k$ ) as inputs, and the output is assigned to the block availability flag availableA$_k$.
   - When availableA$_k$ is equal to TRUE and MotionModelIdc[ xNbA$_k$ ][ yNbA$_k$ ] is greater than 0 and availableFlagA is equal to FALSE, the following applies:
      - The variable availableFlagA is set equal to TRUE, motionModelIdcA is set equal to MotionModelIdc[ xNbA$_k$ ][ yNbA$_k$ ],   ( xNb, yNb )   is   set   equal   to ( CbPosX[ xNbA$_k$ ][ yNbA$_k$ ], CbPosY[ xNbA$_k$ ][ yNbA$_k$ ] ), nbW is set equal to CbWidth[ xNbA$_k$ ][ yNbA$_k$ ], nbH is set equal to CbHeight[ xNbA$_k$ ][ yNbA$_k$ ], numCpMv is set equal to MotionModelIdc[ xNbA$_k$ ][ yNbA$_k$ ] + 1, and gbiIdxA is set equal to GbiIdx[ xNbA$_k$ ][ yNbA$_k$ ].
      - For X being replaced by either 0 or 1, the following applies:
         - When PredFlagLX[ xNbA$_k$ ][ yNbA$_k$ ] is equal to 1, the derivation process for luma affine control point motion vectors from a neighbouring block as specified in clause 8.4.4.5 is invoked with the luma coding block location ( xCb, yCb ), the luma coding block width and height (cbWidth, cbHeight), the neighbouring luma coding block location ( xNb, yNb ), the neighbouring luma coding block width and height (nbW, nbH), and the number of control point motion vectors numCpMv as input, the control point motion vector predictor candidates cpMvLXA[ cpIdx ] with cpIdx = 0 .. numCpMv − 1 as output.
         - The following assignments are made:

| | |
|---|---|
| predFlagLXA = PredFlagLX[ xNbA$_k$ ][ yNbA$_k$ ] | (8-545) |
| refIdxLXA = RefIdxLX[ xKbAk ][ yNbAk ] | (8-546) |

4. When sps_affine_enabled_flag is equal to 1, the variable availableFlagB is set equal to FALSE and the following applies for ( xNbB$_k$, yNbB$_k$ ) from ( xNbB$_0$, yNbB$_0$ ) to ( xNbB$_2$, yNbB$_2$ ):
   - The availability derivation process for a block as specified in clause 6.4.X [Ed. (BB): Neighbouring blocks availability checking process tbd] is invoked with the current luma location ( xCurr, yCurr ) set equal to ( xCb, yCb ) and the neighbouring luma location ( xNbB$_k$, yNbB$_k$ ) as inputs, and the output is assigned to the block availability flag availableB$_k$.
   - When availableB$_k$ is equal to TRUE and MotionModelIdc[ xNbB$_k$ ][ yNbB$_k$ ] is greater than 0 and availableFlagB is equal to FALSE, the following applies:
      - The variable availableFlagB is set equal to TRUE, motionModelIdcB is set equal to MotionModelIdc[ xNbB$_k$ ][ yNbB$_k$ ],   ( xNb, yNb )   is   set   equal   to ( CbPosX[ xNbAB ][ yNbB$_k$ ], CbPosY[ xNbB$_k$ ][ yNbB$_k$ ] ), nbW is set equal to CbWidth[ xNbB$_k$ ][ yNbB$_k$ ], nbH is set equal to CbHeight[ xNbB$_k$ ][ yNbB$_k$ ], numCpMv is set equal to MotionModelIdc[ xNbB$_k$ ][ yNbB$_k$ ] + 1, and gbiIdxB is set equal to GbiIdx[ xNbB$_k$ ][ yNbB$_k$ ].
      - For X being replaced by either 0 or 1, the following applies:
         - When PredFlagLX[ xNbB$_k$ ][ yNbB$_k$ ] is equal to TRUE, the derivation process for luma affine control point motion vectors from a neighbouring block as specified in clause 8.4.4.5 is invoked with the luma coding block location ( xCb, yCb ), the luma coding block width and height (cbWidth, cbHeight), the neighbouring luma coding block location ( xNb, yNb ), the neighbouring luma coding block width and height (nbW, nbH), and the number of control point motion vectors numCpMv as input, the control point motion vector predictor candidates cpMvLXB[ cpIdx ] with cpIdx = 0 .. numCpMv − 1 as output.
         - The following assignments are made:

| | |
|---|---|
| predFlagLXB = PredFlagLX[ xNbB$_k$ ][ yNbB$_k$ ] | (8-547) |

TABLE 9

| | |
|---|---|
| | refIdxLXB = RefIdxLX[ xNbB$_k$ ][ yNbB$_k$ ]     (8-548) |
| 5. | When sps_affine_enabled_flag is equal to 1, the derivation process for constructed affine control point motion vector merging candidates as specified in clause 8.4.4.6 is invoked with the luma coding block location ( xCb, yCb ), the luma coding block width and height (cbWidth, cbHeight), the availability flags availableA$_0$, availableA$_1$, availableA$_2$, availableB$_0$, availableB$_1$, availableB$_2$, availableB$_3$ as inputs, and the availability flags availableFlagConstK, the reference indices refIdxLXConstK, prediction list utilization flags predFlagLXConstK, motion model indices motionModelIdcConstK and cpMvpLXConstK[ cpIdx ] with X being 0 or 1, K = 1..6, cpIdx = 0..2 as outputs and gbiIdxConstK is set equal to 0 with K = 1..6.. |
| 6. | The initial subblock merging candidate list, subblockMergeCandList, is constructed as follows:<br>   i = 0<br>   if( availableFlagSbCol )<br>      subblockMergeCandList[ i++ ] = SbCol<br>   if( availableFlagA && i < MaxNumSubblockMergeCand )<br>      subblockMergeCandList[ i++ ] = A<br>   if( availableFlagB && i < MaxNumSubblockMergeCand )<br>      subblockMergeCandList[ i++ ] = B<br>   if( availableFlagConst1 && i < MaxNumSubblockMergeCand )<br>      subblockMergeCandList[ i++ ] = Const1     (8-549)<br>   if( availableFlagConst2 && i < MaxNumSubblockMergeCand )<br>      subblockMergeCandList[ i++ ] = Const2<br>   if( availableFlagConst3 && i < MaxNumSubblockMergeCand )<br>      subblockMergeCandList[ i++ ] = Const3<br>   if( availableFlagConst4 && i < MaxNumSubblockMergeCand )<br>      subblockMergeCandList[ i++ ] = Const4<br>   if( availableFlagConst5 && i < MaxNumSubblockMergeCand )<br>      subblockMergeCandList[ i++ ] = Const5<br>   if( availableFlagConst6 && i < MaxNumSubblockMergeCand )<br>      subblockMergeCandList[ i++ ] = Const6 |
| 7. | The variable numCurrMergeCand and numOrigMergeCand are set equal to the number of merging candidates in the subblockMergeCandList. |
| 8. | When numCurrMergeCand is less than MaxNumSubblockMergeCand, the following is repeated until numCurrMrgeCand is equal to MaxNumSubblockMergeCand, with mvZero[0] and mvZero[1] both being equal to 0:<br>– The reference indices, the prediction list utilization flags and the motion vectors of zeroCand$_m$ with m equal to ( numCurMergeCand − numOrigMergeCand ) are derived as follows:<br>      refIdxL0ZeroCand$_m$ = 0     (8-550)<br>      predFlagL0ZeroCand$_m$ = 1     (8-551)<br>      cpMvL0ZeroCand$_m$[ 0 ] = mvZero     (8-552)<br>      cpMvL0ZeroCand$_m$[ 1 ] = mvZero     (8-553)<br>      cpMvL0ZeroCand$_m$[ 2 ] = mvZero     (8-554)<br>      refIdxL1ZeroCand$_m$ = ( tile_group_type = = B ) ? 0 : −1     (8-555)<br>      predFlagL1ZeroCand$_m$ = ( tile_group_type = = B ) ? 1 : 0     (8-556)<br>      cpMvL1ZeroCand$_m$[ 0 ] = mvZero     (8-557)<br>      cpMvL1ZeroCand$_m$[ 1 ] = mvZero     (8-558)<br>      cpMvL1ZeroCand$_m$[ 2 ] = mvZero     (8-559)<br>      motionModelIdcZeroCand$_m$ = 1     (8-560)<br>      gbiIdxZeroCand$_m$ = 0     (8-561)<br>– The candidate zeroCand$_m$ with m equal to ( numCurrMergeCand − numOrigMergeCand ) is added at the end of subblockMergeCandList and numCurrMergeCand is incremented by 1 as follows: |

TABLE 10 subblockMergeCandList[ numCurrMergeCand++ ] = zeroCand$_m$     (8-562)

The variables refIdxL0, refIdxL1, predFlagL0[ xSbIdx ][ ySbIdx ], predFlagL1[ xSbIdx ][ ySbIdx ], mvL0[ xSbIdx ][ ySbIdx ], mvL1[ xSbIdx ][ ySbIdx ], mvCL0[ xSbIdx ][ ySbIdx ], and mvCL1[ xSbIdx ][ ySbIdx ] with xSbIdx = 0..numSbX − 1, ySbIdx = 0..numSbY − 1 are derived as follows:

- If subblockMergeCandList[ merge_subblock_idx[ xCb ][ yCb ] ] is equal to SbCol, the bi-prediction weight index gbiIdx is set equal to 0 and the following applies with X being 0 or 1:

refIdxLX = refIdxLXSbCol     (8-563)

- For xSbIdx = 0..numSbX − 1, ySbIdx = 0..numSbY − 1, the following applies:

predFlagLX[ xSbIdx ][ ySbIdx ] = predFlagLXSbCol[ xSbIdx ][ ySbIdx ]     (8-564)
    mvLX[ xSbIdx ][ ySbIdx ][ 0 ] = mvLXSbCol[ xSbIdx ][ ySbIdx ][ 0 ]     (8-565)
    mvLX[ xSbIdx ][ ySbIdx ][ 1 ] = mvLXSbCol[ xSbIdx ][ ySbIdx ][ 1 ]     (8-566)

- When predFlagLX[ xSbIdx ][ ySbIdx ], is equal to 1, the derivation process for chroma motion vectors in clause 8.4.2.13 is invoked with mvLX[ xSbIdx ][ ySbIdx ] and refIdxLX as inputs, and the output being mvCLX[ xSbIdx ][ ySbIdx ].
- The following assignment is made for x = xCb ..xCb + cbWidth − 1 and y = yCb..yCb + cbHeight − 1:

MotionModelIdc[ x ][ y ] = 0     (8-567)

- Otherwise (subblockMergeCandList[ merge_subblock_idx[ xCb ][ yCb ] ] is not equal to SbCol), the following applies with X being 0 or 1:
  - The following assignments are made with N being the candidate at position merge_subblock_idx[ xCb ][ yCb ] in the subblock merging candidate list subblockMergeCandList ( N = subblockMergeCandList[ merge_subblock_idx[ xCb ][ yCb ] ] ):

TABLE 10-continued

```
           refIdxLX = refIdxLXN                                           (8-568)
           predFlagLX[ 0 ][ 0 ] = predFlagLXN                             (8-569)
           cpMvLX[ 0 ] = cpMvLXN[ 0 ]                                     (8-570)
           cpMvLX[ 1 ] = cpMvLXN[ 1 ]                                     (8-571)
           cpMvLX[ 2 ] = cpMvLXN[ 2 ]                                     (8-572)
           numCpMv = motionModelIdxN + 1                                  (8-573)
           gbiIdx = gbiIdxN                                               (8-574)
  -  For xSbIdx = 0..numSbX - 1, ySbIdx = 0..numSbY - 1, the following applies:
           predFlagLX[ xSbIdx ][ ySbIdx ] = predFlagLX[ 0 ][ 0 ]          (8-575)
  -  When predFlagLX[ 0 ][ 0 ] is equal to 1, the derivation process for motion vector arrays from affine
     control point motion vectors as specified in subclause 8.4.4.9 is invoked with the luma coding block
     location ( xCb, yCb ), the luma coding block width cbWidth, the luma prediction block height
     cbHeight, the number of control point motion vectors numCpMv, the control point motion vectors
     cpMvLX[ cpIdx ] with cpIdx being 0..2, and the number of luma coding subblocks in horizontal
     direction numSbX and in vertical direction numSbY as inputs, the luma subblock motion vector array
     mvLX[ xSbIdx ][ ySbIdx ] and the chroma subblock motion vector array mvCLX[ xSbIdx ][ ySbIdx ]
     with xSbIdx = 0..numSbX - 1, ySbIdx = 0 .. numSbY - 1 as outputs.
  -  The  following  assignment  is  made  for  x = xCb ..xCb + cbWidth - 1  and
     y = yCb..yCb + cbHeight - 1:
           MotionModelIdc[ x ][ y ] = numCpMv - 1                         (8-576)
```

TABLE 11

8.4.4.3 Derivation process for subblock-based temporal merging candidates
Inputs to this process are:
- a luma location ( xCb, yCb ) of the top-left sample of the current luma coding block relative to the top-left luma sample of the current picture,
- a variable cbWidth specifying the width of the current coding block in luma samples,
- a variable cbHeight specifying the height of the current coding block in luma samples,
- the availability flags availableFlagA$_0$, availableFlagA$_1$, availableFlagB$_0$, and availableFlagB$_1$ of the neighbouring coding units,
- the reference indices refIdxLXA$_0$, refIdxLXA$_1$, refIdxLXB$_0$, and refIdxLXB$_1$ of the neighbouring coding units,
- the prediction list utilization flags predFlagLXA$_0$, predFlagLXA$_1$, predFlagLXB$_0$, and predFlagLXB$_1$ of the neighbouring coding units,
- the motion vectors in 1/16 fractional-sample accuracy mvLXA$_0$, mvLXA$_1$, mvLXB$_0$, and mvLXB$_1$ of the neighbouring coding units.
Outputs of this process are:
- the availability flag availableFlagSbCol,
- the number of luma coding subblocks in horizontal direction numSbX and in vertical direction numSbY,
- the reference indices refIdxL0SbCol and refIdxL1SbCol,
- the luma motion vectors in 1/16 fractional-sample accuracy mvL0SbCol[ xSbIdx ][ ySbIdx ] and mvL1SbCol[ xSbIdx ][ ySbIdx ] with xSbIdx = 0..numSbX - 1, ySbIdx = 0 .. numSbY - 1,
- the prediction list utilization flags predFlagL0SbCol[ xSbIdx ][ ySbIdx ] and predFlagL1SbCol[ xSbIdx ][ ySbIdx ] with xSbIdx = 0..numSbX - 1, ySbIdx = 0 .. numSbY - 1,
- the bi-prediction weight index gbiIdxSbCol.
The gbiIdxSbCol is set equal to 0.
...

Tables 7 to 11 may indicate two types of procedures. The procedures may be continuously performed in order of the tables. The procedures may include a procedure (8.4.4.2) of deriving a motion vector and a reference index in a sub-block merge mode or a procedure (8.4.4.3) of deriving a sub-block-based temporal merge candidate.

Referring to Tables 7 to 11, gbiIdx may indicate a bi-prediction weight index. gbiIdxSbCol may indicate a bi-prediction weight index for a sub-block-based temporal merge candidate (e.g., a sub-block-based temporal motion vector candidate within a merge candidate list). In the procedure (8.4.4.3) of deriving a sub-block-based temporal merge candidate, the gbiIdxSbCol may be derived as 0. That is, a weight index of a sub-block-based temporal motion vector candidate may be derived as 0.

Alternatively, for example, a weight index for a weighted average of sub-block-based temporal motion vector candidates may be derived as a weight index of a temporal (center) block. For example, the temporal center block may indicate a col block or a sub-block or sample located at the center of the col block. Specifically, the temporal center block may indicate a sub-block or sample located at the bottom-right side among center four sub-blocks or samples of the col block. For example, in this case, the procedure of deriving a motion vector and a reference index in a sub-block merge mode, the procedure of deriving a sub-block-based temporal merge candidate or the procedure of deriving base motion information for a sub-block-based temporal merge may be the same as the following tables.

TABLE 12

8.4.4.2 Derivation process for motion vectors and reference indices in subblock merge mode
inputs to this process are:
- a luma location ( xCb, yCb ) of the top-left sample of the current luma coding block relative to the top-left luma sample of the current picture,
- two variables cbWidth and cbHeight specifying the width and the height of the luma coding block.

TABLE 12-continued

Outputs of this process are:
- the number of luma coding subblocks in horizontal direction numSbX and in vertical direction numSbY,
- the reference indices refIdxL0 and refIdxL1,
- the prediction list utilization flag arrays predFlagL0[ xSbIdx ][ ySbIdx ] and predFlagL1[ xSbIdx ][ ySbIdx ],
- the luma subblock motion vector arrays in 1/16 fractional-sample accuracy mvL0[ xSbIdx ][ ySbIdx ] and mvL1[ xSbIdx ][ ySbIdx ] with xSbIdx = 0..numSbX − 1, ySbIdx = 0..numSbY − 1,
- the chroma subblock motion vector arrays in 1/32 fractional-sample accuracy mvCL0[ xSbIdx ][ ySbIdx ] and mvCL1[ xSbIdx ][ ySbIdx ] with xSbIdx = 0..numSbX − 1, ySbIdx = 0..numSbY − 1,
- the bi-prediction weight index gbiIdx.

The variables numSbX, numSbY and the subblock merging candidate list, subblockMergeCandList are derived by the following ordered steps:

1. When sps_sbtmvp_enabled_flag is equal to 1, the following applies:
   - The derivation process for merging candidates from neighbouring coding units as specified in clause 8.4.2.3 is invoked with the luma coding block location ( xCb, yCb ), the luma coding block width cbWidth, the luma coding block height cbHeight and the luma coding block width as inputs, and the output being the availability flags availableFlag$A_0$, availableFlag$A_1$, availableFlag$B_0$, availableFlag$B_1$ and availableFlag$B_2$, the reference indices refIdxLX$A_0$, refIdxLX$A_1$, refIdxLX$B_0$, refIdxLX$B_1$ and refIdxLX$B_2$, the prediction list utilization flags predFlagLX$A_0$, predFlagLX$A_1$, predFlagLX$B_0$, predFlagLX$B_1$ and predFlagLX$B_2$, and the motion vectors mvLX$A_0$, mvLX$A_1$, mvLX$B_0$, mvLX$B_1$ and mvLX$B_2$, with X being 0 or 1.
   - The derivation process for subblock-based temporal merging candidates as specified in clause 8.4.4.3 is invoked with the luma location ( xCb, yCb ), the luma coding block width cbWidth, the luma coding block height cbHeight , the availability flags availableFlag$A_0$, availableFlag$A_1$, availableFlag$B_0$, availableFlag$B_1$, the reference indices refIdxLX$A_0$, refIdxLX$A_1$, refIdxLX$B_0$, refIdxLX$B_1$, the prediction list utilization flags predFlagLX$A_0$, predFlagLX$A_1$, predFlagLX$B_0$, predFlagLX$B_1$ and the motion vectors mvLX$A_0$, mvLX$A_1$, mvLX$B_0$, mvLX$B_1$ as inputs and the output being the availability flag availableFlagSbCol, the bi-prediction weight index gbiIdxSbCol, the number of luma coding subblocks in horizontal direction numSbX and in vertical direction numSbY, the reference indices refIdxLXSbCol, the luma motion vectors mvLXSbCol[ xSbIdx ][ ySbIdx ] and the prediction list utilization flags predFlagLXSbCol[ xSbIdx ][ ySbIdx ] with xSbIdx = 0..numSbX − 1, ySbIdx = 0 .. numSbY − 1 and X being 0 or 1..

2. When sps_affine_enabled_flag is equal to 1, the sample locations ( xNb$A_0$, yNb$A_0$ ), ( xNb$A_1$, yNb$A_1$ ), ( xNb$A_2$, yNb$A_2$ ), ( xNb$B_0$, yNb$B_0$ ), ( xNb$B_1$, yNb$B_1$ ), ( xNb$B_2$, yNb$B_2$ ), ( xNb$B_3$, yNb$B_3$ ), and the variables numSbX and numSbY are derived as follows:

( x$A_0$, y$A_0$ ) = ( xCb − 1, yCb + cbHeight )     (8-536)
   ( x$A_1$, y$A_1$ ) = ( xCb − 1, yCb + cbHeight − 1 )     (8-537)
   ( x$A_2$, y$A_2$ ) = ( xCb − 1, yCb )     (8-538)
   ( x$B_0$, y$B_0$ ) = ( xCb + cbWidth , yCb − 1 )     (8-539)
   ( x$B_1$, y$B_1$ ) = ( xCb + cbWidth − 1, yCb − 1 )     (8-540)
   ( x$B_2$, y$B_2$ ) = ( xCb − 1, yCb − 1 )     (8-541)
   ( x$B_3$, y$B_3$ ) = ( xCb, yCb − 1 )     (8-542)
   numSbX = cbWidth >> 2     (8-543)

TABLE 13 numSbY = cbHeight >> 2     (8-544)

3. When sps_affine_enabled_flag is equal to 1, the variable availableFlagA is set equal to FALSE and the following applies for ( xNb$A_k$, yNb$A_k$ ) from ( xNb$A_0$, yNb$A_0$ ) to ( xNb$A_1$, yNb$A_1$ ):
   - The availability derivation process for a block as specified in clause 6.4.X [Ed. (BB): Neighbouring blocks availability checking process tbd] is invoked with the current luma location ( xCurr, yCurr ) set equal to ( xCb, yCb ) and the neighbouring luma location ( xNb$A_k$, yNb$A_k$ ) as inputs, and the output is assigned to the block availability flag available$A_k$.
   - When available$A_k$ is equal to TRUE and MotionModelIdc[ xNb$A_k$ ][ yNb$A_k$ ] is greater than 0 and availableFlagA is equal to FALSE, the following applies:
     - The variable availableFlagA is set equal to TRUE, motionModelIdcA is set equal to MotionModelIdc[ xNb$A_k$ ][ yNb$A_k$ ], ( xNb, yNb ) is set equal to ( CbPosX[ xNb$A_k$ ][ yNb$A_k$ ], CbPosY[ xNb$A_k$ ][ yNb$A_k$ ] ), nbW is set equal to CbWidth[ xNb$A_k$ ][ yNb$A_k$ ], nbH is set equal to CbHeight[ xNb$A_k$ ][ yNb$A_k$ ], numCpMv is set equal to MotionModelIdc[ xNb$A_k$ ][ yNb$A_k$ ] + 1, and gbiIdxA is set equal to GbiIdx[ xNb$A_k$ ][ yNb$A_k$ ].
     - For X being replaced by either 0 or 1, the following applies:
       - When PredFlagLX[ xNb$A_k$ ][ yNb$A_k$ ] is equal to 1, the derivation process for luma affine control point motion vectors from a neighbouring block as specified in clause 8.4.4.5 is invoked with the luma coding block location ( xCb, yCb ), the luma coding block width and height (cbWidth, cbHeight), the neighbouring luma coding block location ( xNb, yNb ), the neighbouring luma coding block width and height (nbW, nbH), and the number of control point motion vectors numCpMv as input, the control point motion vector predictor candidates cpMvLXA[ cpIdx ] with cpIdx = 0 .. numCpMv − 1 as output.
       - The following assignments are made:
         predFlagLXA = PredFlagLX[ xNb$A_k$ ][ yNb$A_k$ ]     (8-545)
         refIdxLXA = RefIdxLX[ xNbAk ][ yNbAk ]     (8-546)

4. When sps_affine_enabled_flag is equal to 1, the variable availableFlagB is set equal to FALSE and the following applies for ( xNb$B_k$, yNb$B_k$ ) from ( xNb$B_0$, yNb$B_0$ ) to ( xNb$B_2$, yNb$B_2$ ):
   - The availability derivation process for a block as specified in clause 6.4.X [Ed. (BB):

TABLE 13-continued

Neighbouring blocks availability checking process tbd] is invoked with the current luma location
  ( xCurr, yCurr ) set equal to ( xCb, yCb ) and the neighbouring luma location ( xNbB$_k$, yNbB$_k$ )
  as inputs, and the output is assigned to the block availability flag availableB$_k$.
  - When availableB$_k$ is equal to TRUE and MotionModelIdc [ xNbB$_k$ ][ yNbB$_k$ ] is greater than 0
    and availableFlagB is equal to FALSE, the following applies:
    - The variable availableFlagB is set equal to TRUE, motionModelIdcB is set equal to
      MotionModelIdc[ xNbB$_k$ ][ yNbB$_k$ ], ( xNb, yNb ) is set equal to
      ( CbPosX[ xNbAB ][ yNbB$_k$ ], CbPosY[ xNbB$_k$ ][ yNbB$_k$ ] ), nbW is set equal to
      CbWidth[ xNbB$_k$ ][ yNbB$_k$ ], nbH is set equal to CbHeight[ xNbB$_k$ ][ yNbB$_k$ ], numCpMv
      is set equal to MotionModelIdc[ xNbB$_k$ ][ yNbB$_k$ ] + 1, and gbiIdxB is set equal to
      GbiIdx[ xNbB$_k$ ][ yNbB$_k$ ].
  - For X being replaced by either 0 or 1, the following applies:
    - When PredFlagLX[ xNbB$_k$ ][ yNbB$_k$ ] is equal to TRUE, the derivation process for luma
      affine control point motion vectors from a neighbouring block as specified in clause
      8.4.4.5 is invoked with the luma coding block location ( xCb, yCb ), the luma coding
      block width and height (cbWidth, cbHeight), the neighbouring luma coding block location
      ( xNb, yNb ), the neighbouring luma coding block width and height (nbW, nbH), and the
      number of control point motion vectors numCpMv as input, the control point motion
      vector predictor candidates cpMvLXB[ cpIdx ] with cpIdx = 0 .. numCpMv − 1 as output.
    - The following assignments are made:
        predFlagLXB = PredFlagLX[ xNbB$_k$ ][ yNbB$_k$ ]                    (8-547)

TABLE 14 refIdxLXB = RefIdxLX[ xNbB$_k$ ][ yNbB$_k$ ]                      (8-548)
5. When sps_affine_enabled_flag is equal to 1, the derivation process for constructed affine control point
   motion vector merging candidates as specified in clause 8.4.4.6 is invoked with the luma coding block
   location ( xCb, yCb ), the luma coding block width and height (cbWidth, cbHeight), the availability
   flags availableA$_0$, availableA$_1$, availableA$_2$, availableB$_0$, availableB$_1$, availableB$_2$, availableB$_3$ as
   inputs, and the availability flags availableFlagConstK, the reference indices refIdxLXConstK,
   prediction list utilization flags predFlagLXConstK, motion model indices motionModelIdcConstK
   and cpMvpLXConstK[ cpIdx ] with X being 0 or 1, K = 1..6, cpIdx = 0..2 as outputs and
   gbiIdxConstK is set equal to 0 with K = 1..6..
6. The initial subblock merging candidate list, subblockMergeCandList, is constructed as follows:
   i = 0
   if( availableFlagSbCol )
     subblockMergeCandList[ i++ ] = SbCol
   if( availableFlagA && i < MaxNumSubblockMergeCand )
     subblockMergeCandList[ i++ ] = A
   if( availableFlagB && i < MaxNumSubblockMergeCand )
     subblockMergeCandList[ i++ ] = B
   if( availableFlagConst1 && i < MaxNumSubblockMergeCand )
     subblockMergeCandList[ i++ ] = Const1                                  (8-549)
   if( availableFlagConst2 && i < MaxNumSubblockMergeCand )
     subblockMergeCandList[ i++ ] = Const2
   if( availableFlagConst3 && i < MaxNumSubblockMergeCand )
     subblockMergeCandList[ i++ ] = Const3
   if( availableFlagConst4 && i < MaxNumSubblockMergeCand )
     subblockMergeCandList[ i++ ] = Const4
   if( availableFlagConst5 && i < MaxNumSubblockMergeCand )
     subblockMergeCandList[ i++ ] = Const5
   if( availableFlagConst6 && i < MaxNumSubblockMergeCand )
     subblockMergeCandList[ i++ ] = Const6
7. The variable numCurrMergeCand and numOrigMergeCand are set equal to the number of merging
   candidates in the subblockMergeCandList.
8. When numCurrMergeCand is less than MaxNumSubblockMergeCand, the following is repeated until
   numCurrMrgeCand as equal to MaxNumSubblockMergeCand, with mvZero[0] and mvZero[1] both
   being equal to 0:
   - The reference indices, the prediction list utilization flags and the motion vectors of zeroCand$_m$ with
     m equal to ( numCurrMergeCand − numOrigMergeCand ) are derived as follows:
         refIdxL0ZeroCand$_m$ = 0                                            (8-550)
         predFlagL0ZeroCand$_m$ = 1                                          (8-551)
         cpMvL0ZeroCand$_m$[ 0 ] = mvZero                                    (8-552)
         cpMvL0ZeroCand$_m$[ 1 ] = mvZero                                    (8-553)
         cpMvL0ZeroCand$_m$[ 2 ] = mvZero                                    (8-554)
         refIdxL1ZeroCand$_m$ = ( tile_group_type = = B ) ? 0 : −1           (8-555)
         predFlagL1ZeroCand$_m$ = ( tile_group_type = = B ) ? 1 : 0          (8-556)
         cpMvL1ZeroCand$_m$[ 0 ] = mvZero                                    (8-557)
         cpMvL1ZeroCand$_m$[ 1 ] = mvZero                                    (8-558)
         cpMvL1ZeroCand$_m$[ 2 ] = mvZero                                    (8-559)
         motionModelIdcZeroCand$_m$ = 1                                      (8-560)
         gbiIdxZeroCand$_m$ = 0                                              (8-561)
   - The candidate zeroCand$_m$ with m equal to ( numCurrMergeCand − numOrigMergeCand ) is added at
     the end of subblockMergeCandList and numCurrMergeCand is incremented by 1 as follows:

TABLE 15 subblockMergeCandList[ numCurrMergeCand++ ] = zeroCand$_m$     (8-562)

The variables refIdxL0, refIdxL1, predFlagL0[ xSbIdx ][ ySbIdx ], predFlagL1[ xSbIdx ][ ySbIdx ], mvL0[ xSbIdx ][ ySbIdx ], mvL1[ xSbIdx ][ ySbIdx ], mvCL0[ xSbIdx ][ ySbIdx ], and mvCL1[ xSbIdx ][ ySbIdx ] with xSbIdx = 0..numSbX − 1, ySbIdx = 0..numSbY − 1 are derived as follows:
- If subblockMergeCandList[ merge_subblock_idx[ xCb ][ yCb ] ] is equal to SbCol, the bi-prediction weight index gbiIdx is set equal to 0 and the following applies with X being 0 or 1:
      refIdxLX = refIdxLXSbCol     (8-563)
  - For xSbIdx = 0..numSbX − 1, ySbIdx = 0..numSbY − 1, the following applies:
        predFlagLX[ xSbIdx ][ ySbIdx ] = predFlagLXSbCol[ xSbIdx ][ ySbIdx ]     (8-564)
        mvLX[ xSbIdx ][ ySbIdx ][ 0 ] = mvLXSbCol[ xSbIdx ][ ySbIdx ][ 0 ]     (8-565)
        mvLX[ xSbIdx ][ ySbIdx ][ 1 ] = mvLXSbCol[ xSbIdx ][ ySbIdx ][ 1 ]     (8-566)
    - When predFlagLX[ xSbIdx ][ ySbIdx ], is equal to 1, the derivation process for chroma motion vectors in clause 8.4.2.13 is invoked with mvLX[ xSbIdx ][ ySbIdx ] and refIdxLX as inputs, and the output being mvCLX[ xSbIdx ][ ySbIdx ].
  - The following assignment is made for x = xCb ..xCb + cb Width − 1 and y = yCb..yCb + cbHeight − 1:
        MotionModelIdc[ x ][ y ] = 0     (8-567)
- Otherwise (subblockMergeCandList[ merge_subblock_idx[ xCb ][ yCb ] ] is not equal to SbCol), the following applies with X being 0 or 1:
  - The following assignments are made with N being the candidate at position merge_subblock_idx[ xCb ][ yCb ] in the subblock merging candidate list subblockMergeCandList ( N = subblockMergeCandList[ merge_subblock_idx[ xCb ][ yCb ] ] ):
        refIdxLX = refIdxLXN     (8-568)
        predFlagLX[ 0 ][ 0 ] = predFlagLXN     (8-569)
        cpMvLX[ 0 ] = cpMvLXN[ 0 ]     (8-570)
        cpMvLX[ 1 ] = cpMvLXN[ 1 ]     (8-571)
        cpMvLX[ 2 ] = cpMvLXN[ 2 ]     (8-572)
        numCpMv = motionModelIdxN + 1     (8-573)
        gbiIdx = gbiIdxN     (8-574)
  - For xSbIdx = 0..numSbX − 1, ySbIdx = 0..numSbY − 1, the following applies:
        predFlagLX[ xSbIdx ][ ySbIdx ] = predFlagLX[ 0 ][ 0 ]     (8-575)
  - When predFlagLX[ 0 ][ 0 ] is equal to 1, the derivation process for motion vector arrays from affine control point motion vectors as specified in subclause 8.4.4.9 is invoked with the luma coding block location ( xCb, yCb ), the luma coding block width cbWidth, the luma prediction block height cbHeight, the number of control point motion vectors numCpMv, the control point motion vectors cpMvLX[ cpIdx ] with cpIdx being 0..2, and the number of luma coding subblocks in horizontal direction numSbX and in vertical direction numSbY as inputs, the luma subblock motion vector array mvLX[ xSbIdx ][ ySbIdx ] and the chroma subblock motion vector array mvCLX[ xSbIdx ][ ySbIdx ] with xSbIdx = 0..numSbX − 1, ySbIdx = 0 .. numSbY − 1 as outputs.
  - The following assignment is made for x = xCb ..xCb + cbWidth − 1 and y = yCb..yCb + cbHeight − 1:
        MotionModelIdc[ x ][ y ] = numCpMv − 1     (8-576)

TABLE 16

8.4.4.3 Derivation process for subblock-based temporal merging candidates
Inputs to this process are:
- a luma location ( xCb, yCb ) of the top-left sample of the current luma coding block relative to the top-left luma sample of the current picture,
- a variable cbWidth specifying the width of the current coding block in luma samples,
- a variable cbHeight specifying the height of the current coding block in luma samples,
- the availability flags availableFlagA$_0$, availableFlagA$_1$, availableFlagB$_0$, and availableFlagB$_1$ of the neighbouring coding units,
- the reference indices refIdxLXA$_0$, refIdxLXA$_1$, refIdxLXB$_0$, and refIdxLXB$_1$ of the neighbouring coding units,
- the prediction list utilization flags predFlagLXA$_0$, predFlagLXA$_1$, predFlagLXB$_0$, and predFlagLXB$_1$ of the neighbouring coding units,
- the motion vectors in 1/16 fractional-sample accuracy mvLXA$_0$, mvLXA$_1$, mvLXB$_0$, and mvLXB$_1$ of the neighbouring coding units.

Outputs of this process are:
- the availability flag availableFlagSbCol,
- the number of luma coding subblocks in horizontal direction numSbX and is vertical direction numSbY,
- the reference indices refIdxL0SbCol and refIdxL1SbCol,
- the luma motion vectors in 1/16 fractional-sample accuracy mvL0SbCol[ xSbIdx ][ ySbIdx ] and mvL1SbCol[ xSbIdx ][ ySbIdx ] with xSbIdx = 0..numSbX − 1, ySbIdx = 0 .. numSbY − 1,
- the prediction list utilization flags predFlagL0SbCol[ xSbIdx ][ ySbIdx ] and predFlagL1SbCol[ xSbIdx ][ ySbIdx ] with xSbIdx = 0..numSbX − 1, ySbIdx = 0 .. sumSbY − 1,
- the bi-prediction weight index gbiIdxSbCol.

The availability flag availableFlagSbCol is derived as follows.
- If one or more of the following conditions is true, availableFlagSbCol is set equal to 0.
  - tile_group_temporal_mvp_enable_flag is equal to 0.
  - sps_sbtmvp_flag is equal to 0.
  - cbWidth is less than 8.
  - cbHeight is less than 8.

TABLE 16-continued

- Otherwise, the following ordered steps apply:
    1. The location ( xCtb, yCtb ) of the top-left sample of the luma coding tree block that contains the current coding block and the location ( xCtr, yCtr ) of the below-right center sample of the current luma coding block are derived as follows:
        xCtb = ( xCb >> CtuLog2Size ) << CtuLog2Size    (8-577)
        yCtb = ( yCb >> CtuLog2Size ) << CtuLog2Size    (8-578)
        xCtr = xCb + ( cbWidth / 2 )    (8-579)
        yCtr = yCb + ( cbHeight / 2 )    (8-580)
    2. The luma location ( xColCtrCb, yColCtrCb ) is set equal to the top-left sample of the collocated luma coding block covering the location given by ( xCtr, yCtr ) inside ColPic relative to the top-left luma sample of the collocated picture specified by ColPic.
    3. The derivation process for subblock-based temporal merging base motion data as specified in clause 8.4.4.4 is invoked with the location ( xCtb, yCtb ), the location ( xColCtrCb, yColCtrCb ),

TABLE 17 the availability flags availableFlag$A_0$, availableFlag$A_1$, availableFlag$B_0$ and availableFlag$B_1$, and the prediction list utilization flags predFlagLX$A_0$, predFlagLX$A_1$, predFlagLX$B_0$ and predFlagLX$B_1$, and the reference indices refIdxLX$A_0$, refIdxLX$A_1$, refIdxLX$B_0$ and refIdxLX$B_1$, and the motion vectors mvLX$A_0$, mvLX$A_1$, mvLX$B_0$ and mvLX$B_1$, with X being 0 and 1 as inputs and the motion vectors ctrMvLX, the prediction list utilization flags ctrPredFlagLX and the reference indices ctrRefIdxLX of the collocated block, with X being 0 and 1, the bi-prediction weight index gbiIdxSbCol, and the temporal motion vector tempMV as outputs.
4. The variable availableFlagSbCol is derived as follows:
    — If both ctrPredFlagL0 and ctrPredFlag1 are equal to 0, availableFlagSbCol is set equal to 0.
    — Otherwise, availableFlagSbCol is set equal to 1.
When availableFlagSbCol is equal to 1, the following applies:
— The variables numSX, numSbY, sbWidth, sbHeight and refIdxLXSbCol are derived as follows:
    numSbx = cbWidth >> 3    (8-581)
    numSbY = cbHeight >> 3    (8-582)
    sbWidth = cbWidth / numSbX    (8-583)
    sbHeight = cbHeight / numSbY    (8-584)
    refIdxLXSbCol = 0    (8-585)
— For xSbIdx = 0..numSbX − 1 and ySbIdx = 0 .. numSbY − 1, the motion vectors mvLXSbCol[ xSbIdx ][ ySbIdx ] and prediction list utilization flags predFlagLXSbCol[ xSbIdx ][ ySbIdx ] are derived as follows:
    — The luma location ( xSb, ySb ) specifying the top-left sample of the current coding subblock relativeto the top-left luma sample of the current picture is derived as follows:
        xSb = xCb − xSbIdx * sbWidth    (8-586)
        ySb = yCb − ySbIdx * sbHeight    (8-587)
    — The location ( xColSb, yColSb ) of the collocated subblock inside ColPic is derived as follows.
        xColSb = Clip3( xCtb,
            Min( CurPicWidthInSamplesY − 1, xCtb + ( 1 << CtbLog2SizeY ) + 3 ),    (8-588)
            xSb + ( rempMv[0] >> 4 ) )
        yColSb = Clip3( yCtb,
            Min( CurPicHeightInSamplesY − 1, yCtb + ( 1 << CtbLog2SizeY ) − 1),    (8-589)
            ySb + ( tempMv[i] >> 4 ) )
    — The variable currCb specifies the luma coding block covering the current coding subblock inside the current picture.
    — The variable colCb specifies the luma coding block covering the modified location given by ( ( xColSb >> 3 ) << 3, ( yColSb >> 3 ) << 3 ) inside the ColPic.
    — The luma location ( xColCb, yColCb ) is set equal to the top-left sample of the collocated luma coding block specified by colCb relative to the top-left luma sample of the collocated picture specified by ColPic.
    — The derivation process for collocated motion vectors as specified in clause 8.4.2.12 is invoked with currCb, colCb, ( xColCb, yColCb ), refIdxL0 set equal to 0 and sbFlag set equal to 1 as inputs and the output being assigned to the motion vector of the subblock mvL0SbCol[ xSbIdx ][ ySbIdx ] and availableFlagL0SbCol.

TABLE 18

- The derivation process for collocated motion vectors as specified in clause 8.4.2.12 is invoked with currCb, colCb, ( xColCb, yColCb ), refIdxL1 set equal to 0 and sbFlag set equal to 1 as inputs and the output being assigned to the motion vector of the subblock mvL1SbCol[ xSbIdx ][ ySbIdx ] and availableFlagL1SbCol.
- When availableFlagL0SbCol and availableFlagL1SbCol are both equal to 0, the following applies for X being 0 and 1:
    mvLXSbCol[ xSbIdx ][ ySbIdx ] = ctrMvLX    (8-590)
    predFlagLXSbCol[ xSbIdx ][ ySbIdx ] = ctrPredFlagLX    (8-591)

TABLE 18-continued 8.4.4.4 Derivation process for subblock-based temporal merging base motion data
Inputs to this process are:
- the location ( xCtb, yCtb ) of the top-left sample of the luma coding tree block that contains the current coding block,
- the location ( xColCrCb, yColCtrCb ) of the top-left sample of the collocated luma coding block that covers the below-right center sample,
- the availability flags availableFlag$A_0$, availableFlag$A_1$, availableFlag$B_0$, and availableFlag$B_1$ of the neighbouring coding units,
- the reference indices refIdxLX$A_0$, refIdxLX$A_1$, refIdxLX$B_0$, and refIdxLX$B_1$ of the neighbouring coding units,
- the prediction list utilization flags predFlagLX$A_0$, predFlagLX$A_1$, predFlagLX$B_0$, and predFlagLX$B_1$ of the neighbouring coding units,
- the motion vectors in 1/16 fractional-sample accuracy mvLX$A_0$, mvLX$A_1$, mvLX$B_0$, and mvLX$B_1$ of the neighbouring coding units.

Outputs of this process are:
- the motion vectors ctrMvL0 and ctrMvL1,
- the prediction list utilization flags ctrPredFlagL0 and ctrPredFlagL1,
- the reference indices ctrRefIdxL0 and ctrRefIdxL1,
- the temporal motion vector tempMV,
- the bi-prediction weight index gbiIdxSbCol.

The variable tempMv is set as follows:
  tempMv[ 0 ] = 0  (8-592)
  tempMv[ 1 ] = 0  (8-593)

The variable currPic specifies the current picture.
The variable availableFlagN is set equal to FALSE, and the following applies:
- When availableFlag$A_1$ is equal to 1, the following applies:
  - availableFlagN is set equal to TRUE,
  - refIdxLXN is set equal to refIdxLX$A_0$ and mvLXN is set equal to mvLX$A_0$, for X being replaced by 0 and 1.
- When availableFlagN is equal to FALSE and availableFlagL$B_1$ is equal to 1, the following applies:
  - availableFlagN is set equal to TRUE,
  - refIdxLXN is set equal to refIdxLX$B_0$ and mvLXN is set equal to mvLX$B_0$, for X being replaced by 0 and 1.

TABLE 19

- When availableFlagN is equal to FALSE and availableFlag$B_0$ is equal to 1, the following applies:
  - availableFlagN is set equal to TRUE.
  - refIdxLXN is set equal to refIdxLX$B_1$ and mvLXN is set equal to mvLX$B_1$, for X being replaced by 0 and 1.
- When availableFlagN is equal to FALSE and availableFlag$A_0$ is equal to 1, the following applies:
  - availableFlagN is set equal to TRUE.
  - refIdxLXN is set equal to refIdxLX$A_1$ and mvLXN is set equal to mvLX$A_1$, for X being replaced by 0 and 1.

When availableFlagN is equal to TRUE, the following applies:
- If all of the following conditions are true, tempMV is set equal to mvL1N:
  - predFlagL1N is equal to 1,
  - DiffPicOrderCnt(ColPic, RefPicList1[refIdxL1N]) is equal to 0,
  - DiffPicOrderCnt(aPic, currPic) is less than or equal to 0 for every picture aPic in every reference picture list of the current tile group,
  - tile_group_type is equal to B,
  - collocated_from_l0_flag is equal to 0.
- Otherwise if all of the following conditions are true, tempMV is set equal to mvL0N:
  - predFlagL0N is equal to 1,
  - DiffPicOrderCnt(ColPic, RefPicList0[refIdxL0N]) is equal to 0.

The location ( xColCb, yColCb ) of the collocated block inside ColPic is derived as follows,
  xColCb = Clip3( xCtb,
    Min( CurPicWidthInSamplesY − 1, xCtb + ( 1 << CtbLog2SizeY ) + 3 ),  (8-594)
    xColCtCb + ( tempMv[0] >> 4 ) )
  yColCb = Clip3( yCtb,
    Min( CurPicHeightInSamplesY − 1, yCtb + ( 1 << CtbLog2SizeY ) − 1 ),  (8-595)
    yColCtrCb + ( tempMv[1] >> 4 ) )

The array colPredMode is set equal to the prediction mode array CuPredMode of the collocated picture specified by ColPic.
The motion vectors ctrMvL0 and ctrMvL1, the prediction list utilization flags ctrPredFlagL0 and ctrPredFlagL1, and the reference indices ctrRefIdxL0 and ctrRefIdxL1 are derived as follows:
- If colPredMode[xColCb][yColCb] is equal to MODE_INTER, the following applies:
  - The variable currCb specifies the luma coding block covering ( xCtrCb ,yCtrCb ) inside the current picture.
  - The variable colCb specifies the luma coding block covering the modified location given by
    ( ( xColCb >> 3 ) << 3, ( yColCb >> 3 ) << 3 ) inside the ColPic.
  - The luma location ( xColCb, yColCb ) is set equal to the top-left sample of the collocated luma coding block specified by colCb relative to the top-left luma sample of the collocated picture specified by ColPic.
  - The gbiIdxSbCol is set equal to gbiIdxcolCb.

TABLE 19-continued

- The derivation process for temporal motion vector prediction in subclause 8.4.2.12 is invoked with currCb, colCb, (xColCb, yColCb), centerRefIdxL0, and sbFlag set equal to 1 as inputs and the output being assigned to ctrMvL0 and ctrPredFlagL0.
- The derivation process for temporal motion vector prediction in subclause 8.4.2.12 is invoked with currCb, colCb, (xColCb, yColCb), centerRefIdxL1, and sbFlag set equal to 1 as inputs and the output being assigned to ctrMvL1 and ctrPredFlagL1.

TABLE 20

- Otherwise, the following applies:
  ctrPredFlagL0 = 0    (8-596)
  ctrPredFlagL1 = 0    (8-597)

Tables 12 to 20 may indicate three types of procedures. The procedures may be continuously performed in order of the tables. The procedures may include the procedure (8.4.4.2) of deriving a motion vector and a reference index in a sub-block merge mode, the procedure (8.4.4.3) of deriving a sub-block-based temporal merge candidate or a procedure (8.4.4.4) of deriving base motion information for a sub-block-based temporal merge.

Referring to Tables 12 to 20, gbiIdx may indicate a bi-prediction weight index. gbiIdxSbCol may indicate a bi-prediction weight index for a sub-block-based temporal merge candidate (e.g., a sub-block-based temporal motion vector candidate within a merge candidate list). In the procedure (8.4.4.4) of deriving base motion information for a sub-block-based temporal merge, the gbiIdxSbCol may be derived as gbiIdxcolCb. That is, a weight index of a sub-block-based temporal motion vector candidate may be derived as a temporal center block. For example, the temporal center block may indicate a col block or a sub-block or sample located at the center of the col bloc. Specifically, the temporal center block may indicate a sub-block or sample located at the bottom-right side among center four sub-blocks or samples of the col block.

Alternatively, for example, a weight index for a weighted average of sub-block-based temporal motion vector candidates may be derived as a weight index of each sub-block unit. When a sub-block is not available, a weight index for a weighted average of sub-block-based temporal motion vector candidates may be derived as a weight index of a temporal (center) block. For example, the temporal center block may indicate a col block or a sub-block or sample located at the center of the col bloc. Specifically, the temporal center block may indicate a sub-block or sample located at the bottom-right side among center four sub-blocks or samples of the col block. For example, in this case, the procedure of deriving a motion vector and a reference index in a sub-block merge mode, the procedure of deriving a sub-block-based temporal merge candidate or the procedure of deriving base motion information for a sub-block-based temporal merge may be the same as the following tables.

TABLE 21

8.4.4.2 Derivation process for motion vectors and reference indices in subblock merge mode
Inputs in this process are:
- a luma location ( xCb, yCb ) of the top-left sample of the current luma coding block relative to the top-left luma sample of the current picture.
- two variables cbWidth and cbHeight specifying the width and the height of the luma coding block.
Outputs of this process are:
- the number of luma coding subblocks in horizontal direction numSbX and in vertical direction numSbY.
- the reference indices refIdxL0 and refIdxL1.
- the prediction list utilization flag arrays predFlagL0[ xSbIdx ][ ySbIdx ] and predFlagL1[ xSbIdx ][ ySbIdx ].
- the luma subblock motion vector arrays in 1/16 fractional-sample accuracy mvL0[ xSbIdx ][ ySbIdx ] and mvL1[ xSbIdx ][ ySbIdx ] with xSbIdx = 0..numSbX − 1, ySbIdx = 0..numSbY − 1.
- the chroma subblock motion vector arrays in 1/32 fractional-sample accuracy mvCL0[ xSbIdx ][ ySbIdx ] and mvCL1[ xSbIdx ][ ySbIdx ] with xSbIdx = 0..numSbX − 1, ySbIdx = 0..numSbY − 1,
- the bi-prediction weight index gbiIdx.
The variables sumSbX, numSbY and the subblock merging candidate list, subblockMergeCandList are derived by the following ordered steps:
1. When sps_sbtmvp_enabled_flag is equal to 1, the following applies:
    - The derivation process for merging candidates from neighbouring coding units as specified in clause 8.4.2.3 is invoked with the luma coding block location ( xCb, yCb ), the luma coding block width cbWidth, the luma coding block height cbHeight and the luma coding block width as inputs. and the output being the availability flags availableFlagA$_0$, availableFlagA$_1$, availableFlagB$_0$, availableFlagB$_1$, and availableFlagB$_2$, the reference indices refIdxLXA$_0$, refIdxLXA$_1$, refIdxLXB$_0$, refIdxLXB$_1$ and refIdxLXB$_2$, the prediction list utilization flags predFlagLXA$_0$, predFlagLXA$_1$, predFlagLXB$_0$, predFlagLXB$_1$ and predFlagLXB$_2$, and the motion vectors mvLXA$_0$, mvLXA$_1$, mvLXB$_0$, mvLXB$_1$ and mvLXB$_2$, with X being 0 or 1.
    - The derivation process for subblock-based temporal merging candidates as specified in clause 8.4.4.3 is invoked with the luma location ( xCb, yCb ), the luma coding block width cbWidth. the luma coding block height cbHeight , the availability flags availableFlagA$_0$, availableFlagA$_1$, availableFlagB$_0$, availableFlagB$_1$ the reference indices refIdxLXA$_0$, refIdxLX$_1$, refIdxLXB$_0$, refIdxLXB$_1$ the prediction list utilization flags predFlagLXA$_0$, predFlagLX$_1$, predFlagLXB$_0$, predFlagLXB$_1$, and the motion vectors mvLXA$_0$, mvLXA$_1$, mLXB$_0$, mvLXB$_1$ as inputs and the output being the availability flag availableFlagSbCol, the number of luma coding subblocks in horizontal direction numSbX and in vertical direction numSbY, the reference indices refIdxLXSbCol, the bi-prediction weight index gbiIdxSbCol[ xSbIdx ][ ySbIdx ] the luma motion vectors mvLXSbCol[ xSbIdx ][ ySbIdx ] and the prediction list utilization flags predFlagLXSbCol[ xSbIdx ][ ySbIdx ] with xSbIdx = 0..numSbX − 1, ySbIdx = 0..numSbY − 1 and X being 0 or 1.

TABLE 21-continued

2. When sps_affine_enabled_flag is equal to 1, the sample locations ( $xNbA_0$, $yNbA_0$ ),
( $xNbA_1$, $yNbA_1$ ), ( $xNbA_2$, $yNbA_2$ ), ( $xNbB_0$, $yNbB_0$ ), ( $xNbB_1$, $yNbB_1$ ), ( $xNbB_2$, $yNbB_2$ )
( $xNbB_3$, $yNbB_3$ ) and the variables numSbX and numSbY are derived as follows:

| | |
|---|---|
| ( $xA_0$, $yA_0$ ) = ( xCb − 1, yCb + cbHeight ) | (8-536) |
| ( $xA_1$, $yA_1$ ) = ( xCb − 1, yCb + cbHeight − 1 ) | (8-537) |
| ( $xA_2$, $yA_2$ ) = ( xCb − 1, yCb ) | (8-538) |
| ( $xB_0$, $yB_0$ ) = ( xCb − cbWidth, yCb − 1 ) | (8-539) |
| ( $xB_1$, $yB_1$ ) = ( xCb − cbWidth − 1, yCb − 1 ) | (8-540) |
| ( $xB_2$, $yB_2$ ) = (xCb − 1, yCb − 1 ) | (8-541) |
| ( $xB_3$, $yB_3$ ) = ( xCb, yCb − 1 ) | (8-542) |
| numSbX = cbWidth >> 2 | (8-543) |

TABLE 22

| | |
|---|---|
| numSbY = cbHeight >> 2 | (8-544) |

3. When sps_affine_enabled_flag is equal to 1 the variable availableFlagA is set equal to FALSE and
the following applies for ( $xNbA_k$, $yNbA_k$ ) from ( $xNbA_0$, $yNbA_0$ ) to ( $xNbA_1$, $yNbA_1$ )
   - The availability derivation process for a block as specified in clause 6.4.X [Ed. (BB):
     Neighbouring blocks availability checking process tbd] is invoked with the current luma location
     ( xCurr, yCurr ) set equal to ( xCb, yCb ) and the neighbouring luma location ( $xNbA_k$, $yNbA_k$ )
     as inputs, and the output is assigned to the block availability flag $availableA_k$.
   - When $availableA_k$ is equal to TRUE and MotionModelIdc[ $xNbA_k$ ][ $yNbA_k$ ] is greater than 0
     and availableFlagA is equal to FALSE, the following applies:
     - The variable availableFlagA is set equal to TRUE, MotionModelIdcA is set equal to
       MotionModelIdc[ $xNbA_k$ ][ $yNbA_k$ ], ( xNb, yNb ) is set equal to
       ( CbPosX[ $xNbA_k$ ][ $yNbA_k$ ], CbPosY[ $xNbA_k$ ][ $yNbA_k$ ] ), nbW is set equal to
       CbWidth[ $xNbA_k$ ][ $yNbA_k$ ], nbH is set equal to CbHeight[ $xNbA_k$ ][ $yNbA_k$ ], numCpMv
       is set equal to MotionModelIdc[ $xNbA_k$ ][ $yNbA_k$ ] + 1, and gbiIdxA is set equal to
       GbiIdx[ $xNbA_k$ ][ $yNbA_k$ ].
     - For X being replaced by either 0 or 1, the following applies:
       - When PredFlagLX[ $xNbA_k$ ][ $yNbA_k$ ] is equal to 1, the derivation process for luma affine
         control point motion vectors from a neighbouring block as specified in clause 8.4.4.5 is
         invoked with the luma coding block location ( xCb, yCb ). the luma coding block width
         and height ( cbWidth, cbHeight ), the neighbouring luma coding block location
         ( xNb, yNb ), the neighbouring luma coding block width and height (nbW, nbH) and the
         number of control point motion vectors numCpMv as input. the control point motion
         vector predictor candidates cpMvLXA[ cpIdx ] with cpIdx = 0 .. numCpMv − 1 as
         output.
       - The following assignments are made:

| | |
|---|---|
| predFlagLXA = PredFlagLX[ $xNbA_k$ ][ $yNbA_k$ ] | (8-545) |
| refIdxLXA = RefIdxLX[ xNbAk ][ yNbAk ] | (8-546) |

4. When sps_affine_enabled_flag is equal to 1, the variable availableFlagB is set equal to FALSE and
the following applies for ( $xNbB_k$, $yNbB_k$ ) from ( $xNbB_0$, $yNbB_0$ ) to ( $xNbB_2$, $yNbB_2$ ):
   - The availability derivation process for a block as specified in clause 6.4.X [Ed. (BB):
     Neighbouring blocks availability checking process tbd] is invoked with the current luma location
     ( xCurr, yCurr ) set equal to ( xCb, yCb ) and the neighbouring luma location ( $xNbB_k$, $yNbB_k$ )
     as inputs, and the output is assigned to the block availability flag $availableB_k$.
   - When $availableB_k$ is equal to TRUE and MotionModelIdc[ $xNbB_k$ ][ $yNbB_k$ ] is greater than 0
     and availableFlagB is equal to FALSE, the following applies:
     - The variable availableFlagB is set equal to TRUE, motionModelIdcB is set equal to
       MotionModelIdc[ $xNbB_k$ ][ $yNbB_k$ ], ( xNb, yNb ) is set equal to
       ( CbPosX[ xNbAB ][ $yNbB_k$ ], CbPosY[ $xNbB_k$ ][ $yNbB_k$ ] ). nbW is set equal to
       CbWidth[ $xNbB_k$ ][ $yNbB_k$ ]. nbH is set equal to CbHeight[ $xNbB_k$ ][ $yNbB_k$ ]. numCpMv
       is set equal to MotionModelIdc[ $xNbB_k$ ][ $yNbB_k$ ] − 1. and gbiIdxB is set equal to
       GbiIdx[ $xNbB_k$ ][ $yNbB_k$ ].
     - For X being replaced by either 0 or 1, the following applies:
       - When PredFlagLX[ $xNbB_k$ ][ $yNbB_k$ ] is equal to TRUE, the derivation process for luma
         affine control point motion vectors from a neighbouring block as specified in clause
         8.4.4.5 is invoked with the luma coding block location ( xCb, yCb ), the luma coding
         block width and height (cbWidth, cbHeight), the neighbouring luma coding block location
         ( xNb, yNb ), the neighbouring luma coding block width and height (nbW, nbH), and the
         number of control point motion vectors numCpMv as input, the control point motion
         vector predictor candidates cpMvLXB[ cpIdx ] with cpIdx = 0 .. numCpMv − 1 as output.
       - The following assignments are made:

| | |
|---|---|
| predFlagLXB = PredFlagLX[ $xNbB_k$ ][ $yNbB_k$ ] | (8-547) |

TABLE 23

| | |
|---|---|
| refIdxLXB = RefIdxLX[ $xNbB_k$ ][ $yNbB_k$ ] | (8-548) |

5. When sps_affine_enabled_flag is equal to 1, the derivation process for constructed affine control point
motion vector merging candidates as specified in clause 8.4.4.6 is invoked with the luma coding block
location ( xCb, yCb ), the luma coding block width and height (cbWidth, cbHeight) the availability
flags availableA₀, availableA₁, availableA₂, availableB₀, availableB₁, availableB₂, availableB₃ as

TABLE 23-continued inputs, and the availability flags availableFlagConstK, the reference indices refIdxLXConstK, prediction list utilization flags predFlagLXConstK. motion model indices motionModelIdcConstK and cpMvpLXConstK[ cpIdx ] with X being 0 or 1, K = 1..6. cpIdx = 0..2 as outputs and gbiIdxConstk is set equal to 0 with K = 1..6..

6. The initial subblock merging candidate list, subblockMergeCandList. is constructed as follows:

```
i = 0
if( availableFlagSbCol )
    subblockMergeCandList[ i++ ] = SbCol
if( availableFlagA && i < MaxNumSubblockMergeCand )
    subblockMergeCandList[ i++ ] = A
if( availableFlagB && i < MaxNumSubblockMergeCand )
    subblockMergeCandList[ i++ ] = B
if( availableFlagConst1 && i < MaxNumSubblockMergeCand )
    subblockMergeCandList[ i++ ] = Const1                               (8-549)
if( availableFlagConst2 && i < MaxNumSubblockMergeCand )
    subblockMergeCandList[ i++ ] = Const2
if( availableFlagConst3 && j < MaxNumSubblockMergeCand )
    subblockMergeCandList[ i++ ] = Const3
if( availableFlagConst4 && i < MaxNumSubblockMergeCand )
    subblockMergeCandList[ i++ ] = Const4
if( availableFlagConst5 && i < MaxNumSubblockMergeCand )
    subblockMergeCandList[ i++ ] = Const5
if( availableFlagConst6 && i < MaxNumSubblockMergeCand )
    subblockMergeCandList[ i++ ] = Const6
```

7. The variable numCurrMergeCand and numOrigMergeCand are set equal to the number of merging candidates in the subblockMergeCandList.
8. When numCurrMergeCand is less than MaxNumSubblockMergeCand, the following is repeated until numCurrMergeCand is equal to MaxNumSubblockMergeCand, with mvZero[0] and mvZero[1] both being equal to 0:
-- The reference indices, the prediction list utilization flags and the motion vectors of zeroCand$_m$ with m equal to ( numCurrMergeCand − numOrigMergeCand ) are derived as follows:

$refIdxL0ZeroCand_m = 0$   (8-550)
$predFlagL0ZeroCand_m = 1$   (8-551)
$cpMVL0ZeroCand_m[ 0 ] = mvZero$   (8-552)
$cpMvL0ZeroCand_m[ 1 ] = mZero$   (8-553)
$cpMVL0ZeroCand_m[ 2 ] = mvZero$   (8-554)
$refIdxL1ZeroCand_m = ( tile\_group\_type = = B ) ? 0 : -1$   (8-555)
$predFlagL1ZeroCand_m = (tile\_group\_type = = B ) ? 1 : 0$   (8-556)
$cpMvL1ZeroCand_m[ 0 ] = mvZero$   (8-557)
$cpMvL1ZeroCand_m[ 1 ] = mvZero$   (8-558)
$cpMvL1ZeroCand_m[ 2 ] = mvZero$   (8-559)
$motionModelIdcZeroCand_m = 1$   (8-560)
$gbiIdxZeroCand_m = 0$   (8-561)

-- The candidate zeroCand$_m$ within equal to ( numCurMergeCand − numOrigMergeCand ) is added at the end of subblockMergeCandList and numCurrMergeCand is incremented by 1 as follows:

TABLE 24

$subblockMergeCandList[ numCurrMergeCand+- ] = zeroCand_m$   (8-562)

The variables refIdxL0, refIdxL1, predFlagL0[ xSbIdx ][ ySbIdx ], predFlagL1[ xSbIdx ][ ySbIdx ] mvL0[ xSbIdx ][ ySbIdx ], mvL1[ xSbIdx ][ ySbIdx ]. mvCL0[ xSbIdx ][ ySbIdx ] and mvCL1[ xSbIdx ][ ySbIdx ] with xSbIdx = 0..numSbX − 1, ySbIdx = 0..numSbY − 1 are derived as follows:

-- If subblockMergeCandList[merge_subblock_idx[ xCb ][ yCb ] is equal to SbCol the bi-prediction weight index gbiIdx is set equal to 0 and the following applies with X being 0 or 1:

$refIdxLX = refIdxLXSbCol$   (8-563)

-- For xSbIdx = 0..numSbX − 1, ySbIdx = 0..numSbY − 1, the following applies:

$predFlagLX[ xSbIdx ][ ySbIdx ] = predFlagLXSbCol[ xSbIdx ][ ySbIdx ]$   (8-564)
$mvLX[ xSbIdx ][ ySbIdx ][ 0 ] = mvLXSbCol[ xSbIdx ][ ySbIdx ][ 0 ]$   (8-565)
$mvLX[ xSbIdx ][ ySbIdx ][ 1 ] = mvLXSbCol[ xSbIdx ][ ySbIdx ][ 1 ]$   (8-566)

-- When predFlagLX[ xSbIdx ][ ySbIdx ] is equal to 1, the derivation process for chroma motion vectors in clause 8.4.2.13 is invoked with mvLX[ xSbIdx ][ ySbIdx ] and refIdxLX as inputs, and the output being mvCLX[ xSbIdx ][ ySbIdx ].

-- The following assignment is made for x = xCb ..xCb + cbWidth − 1 and y = yCb..yCb + cbHeight − 1:

$MotionModelIdc[ x ][ y ] = 0$   (8-567)

-- Otherwise (subblockMergeCandList[ merge_subblock_ idx[ xCb ][ yCb ] ] is not equal to SbCol), the following applies with X being 0 or 1:

-- The following assignments are made with N being the candidate at position merge_subblock_idx[ xCb ][ yCb ] in the subblock merging candidate list subblockMergeCandList ( N = subblockMergeCandList[ merge_subblock_idx[ xCb ][ yCb ] ] ):

$refIdxLX = refIdxLXN$   (8-568)
$predFlagLX[ 0 ][ 0 ] = predFlagLXN$   (8-569)
$cpMvLX[ 0 ] = cpMvLXN[ 0 ]$   (8-570)
$cpMvLX[ 1 ] = cpMvLXN[ 1 ]$   (8-571)

TABLE 24-continued

```
       cpMvLX[ 2 ] = cpMvLXN[ 2 ]                                          (8-572)
       numCpMv = motionModelIdxN + 1                                       (8-573)
       gbiIdx = gbiIdxN                                                    (8-574)
-- For xSbIdx = 0..numSbX − 1, ySbIdx = 0..numSbY − 1, the following applies:
       predFlagLX[ xSbIdx ][ ySbIdx ] = predFlagLX[ 0 ][ 0 ]               (8-575 )
-- When predFlagLX[ 0 ][ 0 ] is equal to 1, the derivation process for motion vector arrays from affine
   control point motion vectors as specified in subclause 8.4.4.9 is invoked with the luma coding block
   location ( xCb, yCb ). the luma coding block width cbWidth, the luma prediction block height
   cbHeight, the number of control point motion vectors numCpMv. the control point motion vectors
   cpMvLX[ cpIdx ] with cpIdx being 0..2. and the number of luma coding subblocks in horizontal
   direction numSbX and in vertical direction numSbY as inputs, the luma subblock motion vector array
   mvLX[ xSbIdx ][ ySbIdx ] and the chroma subblock motion vector array mvCLX[ xSbIdx ][ ySbIdx ]
   with xSbIdx = 0..numSbX − 1, ySbIdx = 0 .. numSbY − 1 as outputs
-- The following assignment is made for x = xCb ..xCb + cbWidth − 1 and
   y = yCb..yb + cbHeight − 1:
       MotionModelIdc[ x ][ y ] = numCpMv − 1                              (8-576)
```

TABLE 25

8.4.4.3 Derivation process for subblock-based temporal merging candidates
Inputs to this process are:
-- a luma location ( xCb, yCb ) of the top-left sample of the current luma coding block relative to the top-
   left luma sample of the current picture.
-- a variable cbWidth specifying the width of the current coding block in luma samples.
-- a variable cbHeight specifying the height of the current coding block in luma samples.
-- the availability flags availableFlagA$_0$, availableFlagA$_1$, availableFlagB$_0$, and availableFlagB$_1$ of the
   neighbouring coding units.
-- the reference indices refIdxLXA$_0$, refIdxLXA$_1$, refIdxLXB$_0$, and refIdxLXB$_1$ of the neighbouring coding
   units.
-- the prediction list utilization flags predFlagLXA$_0$, predFlagLXA$_1$, predFlagLXB$_0$, and predFlagLXB$_1$ of
   the neighbouring coding units.
-- the motion vectors in 1/16 fractional-sample accuracy mvLXA$_0$, mvLXA$_1$, mvLXB$_0$, and mvLXB$_1$ of the
   neighbouring coding units
Outputs of this process are:
-- the availability flag availableFlagSbCol.
-- the number of luma coding subblocks in horizontal direction numSbX and in vertical direction numSbY,
   the reference indices refIdxL0SbCol and refIdxL1SbCol,
-- the luma motion vectors in 1/16 fractional-sample accuracy mvL0SbCol[ xSbIdx ][ ySbIdx ] and
   mvL1SbCol[ xSbIdx ][ ySbIdx ] with xSbIdx = 0..numSbX − 1, ySbIdx = 0 .. numSbY − 1,
-- the bi-prediction weight index gbiIdxSbCol[ xSbIdx ][ ySbIdx ] the prediction list utilization flags
   predFlagL0SbCol[ xSbIdx ][ ySbIdx ] and predFlagL1SbCol[ xSbIdx ][ ySbIdx ] with
   xSbIdx = 0..numSbX − 1, ySbIdx = 0 .. numSbY − 1.
The availability flag availableFlagSbCol is derived as follows.
-- If one or more of the following conditions is true, availableFlagSbCol is set equal to 0.
       -- tile_group_temporal_mvp_enable flag is equal to 0.
       -- sps_sbtmvp_flag is equal to 0.
       -- cbWidth is less than 8.
       -- cbHeight is less than 8.
-- Otherwise, the following ordered steps apply:
   1.  The Location ( xCtb, yCtb ) of the top-left sample of the luma coding tree block that contains the
       current coding block and the location ( xCtr, yCtr ) of the below-right center sample of the current
       luma coding block are derived as follows.
       xCtb = ( xCb >> CtuLog2Size ) << CtuLog2Size                        (8-577)
       yCtb = ( yCb >> CtuLog2Size ) << CtuLog2Size                        (8-578)
       xCtr = xCb + ( cbWidth / 2 )                                        (8-579)
       yCtr = yCb + ( cbHeight / 2 )                                       (8-580)
   2.  The luma location ( xColCtrCb, yColCtrb ) is set equal to the top-left sample of the collocated luma
       coding block covering the location given by ( xCtr, yCtr ) inside ColPic relative to the top-left luma
       sample of the collocated picture specified by ColPic.
   3.  The derivation process for subblock-based temporal merging base motion data as specified in
       clause 8.4.4.4 is invoked with the location ( xCtb, yCtb ), the location ( xColCtrCb, yColCtrCb ),
       the availability flags availableFlagA$_0$, availableFlagA$_1$, availableFlagB$_0$ and availableFlagB$_1$, and

TABLE 26 the prediction list utilization flags predFlagLXA$_0$, predFlagLXA$_1$, predFlagLXB$_0$ and
predFlagLXB$_1$, and the reference indices refIdxLXA$_0$, refIdxLXA$_1$, refxLXB$_0$ and refIdxLXB$_1$.
and the motion vectors mvLXA$_0$, mvLXA$_1$, mvLXB$_0$ and mvLXB$_1$, with X being 0 and 1 as inputs
and the motion vectors ctrMvLX, the prediction list utilization flags ctrPredFlagLX and the reference
indices ctrRefIdxLX of the collocated block, with X being 0 and 1, the bi-prediction weight index
ctrgbiIdx, and the temporal motion vector tempMV as outputs.

TABLE 26-continued

4. The variable availableFlagSbCol is derived as follows:
   -- If both ctrPredFlagL0 and ctrPredFlagL1 are equal to 0. availableFlagSbCol is set equal to 0.
   -- Otherwise, availableFlagSbCol is set equal to 1.

When availableFlagSbCol is equal to 1, the following applies:
-- The variables numSbX, numSbY, sbWidth, sbHeight and refIdxLXSbCol are derived as follows:

$$numSbx = cbWidth >> 3 \quad (8\text{-}581)$$
$$numSbY = cbHeight >> 3 \quad (8\text{-}582)$$
$$sbWidth = cbWidth / numSbX \quad (8\text{-}583)$$
$$sbHeight = cbHeight / numSbY \quad (8\text{-}584)$$
$$refIdxLXSbCol = 0 \quad (8\text{-}585)$$

-- For xSbIdx=0..numSbX − 1 and ySbIdx = 0 .. numSbY − 1, the motion vectors mvLXSbCol[ xSbIdx ][ ySbIdx ] and prediction list utilization flags predFlagLXSbCol[ xSbIdx ][ ySbIdx ] are derived as follows:
   -- The luma location ( xSb, ySb ) specifying the top-left sample of the current coding subblock relative to the top-left luma sample of the current picture is derived as follows:

$$xSb = xCb + xSbIdx * sbWidth \quad (8\text{-}586)$$
$$ySb = yCb + ySbIdx * sbHeight \quad (8\text{-}587)$$

-- The location ( xColSb, yColSb ) of the collocated subblock inside ColPic is derived as follows:

$$xColSb = Clip3(\ xCtb,$$
$$Min(\ CurPicWidthInSamplesY - 1,\ xCtb + (\ 1 << CtbLog2SizeY\ ) + 3\ ), (8\text{-}588)$$
$$xSb + (\ tempMv[0] >> 4\ )\ )$$
$$yColSb = Clip3(\ yCtb,$$
$$Min(\ CurPicHeightInSamplesY - 1,\ yCtb + (\ 1 << CtbLog2SizeY\ ) - 1\ ), (8\text{-}589)$$
$$ySb + (\ tempMv[\ i\ ] >> 4\ )\ )$$

-- The variable currCb specifies the luma coding block covering the current coding subblock inside the current picture.
   -- The variable colCb specifies the luma coding block covering the modified location given by ( ( xColSb >> 3 ) << 3. ( yColSb >> 3 ) << 3 ) inside the ColPic.
   -- The luma location ( xColCb, yColCb ) is set equal to the top-left sample of the collocated luma coding block specified by colCb relative to the top-left luma sample of the collocated picture specified by ColPic.
   -- The gbiIdxSbCol[ xSbIdx ][ ySbIdx ] is set equal to gbiIdxcolCb.
   -- The derivation process for collocated motion vectors as specified in clause 8.4.2.12 is invoked with currCb, colCb, ( xColCb, yColCb ), refIdxL0 set equal to 0 and sbFlag set equal to 1 as inputs and the output being assigned to the motion vector of the subblock mvL0SbCol[ xSbIdx ][ ySbIdx ] and availableFlagL0SbCol.

TABLE 27

-- The derivation process for collocated motion vectors as specified in clause 8.4.2.12 is invoked with currCb, colCb, ( xColb, yColCb ), refIdxL1 set equal to 0 and sbFlag set equal to 1 as inputs and the output being assigned to the motion vector of the subblock mvL1SbCol[ xSbIdx ][ ySbIdx ] and availableFlagL1SbCol
-- When availableFlagL0SbCol and availableFlagL1SbCol are both equal to 0, the following applies for X being 0 and 1:

$$mvLXSbCol[\ xSbIdx\ ][\ ySbIdx\ ] = ctrMvLX \quad (8\text{-}590)$$
$$predFlagLXSbCol[\ xSbIdx\ ][\ ySbIdx\ ] = ctrPredFlagLX \quad (8\text{-}591)$$
$$gbiIdxSbCol[\ xSbIdx\ ][\ ySbIdx\ ] = ctrgbiIdx \quad (x\text{-}xxx)$$

8.4.4.4 Derivation process for subblock-based temporal merging base motion data
Inputs to this process are:
-- the location ( xCtb, yCtb ) of the top-left sample of the luma coding tree block that contains the current coding block.
-- the location ( xColCtrCb, yColCtrCb ) of the top-left sample of the collocated luma coding block that covers the below-right center sample.
-- the availability flags availableFlag$A_0$, availableFlag$A_1$, availableFlag$B_0$, and availableFlag$B_1$ of the neighbouring coding units.
-- the reference indices refIdxLX$A_0$, refIdxLX$A_1$, refIdxLX$B_0$, and refIdxLX$B_1$ of the neighbouring coding units.
-- the prediction list utilization flags predFlagLX$A_0$, predFlagLX$A_1$, predFlagLX$B_0$, and predFlagLX$B_1$ of the neighbouring coding units.
-- the motion vectors in 1/16 fractional-sample accuracy mvLX$A_0$, mvLX$A_1$, mvLX$B_0$, and mvLX$B_1$ of the neighbouring coding units.

Outputs of this process are:
-- the motion vectors ctrMvL0 and ctrMvL1.
-- the prediction list utilization flags ctrPredFlagL0 and ctrPredFlagL1.
-- the reference indices ctrRefIxL0 and ctrRefIdxL1.
-- the temporal motion vector tempMV.
-- The bi-prediction weight index ctrgbiIdx.
   The variable tempMv is set as follows:

$$tempMv[\ 0\ ] = 0 \quad (8\text{-}592)$$
$$tempMv[\ 1\ ] = 0 \quad (8\text{-}593)$$

TABLE 27-continued

The variable currPic specifies the current picture.
The variable availableFlagN is set equal to FALSE, and the following applies:
-- When availableFlagA is equal to 1, the following applies:
  -- availableFlagN is set equal to TRUE,
  -- refIdxLXN is set equal to refdxLXA$_0$ and mvLXN is set equal to mLXA$_0$, for X being replaced by 0 and 1.
-- When availableFlagN is equal to FALSE and availableFlagLB$_1$ is equal to 1, the following applies:
  -- availableFlagN is set equal to TRUE,

TABLE 28

-- refIdxLXN is set equal to refIdxLXB$_0$ and mvLXN is set equal to mvLXB$_0$, for X being replaced by 0 and 1.
-- When availableFlagN is equal to FALSE and availableFlagB$_0$ is equal to 1, the following applies:
  -- availableFlagN is set equal to TRUE.
  -- refIdxLXN is set equal to refIdxLXB$_1$ and mvLXN is set equal to mvLXB$_1$, for X being replaced by 0 and 1.
-- When availableFlagN is equal to FALSE and availableFlagAg$_0$ is equal to 1, the following applies:
  -- availableFlagN is set equal to TRUE.
  -- refIdxLXN is set equal to refIdxLXA$_1$ and mvLXN is set equal to mvLX$_1$, for X being replaced by 0 and 1.
When availableFlagN is equal to TRUE, the following applies:
-- If all of the following conditions are true, tempMV is set equal to mvL1N:
  -- predFlagL1N is equal to 1.
  -- DiffPicOrderCrn(ColPic, RefPicList1[ refIdxL1N]) is equal to 0.
  -- DiffPicOrderCnt(aPic, currPic ) is less than or equal to 0 for every picture aPic in every reference picture list of the current tile group.
  -- tile_group_type is equal to B.
  -- collocated_from_l0_flag is equal to 0.
-- Otherwise if all of the following conditions are true, tempMV is set equal to mvL0N:
  -- predFlagL0N is equal to 1.
  -- DiffPicOrderCnt(ColPic, RefPicList0[refIdxL0N]) is equal to 0.
The location ( xColCb, yColCb ) of the collocated block inside ColPic is derived as follows.
    xColCb = Clip3( xCtb,
      Min( CurPicWidthInSamplesY − 1, xCtb − ( 1 << CtbLog2SizeY ) + 3 ),(8-59
    4)
      xColCtrCb + ( tempMv[0] >> 4 ) )
    yColCb = Clip3( yCtb,
      Min( CurPicHeightInSamplesY − 1, yCtb + ( 1 << CtbLog2SizeY ) − 1 (8-5
    95)
      yColCtrCb + (tempMv[1] >> 4 ) )
The array colPredMode is set equal to the prediction mode array CuPredMode of the collocated picture specified by ColPic.
The motion vectors ctrMvL0 and ctrMvL1, the prediction list utilization flags ctrPredFlagL0 and ctrPredFlagL1, and the reference indices ctrRefIdxL0 and ctrRefIdxL1 are derived as follows:
-- If colPredMode[xColCb][yColCb] is equal to MODE_INTER, the following applies:
  -- The variable currCb specifies the luma coding block covering ( xCtrCb, yCtrCb ) inside the current picture.
  -- The variable colCb specifies the luma coding block covering the modified location given by ( ( xColCb >> 3 ) << 3, ( yColCb >> 3 ) << 3 ) inside the ColPic.
  -- The luma location ( xColCb, yColCb ) is set equal to the top-left sample of the collocated luma coding block specified by colCb relative to the top-left luma sample of the collocated picture specified by ColPic.
  -- The gbiIdxSbCol is set equal to ctrgbiIdx.

TABLE 29

-- The derivation process for temporal motion vector prediction in subclause 8.4.2.12 is invoked with currCb, colCb, (xColCb, yColCb), centerRefIdxL0, and sbFlag set equal to 1 as inputs and the output being assigned to ctrMvL0 and crtPredFlagL0.
-- The derivation process for temporal motion vector prediction in subclause 8.4.2.12 is invoked with currCb, colCb, (xColCb, yColCb), centerRefIdxL1, and sbFlag set equal to 1 as inputs and the output being assigned to ctrMvL1 and ctrPredFlagL1.
-- Otherwise, the following applies:
    ctrPredFlagL0 = 0                                             (8-596)
    ctrPredFlagL1 = 0                                             (8-597)

Tables 21 to 29 may indicate three types of procedures. The procedures may be continuously performed in order of the tables. The procedures may include the procedure (8.4.4.2) of deriving a motion vector and a reference index in a sub-block merge mode, the procedure (8.4.4.3) of deriving a sub-block-based temporal merge candidate or the procedure (8.4.4.4) of deriving base motion information for a sub-block-based temporal merge.

Referring to Tables 21 to 29, gbiIdx may indicate a bi-prediction weight index. gbiIdxSbCol may indicate a bi-prediction weight index for a sub-block-based temporal merge candidate (e.g., a sub-block-based temporal motion vector candidate within a merge candidate list). In the procedure (8.4.4.3) of deriving base motion information for a sub-block-based temporal merge, the gbiIdxSbCol may be derived as gbiIdxcolCb. Alternatively, in the procedure (8.4.4.3) of deriving base motion information for a sub-block-based temporal merge, the gbiIdxSbCol may be derived as ctrgbiIdx depending on a condition (e.g., when both availableFlagL0SbCol and availableFlagL1SbCol are 0). In the procedure (8.4.4.4) of deriving base motion information for a sub-block-based temporal merge, the ctrgbiIdx may be derived as gbiIdxSbCol. That is, a weight index of a sub-block-based temporal motion vector candidate may be derived as a weight index of each sub-block unit. When a sub-block is not available, a weight index of a sub-block-based temporal motion vector candidate may be derived as a temporal center block. For example, the temporal center block may indicate a col block or a sub-block or sample located at the center of the col block. Specifically, the temporal center block may indicate a sub-block or sample located at the bottom-right side among center four sub-blocks or samples of the col block.

Meanwhile, according to another embodiment of this document, when a motion vector candidate for the merge mode is constructed, a weight index of a pair-wise candidate may be induced or derived. In other words, the pair-wise candidate may also be included in a merge candidate list. In this case, a weight index for a weighted average of the pair-wise candidates may be derived. For example, the pair-wise candidate may be derived based on other merge candidates within the merge candidate list. When the pair-wise candidate uses bi-prediction, a weight index for a weighted average may be derived. That is, when an inter prediction type is bi-prediction, weight index information for a pair-wise candidate within a merge candidate list may be induced or derived.

For example, the pair-wise candidate may be derived based on two merge candidates (e.g., cand0 and cand1) within the merge candidate list. If the pair-wise candidate uses bi-prediction, a weight index of the pair-wise candidate may be derived based on weight indices of the merge candidate cand0 and/or merge candidate cand1. In other words, the weight index of the pair-wise candidate may be derived based on the weight index of any one merge candidate (e.g., merge candidate cand0 or merge candidate cand1) of merge candidates used to derive the pair-wise candidate. Alternatively, for example, the weight index of the pair-wise candidate may be derived as a specific ratio of the weight indices of the merge candidates (e.g., merge candidate cand0 and merge candidate cand1) used to derive the pair-wise candidate. In this case, the specific ratio may be 1:1, but may be derived as a different ratio. For example, the specific ratio may be determined as a default ratio or a default value, but the present disclosure is not limited thereto. The default ratio may be defined as a 1:1 ratio, but may be defined as a different ratio. Alternatively, for example, if the weight index of the pair-wise candidate is derived based on a specific ratio of weight indices of merge candidates, as described above, the same result as that the weight index of the pair-wise candidate is derived as a weight index of any one of the merge candidates may be derived depending on a specific ratio.

Meanwhile, according to another embodiment of this document, if a motion vector candidate for a merge mode of a sub-block unit is constructed, when a (representative) motion vector candidate uses bi-prediction, a weight index for a weighted average may be induced or derived. That is, if an inter prediction type is bi-prediction, weight index information for a candidate (or an affine merge candidate) within an affine merge candidate list or a sub-block merge candidate list may be induced or derived.

For example, in the case of a constructed affine merge candidate of affine merge candidate, a CP0, CP1, CP2 or RB candidate may be derived based on motion information of a block (or a spatial neighboring block) spatially adjacent to a current block or a block (or a temporal neighboring block) temporally adjacent to the current block, and a candidate for deriving the affine model by using an MVF may be indicated. For example, the CP0 may indicate a control point located at the top-left sample location of a current block. The CP1 may indicate a control point located at the top-right sample location of a current block. The CP2 may indicate a control point located at the bottom-left sample location of the current block. Furthermore, the RB may indicate the control point located at the bottom-right sample location of the current block.

For example, if a (representative) motion vector candidate is a constructed affine merge candidate (or a (current) affine merge candidate)), a weight index of the (current) affine merge candidate may be derived as a weight index of a block determined as a motion vector at the CP0 among CP0 candidate blocks. Alternatively, the weight index of the (current) affine merge candidate may be derived as a weight index of a block determined as a motion vector at the CP1 among CP1 candidate blocks. Alternatively, the weight index of the (current) affine merge candidate may be derived as a weight index of a block determined as a motion vector at the CP2 among CP2 candidate blocks. Alternatively, the weight index of the (current) affine merge candidate may be derived as a weight index of a block determined as a motion vector in the RB among RB candidate blocks. Alternatively, the weight index of the (current) affine merge candidate may be derived based on at least one of a weight index of a block determined as a motion vector at the CP0, a weight index of a block determined as a motion vector at the CP1, a weight index of a block determined as a motion vector at the CP2 or a weight index of a block determined as a motion vector in the RB. For example, if a weight index of a (current) affine merge candidate is derived based on a plurality of weight indices, a specific ratio of the plurality of weight indices may be used. In this case, the specific ratio may be 1:1, 1:1:1 or 1:1:1:1, but may be derived as a different ratio. For example, the specific ratio may be determined as a default ratio or a default value, but the present disclosure is not limited thereto. The default ratio may be defined as a 1:1 ratio, but may be defined as a different ratio.

Alternatively, for example, the weight index of the (current) affine merge candidate may be derived as a weight index of a candidate having the highest frequency of occurrence among weight indices of candidates. For example, a weight index having the greatest redundancy, among a weight index of a candidate block determined as a motion vector at the CP0 among CP0 candidate blocks, a weight index of a candidate block determined as a motion vector at the CP1 among CP1 candidate blocks, a weight index of a candidate block determined as a motion vector at the CP2 among CP2 candidate blocks and/or a weight index of a candidate block determined as a motion vector in the RB among RB candidate blocks, may be derived as the weight index of the (current) affine merge candidate.

For example, the CP0 and the CP1 may be used as the control points, the CP0, the CP1 and the CP2 may be used as control points, and the RB may not be used as a control point. However, for example, if an RB candidate of an affine block (a block to be coded in the affine prediction mode) is to be used, a method of inducing or deriving a weight index in the temporal candidate block described in the aforementioned embodiments may be used. For example, the CP0, the CP1 or the CP2 may derive candidates based on a spatial neighboring block of a current block, and may determine a block to be used as a motion vector (i.e., CPMV1, CPMV2 or CPMV3) at the CP0, the CP1 or the CP2 among the candidates. Alternatively, for example, the RB may derive candidates based on a temporal neighboring block of a current block, and may determine a block to be used as a motion vector in the RB among the candidates.

Alternatively, for example, if a (representative) motion vector candidate is an SbTMVP (or ATMVP) candidate, a weight index of the SbTMVP candidate may be derived as a weight index of a left neighboring block of a current block. That is, if a candidate derived as SbTMVP (or ATMVP) uses bi-prediction, a weight index of the left neighboring block of the current block may be derived as a weight index for the sub-block-based merge mode. That is, if an inter prediction type is bi-prediction, weight index information for an SbTMVP candidate within an affine merge candidate list or a sub-block merge candidate list may be induced or derived.

For example, an SbTMVP candidate may derive a col block based on a left block (or a left neighboring block) spatially adjacent to a current block, so that a weight index of the left neighboring block may be said to be trusted. Accordingly, a weight index of the SbTMVP candidate may be derived as the weight index of the left neighboring block.

Figure 10:
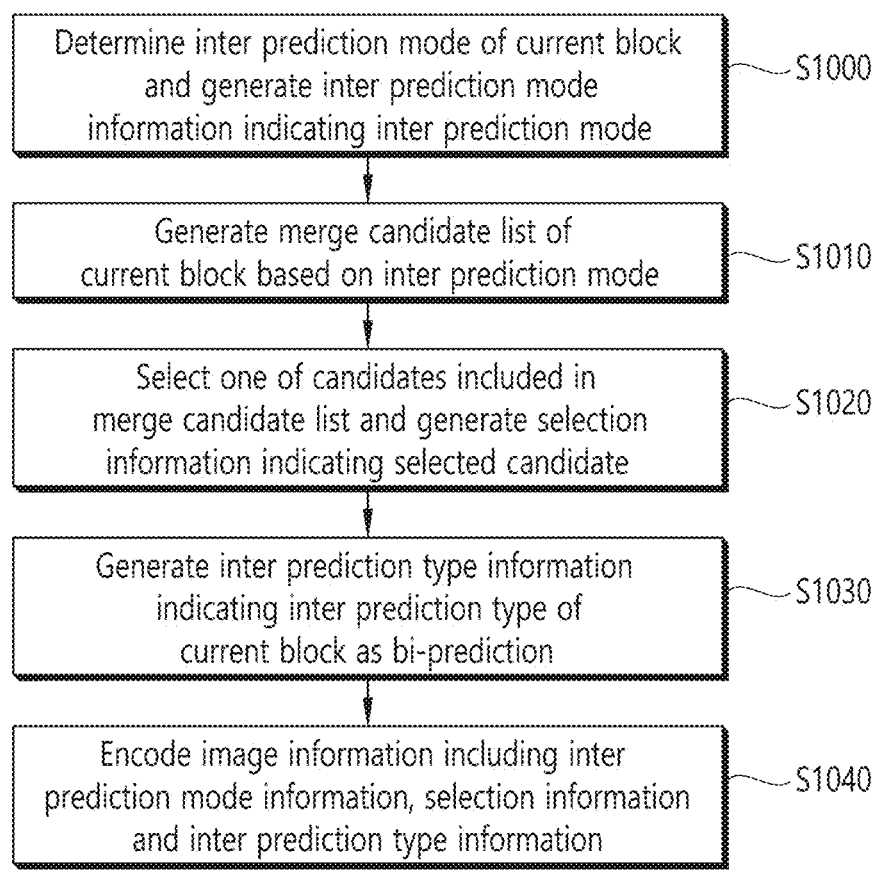
FIGS. 10 and 11 schematically illustrate examples of a video/image encoding method and related components according to an embodiment(s) of this document.
Figure 11:
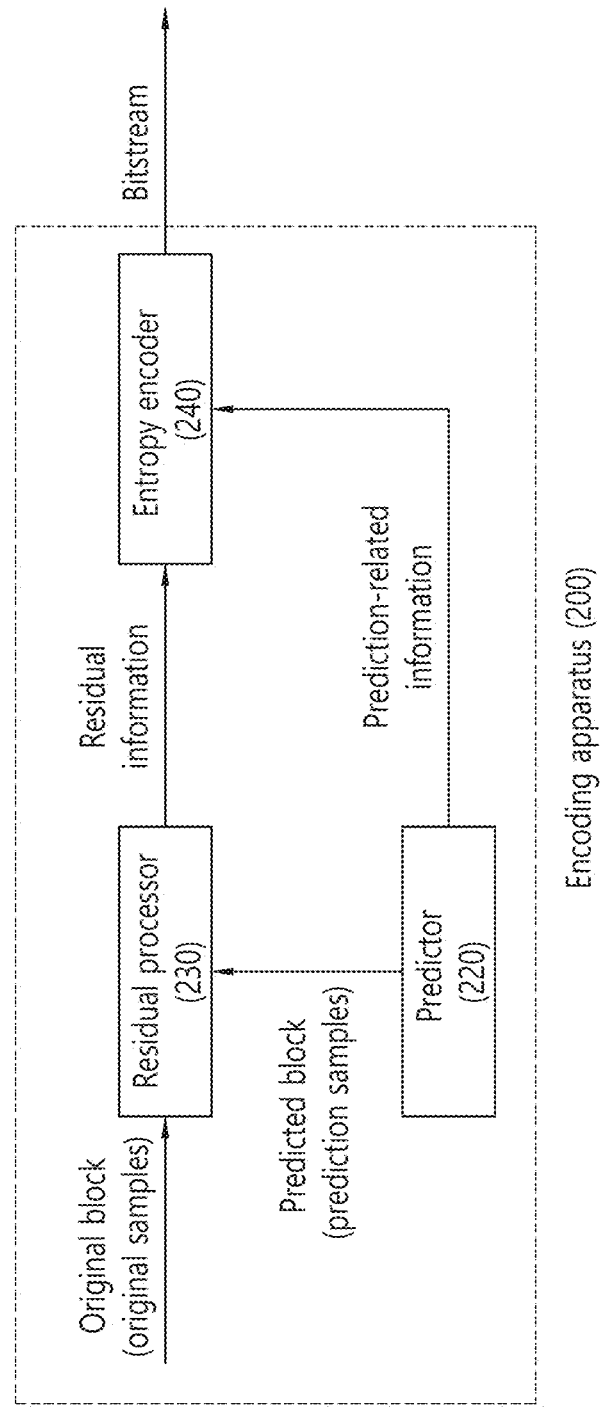

FIGS. 10 and 11 schematically illustrate examples of a video/image encoding method and related components according to an embodiment(s) of this document.

The method disclosed in FIG. 10 may be performed by the encoding apparatus disclosed in FIG. 2 or 11. Specifically, for example, S1000 to S1030 in FIG. 10 may be performed by a predictor 220 of an encoding apparatus 200 of FIG. 11. S1040 in FIG. 10 may be performed by an entropy encoder 240 of the encoding apparatus 200 of FIG. 11. Furthermore, although not illustrated in FIG. 10, prediction samples or prediction-related information may be derived by the predictor 220 of the encoding apparatus 200 of FIG. 11. Residual information may be derived from original samples or prediction samples by a residual processor 230 of the encoding apparatus 200. A bitstream may be generated from residual information or prediction-related information by the entropy encoder 240 of the encoding apparatus 200. The method disclosed in FIG. 10 may include embodiments described in this document.

Referring to FIG. 10, the encoding apparatus may determine an inter prediction mode of a current block, and may generate inter prediction mode information indicating the inter prediction mode (S1000). For example, the encoding apparatus may determine a merge mode, an affine (merge) mode or a sub-block merge mode as an inter prediction mode to be applied to the current block, and may generate inter prediction mode information indicating the determined mode.

The encoding apparatus may generate a merge candidate list of the current block based on the inter prediction mode (S1010). For example, the encoding apparatus may generate the merge candidate list based on the determined inter prediction mode. In this case, when the determined inter prediction mode is an affine merge mode or a sub-block merge mode, the merge candidate list may be called an affine merge candidate list or a sub-block merge candidate list, etc., but may be simply called a merge candidate list.

For example, a candidate may be inserted into the merge candidate list until the number of candidates within the merge candidate list becomes a maximum number of candidates. In this case, the candidate may indicate a candidate or a candidate block for deriving motion information (or motion vector) of the current block. For example, the candidate block may be derived through search for a neighboring block of the current block. For example, the neighboring block may include a spatial neighboring block and/or temporal neighboring block of the current block. A spatial neighboring block may be preferentially searched for and may be derived as a (spatial merge) candidate. Thereafter, a temporal neighboring block may be searched for and may be derived as a (temporal merge) candidate. The derived candidates may be inserted into the merge candidate list. For example, even after the candidates are inserted, when the number of candidates within the merge candidate list is smaller than a maximum number of candidates, an additional candidate may be inserted into the merge candidate list. For example, the additional candidate may include at least one of a history based merge candidate(s), a pair-wise average merge candidate(s), an ATMVP, a combined bi-predictive merge candidate (when a current slice/slice of a tile group/tile group type is the B type) and/or a zero vector merge candidate.

Alternatively, for example, a candidate may be inserted into the affine merge candidate list until the number of candidates within the affine merge candidate list becomes a maximum number of candidates. In this case, the candidate may include a control point motion vector (CPMV) of a current block. Alternatively, the candidate may indicate a candidate or candidate block for deriving the CPMV. The CPMV may indicate a motion vector at the control point (CP) of the current block. For example, the CP may be two, three or four, and may be located at least some of a top-left (or top-left corner), a top-right (or top-right corner), a bottom-left (or bottom-left corner) or bottom-right (or bottom-right corner) of the current block. Only one CP may be present at each location.

For example, the candidate may be derived through search for a neighboring block of a current block (or a neighboring block of a CP of a current block). For example, an affine merge candidate list may include at least one of an inherited affine merge candidate, a constructed affine merge candidate or a zero motion vector candidate. For example, an inherited affine merge candidate may be first inserted into the affine merge candidate list. Thereafter, a constructed affine merge candidate may be inserted into the affine merge candidate list. Furthermore, although even a constructed affine merge candidate has been inserted into the affine merge candidate list, when the number of candidates within the affine merge candidate list is smaller than a maximum number of candidates, the remainder may be filled with a zero motion vector candidate. In this case, the zero motion vector candidate may be called a zero vector. For example, the affine merge candidate list may be a list according to an affine merge mode in which a motion vector is derived in a sample unit, but may be a list according to an affine merge mode in which a motion vector is derived in a sub-block unit. In this case, the affine merge candidate list may be called a sub-block merge candidate list. The sub-block merge candidate list may also include a candidate derived as an SbTMVP (or SbTMVP candidate). For example, if an SbTMVP candidate is included in a sub-block merge candidate list, the SbTMVP candidate may be located at a location ahead of an inherited affine merge candidate and a constructed affine merge candidate within the sub-block merge candidate list.

The encoding apparatus may select one of candidates included in the merge candidate list, and may generate selection information indicating a selected candidate (S1020). For example, the merge candidate list may include at least some of a spatial merge candidate, a temporal merge candidate, a pair-wise candidate or a zero vector candidate, and may select one of the candidates for inter prediction of the current block. Alternatively, for example, a sub-block merge candidate list may include at least some of an inherited affine merge candidate, a constructed affine merge candidate, an SbTMVP candidate or a zero vector candidate, and may select one of the candidates for inter prediction of the current block.

For example, the selection information may include index information indicating a selected candidate within the merge candidate list. For example, the selection information may be called merge index information or sub-block merge index information.

The encoding apparatus may generate inter prediction type information indicating an inter prediction type of the current block as bi-prediction (S1030). For example, the inter prediction type of the current block may be determined as bi-prediction among L0 prediction, L1 prediction or bi-prediction. Inter prediction type information indicating the determined type may be generated. In this case, the L0 prediction may indicate prediction based on a reference picture list 0. The L1 prediction may indicate prediction based on a reference picture list 1. The bi-prediction may indicate prediction based on the reference picture list 0 and the reference picture list 1. For example, the encoding apparatus may generate the inter prediction type information based on the inter prediction type. For example, the inter prediction type information may include an inter_pred_idc syntax element.

The encoding apparatus may encode image information, including the inter prediction mode information, the selection information and the inter prediction type information (S1040). For example, the image information may be called video information. The image information may include various types of information according to the aforementioned embodiment(s) of this document. For example, the image information may include at least some of prediction-related information or residual-related information. For example, the prediction-related information may include at least some of inter prediction mode information, selection information and inter prediction type information. For example, the encoding apparatus may generate a bitstream or encoded information by encoding the image information including all or some of the pieces of information (or syntax elements). Alternatively, the encoding apparatus may output the image information in a bitstream form. Furthermore, the bitstream or the encoded information may be transmitted to the decoding apparatus over a network or through a storage medium.

Although not illustrated in FIG. 10, for example, the encoding apparatus may generate prediction samples of a current block. Alternatively, for example, the encoding apparatus may generate prediction samples of a current block based on a selected candidate. Alternatively, for example, the encoding apparatus may derive motion information based on a selected candidate, and may generate prediction samples of a current block based on the motion information. For example, the encoding apparatus may generate L0 prediction samples and L1 prediction samples according to bi-prediction, and may generate prediction samples of a current block based on the L0 prediction samples and the L1 prediction samples. In this case, the encoding apparatus may generate prediction samples of the current block from the L0 prediction samples and the L1 prediction samples by using weight index information (or weight information) for the bi-prediction. In this case, the weight information may be indicated based on the weight index information.

In other words, for example, the encoding apparatus may generate the L0 prediction samples and L1 prediction samples of the current block based on the selected candidate. For example, if an inter prediction type of a current block has been determined as bi-prediction, a reference picture list 0 and a reference picture list 1 may be used for the prediction of the current block. For example, the L0 prediction samples may indicate prediction samples of the current block derived based on the reference picture list 0. The L1 prediction samples may indicate prediction samples of the current block derived based on the reference picture list 1.

For example, the candidates may include a spatial merge candidate. For example, if the selected candidate is a spatial merge candidate, L0 motion information and L1 motion information may be derived based on the spatial merge candidate. The L0 prediction samples and the L1 prediction samples may be generated based on the L0 motion information and the L1 motion information.

For example, the candidates may include a temporal merge candidate. For example, if the selected candidate is a temporal merge candidate, L0 motion information and L1 motion information may be derived based on the temporal merge candidate. The L0 prediction samples and the L1 prediction samples may be generated based on the L0 motion information and the L1 motion information.

For example, the candidates may include a pair-wise candidate. For example, if the selected candidate is a pair-wise candidate, L0 motion information and L1 motion information may be derived based on the pair-wise candidate. The L0 prediction samples and the L1 prediction samples may be generated based on the L0 motion information and the L1 motion information. For example, the pair-wise candidate may be derived based on different two candidates among candidates included in the merge candidate list.

Alternatively, for example, the merge candidate list may be a sub-block merge candidate list. An affine merge candidate, a sub-block merge candidate or an SbTMVP candidate may also be selected. In this case, the affine merge candidate of a sub-block unit may be called a sub-block merge candidate.

For example, the candidates may include a sub-block merge candidate. For example, if a selected candidate is a sub-block merge candidate, L0 motion information and L1 motion information may be derived based on the sub-block merge candidate. The L0 prediction samples and the L1 prediction samples may be generated based on the L0 motion information and the L1 motion information. For example, the sub-block merge candidate may include control point motion vectors (CPMVs). The L0 prediction samples and the L1 prediction samples may be generated by performing prediction in a sub-block unit based on the CPMVs.

In this case, a CPMV may be indicated based on one of neighboring blocks of a control point (CP) of a current block. For example, the CP may be two, three or four, and may be located at least some of a top-left (or top-left corner), a top-right (or top-right corner), a bottom-left (or bottom-left corner) or a bottom-right (or bottom-right corner) of a current block. Only one CP may be present at each location.

For example, the CP may be a CP0 located at the top-left of the current block. In this case, neighboring blocks may include a top-left corner neighboring block, left neighboring block adjacent to the bottom side of the top-left corner neighboring block and a top neighboring block adjacent to the right side of the top-left corner neighboring block of the current block. Alternatively, the neighboring blocks may include the $A_2$ block, the $B_2$ block or the $B_3$ block in FIG. 8.

Alternatively, for example, the CP may be a CP1 located at a top-right of the current block. In this case, the neighboring blocks may include a top-right corner neighboring block of the current block and a top neighboring block adjacent to the left side of the top-right corner neighboring block. Alternatively, the neighboring blocks may include the $B_0$ block or the $B_1$ block in FIG. 8.

Alternatively, for example, the CP may be a CP2 located at the bottom-left of the current block. In this case, the neighboring blocks may include a bottom-left corner neighboring block of the current block and a left neighboring block adjacent to the top of the bottom-left corner neighboring block. Alternatively, the neighboring blocks may include the $A_0$ block or the $A_1$ block in FIG. 8.

Alternatively, for example, the CP may be a CP3 located at the bottom-right of the current block. In this case, the CP3 may be called an RB. In this case, the neighboring blocks may include a col block of the current block or a bottom-right corner neighboring block of the col block. In this case, the col block may include a collocated block of the current block within a reference picture different from a current picture where the current block is located. Alternatively, the neighboring block may include the T block in FIG. 8.

Alternatively, for example, the candidates may include an SbTMVP candidate. For example, if a selected candidate is an SbTMVP candidate, L0 motion information and L1 motion information may be derived based on a left neighboring block of the current block. The L0 prediction samples and the L1 prediction samples may be generated based on the L0 motion information and the L1 motion information. For example, the L0 prediction samples and the L1 prediction samples may be generated by performing prediction in a sub-block unit.

For example, L0 motion information may include an L0 reference picture index, an L0 motion vector, etc. L1 motion information may include an L1 reference picture index, an L1 motion vector, etc. The L0 reference picture index may include information indicating a reference picture in a reference picture list 0. The L1 reference picture index may include information indicating a reference picture in a reference picture list 1.

For example, the encoding apparatus may generate prediction samples of a current block based on L0 prediction samples, L1 prediction samples and weight information. For example, the weight information may be indicated based on weight index information. The weight index information may indicate weight index information for bi-prediction. For example, the weight information may include information for a weighted average of L0 prediction samples or L1 prediction samples. That is, the weight index information may indicate index information for a weight used for the weighted average. The weight index information may be generated in a procedure of generating prediction samples based on the weighted average. For example, the weight index information may include information indicating any one of three or five weights. For example, the weighted average may indicate a weighted average in a Bi-prediction with CU-level weight (BCW) or a bi-prediction with weighted average (BWA).

For example, the candidates may include a temporal merge candidate. The weight index information may be indicated as 0. That is, weight index information for the temporal merge candidate may be indicated as 0. In this case, weight index information of 0 may indicate that weights in respective reference directions (i.e., an L0 prediction direction and an L1 prediction direction in bi-prediction) are the same. Alternatively, for example, the candidates may include a temporal merge candidate. The weight index information may be indicated based on weight index information of a col block. That is, weight index information for a temporal merge candidate may be indicated based on weight index information of a col block. In this case, the col block may include a collocated block of the current block within a reference picture different from a current picture where the current block is located.

Alternatively, for example, the candidates may include a pair-wise candidate. The weight index information may be indicated as weight index information of one of different two candidates within a merge candidate list used to derive the pair-wise candidate. That is, the weight index information for the pair-wise candidate may be indicated as weight index information of one of different two candidates within a merge candidate list used to derive the pair-wise candidate. Alternatively, for example, the weight index information may be indicated based on weight index information of the two candidates.

Alternatively, for example, the merge candidate list may be a sub-block merge candidate list. An affine merge candidate, a sub-block merge candidate or an SbTMVP candidate may be selected. In this case, the affine merge candidate of a sub-block unit may be called a sub-block merge candidate.

For example, the candidates may include a sub-block merge candidate. The weight index information may be indicated based on weight index information of a specific block among neighboring blocks of the CP of a current block. That is, the weight index information for the sub-block merge candidate may be indicated based on weight index information of a specific block among neighboring blocks of the CP of the current block. In this case, the specific block may be a block used to derive a CPMV for the CP. Alternatively, the specific block may be a block having an MV used as a CPMV among neighboring blocks of the CP of a current block.

For example, the CP may be a CP0 located at the top-left of the current block. In this case, the weight index information may be indicated based on weight index information of a top-left corner neighboring block of the current block, weight index information of a left neighboring block adjacent to the bottom side of the top-left corner neighboring block or weight index information of a top neighboring block adjacent to the right side of the top-left corner neighboring block. Alternatively, the weight index information may be indicated based on weight index information of the $A_2$ block, weight index information of the $B_2$ block or weight index information of the $B_3$ block in FIG. 8.

Alternatively, for example, the CP may be a CP1 located at the top-right of the current block. In this case, the weight index information may be indicated based on weight index information of a top-right corner neighboring block of the current block or weight index information of a top neighboring block adjacent to the left side of the top-right corner neighboring block. Alternatively, the weight index information may be indicated based on weight index information of the $B_0$ block or weight index information of the $B_1$ block in FIG. 8.

Alternatively, for example, the CP may be a CP2 located at the bottom-left of the current block. In this case, the weight index information may be indicated based on weight index information of a bottom-left corner neighboring block of the current block or weight index information of a left neighboring block adjacent to the top of the bottom-left corner neighboring block. Alternatively, the weight index information may be indicated based on weight index information of the $A_0$ block or weight index information of the $A_1$ block in FIG. 8.

Alternatively, for example, the CP may be a CP3 located at the bottom-right of the current block. In this case, the CP3 may be called an RB. In this case, the weight index information may be indicated based on weight index information of a col block of the current block or weight index information of a bottom-right corner neighboring block of the col block. In this case, the col block may include a collocated block of the current block within a reference picture different from a current picture where the current block is located. Alternatively, the weight index information may be indicated based on weight index information of the T block in FIG. 8.

Alternatively, for example, the CP may include a plurality of CPs. For example, the plurality of CPs may include at least two of a CP0, a CP1, a CP2 or an RB. In this case, the weight index information may be indicated based on weight index information that is most redundant among pieces of weight index information of specific blocks used to derive the respective CPMVs. Alternatively, the weight index information may be indicated based on weight index information having the highest frequency of occurrence among the pieces of weight index information of the specific blocks. That is, the weight index information may be indicated based on weight index information of specific blocks used to derive the CPMVs of a plurality of CPs, respectively.

Alternatively, for example, the candidates may include an SbTMVP candidate. The weight index information may be indicated based on weight index information of a left neighboring block of the current block. That is, the weight index information for the SbTMVP candidate may be indicated based on weight index information of the left neighboring block. Alternatively, for example, the candidates may include an SbTMVP candidate. The weight index information may be indicated as 0. That is, the weight index information for the SbTMVP candidate may be indicated as 0. In this case, the weight index information of 0 may indicate that weights in respective reference directions (i.e., an L0 prediction direction and an L1 prediction direction in bi-prediction) are the same. Alternatively, for example, the candidates may include an SbTMVP candidate. The weight index information may be indicated based on weight index information of a center block within a col block. That is, the weight index information for the SbTMVP candidate may be indicated based on weight index information of a center block within a col block. In this case, the col block may include a collocated block of the current block within a reference picture different from a current picture where the current block is located. The center block may include a bottom-right sub-block among four sub-blocks located at the center of the col block. Alternatively, for example, the candidates may include an SbTMVP candidate. The weight index information may be indicated based on weight index information of each of sub-blocks of a col block. That is, the weight index information for the SbTMVP candidate may be indicated based on weight index information of each of sub-blocks of a col block.

Alternatively, although not illustrated in FIG. 10, for example, the encoding apparatus may derive residual samples the prediction samples and original samples. In this case, residual-related information may be derived based on the residual samples. The residual samples may be derived based on the residual-related information. Reconstruction samples may be generated based on the residual samples and the prediction samples. A reconstruction block and a reconstruction picture may be derived based on the reconstruction samples. Alternatively, for example, the encoding apparatus may encode image information including residual-related information or prediction-related information.

For example, the encoding apparatus may generate a bitstream or encoded information by encoding image information including some or all of pieces of the aforementioned information (or syntax elements). Alternatively, the encoding apparatus may output the image information in a bitstream form. Furthermore, the bitstream or the encoded information may be transmitted to the decoding apparatus over a network or through a storage medium. Alternatively, the bitstream or the encoded information may be stored in a computer-readable storage medium. The bitstream or the encoded information may be generated by the aforementioned image encoding method.

Figure 12:
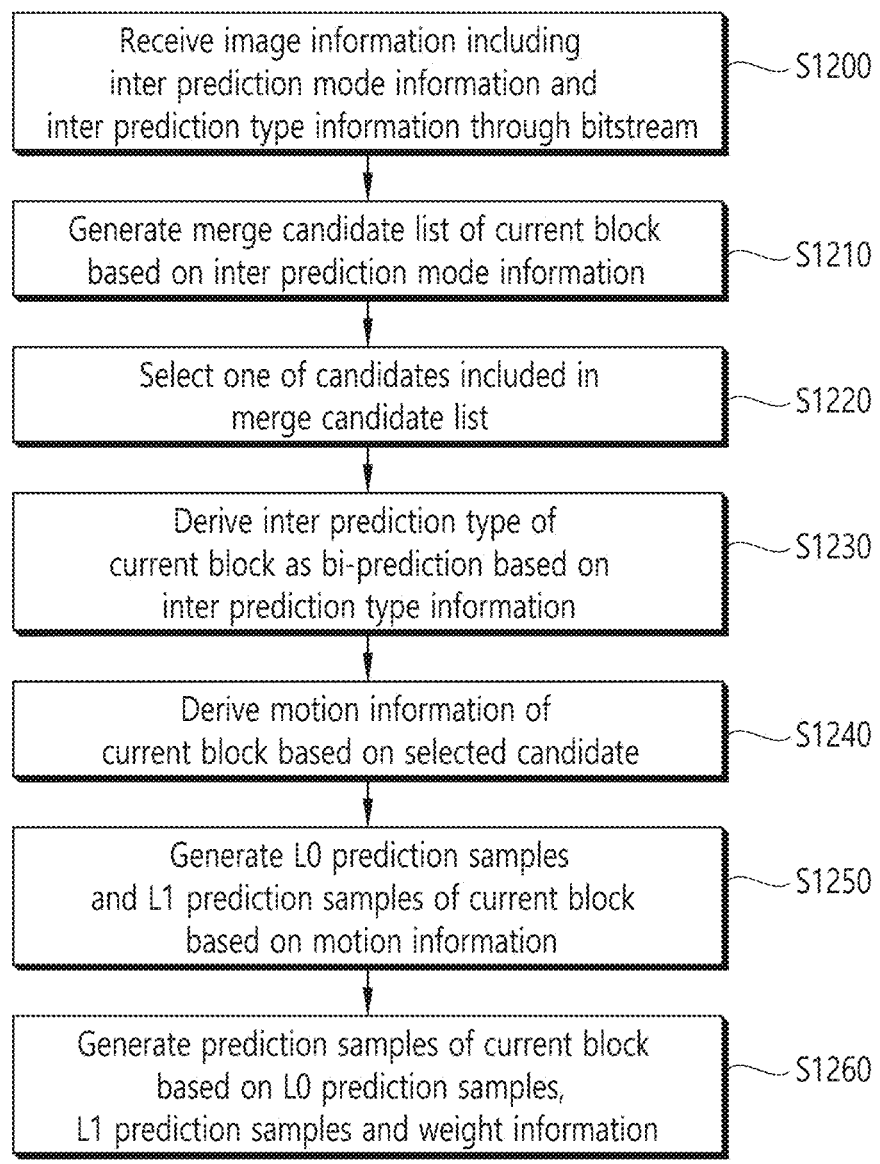
FIGS. 12 and 13 schematically illustrate examples of an image/video decoding method and related components according to an embodiment(s) of this document.
Figure 13:
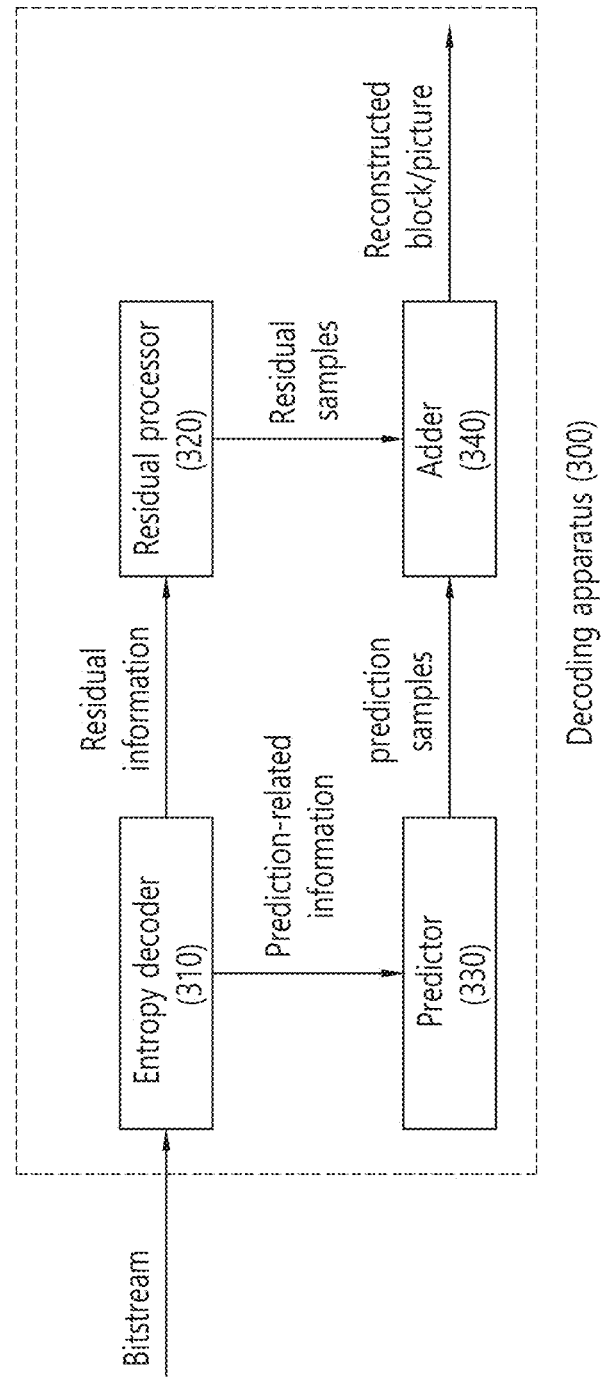

FIGS. 12 and 13 schematically illustrate examples of an image/video decoding method and related components according to an embodiment(s) of this document.

The method disclosed in FIG. 12 may be performed by the decoding apparatus disclosed in FIG. 3 or 13. Specifically, for example, S1200 in FIG. 12 may be performed by an entropy decoder 310 of a decoding apparatus 300 in FIG. 13. S1210 to S1260 in FIG. 12 may be performed by a predictor 330 of the decoding apparatus 300 in FIG. 13. Furthermore, although not illustrated in FIG. 12, prediction-related information or residual information may be derived from a bitstream by the entropy decoder 310 of the decoding apparatus 300 in FIG. 13. Residual samples may be derived from the residual information by a residual processor 320 of the decoding apparatus 300. Prediction samples may be derived from the prediction-related information by the predictor 330 of the decoding apparatus 300. A reconstruction block or a reconstruction picture may be derived from the residual samples or the prediction samples by an adder 340 of the decoding apparatus 300. The method disclosed in FIG. 12 may include embodiments described in this document.

Referring to FIG. 12, the decoding apparatus may receive image information including inter prediction mode information and inter prediction type information through a bitstream (S1200). For example, the image information may be called video information. The image information may include various types of information according to the aforementioned embodiment(s) of this document. For example, the image information may include at least some of prediction-related information or residual-related information.

For example, the prediction-related information may include inter prediction mode information or inter prediction type information. For example, the inter prediction mode information may include information indicating at least some of various inter prediction modes. For example, various modes, such as a merge mode, a skip mode, a motion vector prediction (MVP) mode, an affine mode, a sub-block merge mode or a merge with MVD (MMVD) mode, may be used. Furthermore, a decoder side motion vector refinement (DMVR) mode, an adaptive motion vector resolution (AMVR) mode, a Bi-prediction with CU-level weight (BCW), a bi-directional optical flow (BDOF), etc. may be used as additional modes additionally or instead. For example, the inter prediction type information may include an inter_pred_idc syntax element. Alternatively, the inter prediction type information may include information indicating any one of L0 prediction, L1 prediction or bi-prediction.

The decoding apparatus may generate a merge candidate list of a current block based on the inter prediction mode information (S1210). For example, the decoding apparatus may determine an inter prediction mode of the current block as a merge mode, an affine (merge) mode or a sub-block merge mode based on the inter prediction mode information, and may generate a merge candidate list based on the determined inter prediction mode. In this case, when the inter prediction mode is determined as an affine merge mode or a sub-block merge mode, the merge candidate list may be called an affine merge candidate list or a sub-block merge candidate list, but may be simply called a merge candidate list.

For example, a candidate may be inserted into a merge candidate list until the number of candidates within the merge candidate list becomes a maximum number of candidates. In this case, the candidate may indicate a candidate or a candidate block for deriving motion information (or motion vector) of a current block. For example, the candidate block may be derived through search for a neighboring block of the current block. For example, the neighboring block may include a spatial neighboring block and/or temporal neighboring block of the current block. A spatial neighboring block may be preferentially searched for and may be derived as a (spatial merge) candidate. Thereafter, a temporal neighboring block may be searched for and may be derived as a (temporal merge) candidate. The derived candidates may be inserted into the merge candidate list. For example, even after the candidates are inserted, when the number of candidates within the merge candidate list is smaller than a maximum number of candidates, an additional candidate may be inserted into the merge candidate list. For example, the additional candidate may include at least one of a history based merge candidate(s), a pair-wise average merge candidate(s), an ATMVP, a combined bi-predictive merge candidate (when a current slice/slice of a tile group/tile group type is a B type) and/or a zero vector merge candidate.

Alternatively, for example, a candidate may be inserted into an affine merge candidate list until the number of candidates within an affine merge candidate list becomes a maximum number of candidates. In this case, the candidate may include a control point motion vector (CPMV) of a current block. Alternatively, the candidate may indicate a candidate or a candidate block for deriving the CPMV. The CPMV may indicate a motion vector at the control point (CP) of the current block. For example, the CP may be two, three or four, and may be located at least some of a top-left (or top-left corner), a top-right (or top-right corner), a bottom-left (or bottom-left corner) or bottom-right (or bottom-right corner) of the current block. Only one CP may be present at each location.

For example, the candidate block may be derived through search for a neighboring block of a current block (or a neighboring block of a CP of a current block). For example, an affine merge candidate list may include at least one of an inherited affine merge candidate, a constructed affine merge candidate or a zero motion vector candidate. For example, an inherited affine merge candidate may be first inserted into the affine merge candidate list. Thereafter, a constructed affine merge candidate may be inserted into the affine merge candidate list. Furthermore, although even a constructed affine merge candidate has been inserted into the affine merge candidate list, when the number of candidates within the affine merge candidate list is smaller than a maximum number of candidates, the remainder may be filled with a zero motion vector candidate. In this case, the zero motion vector candidate may be called a zero vector. For example, the affine merge candidate list may be a list according to an affine merge mode in which a motion vector is derived in a sample unit, but may be a list according to an affine merge mode in which a motion vector is derived in a sub-block unit. In this case, the affine merge candidate list may be called a sub-block merge candidate list. The sub-block merge candidate list may also include a candidate derived as an SbTMVP (or SbTMVP candidate). For example, if an SbTMVP candidate is included in a sub-block merge candidate list, the SbTMVP candidate may be located at a location ahead of an inherited affine merge candidate and a constructed affine merge candidate within the sub-block merge candidate list.

The decoding apparatus may select one of candidates included in the merge candidate list (S1220). For example, the merge candidate list may include at least some of a spatial merge candidate, a temporal merge candidate, a pair-wise candidate or a zero vector candidate. One of such candidates may be selected for inter prediction of a current block. Alternatively, for example, a sub-block merge candidate list may include at least some of an inherited affine merge candidate, a constructed affine merge candidate, an SbTMVP candidate or a zero vector candidate. One of such candidates may be selected for inter prediction of a current block. For example, the selected candidate may be selected in the merge candidate list based on selection information. For example, the selection information may include index information indicating the selected candidate within the merge candidate list. For example, the selection information may be called merge index information or sub-block merge index information. For example, the selection information may be included in the image information. Alternatively, the selection information may be included in the inter prediction mode information.

The decoding apparatus may derive an inter prediction type of the current block as bi-prediction based on the inter prediction type information (S1230). For example, the inter prediction type of the current block may be derived as bi-prediction among L0 prediction, L1 prediction or bi-prediction based on the inter prediction type information. In this case, the L0 prediction may indicate prediction based on a reference picture list 0. The L1 prediction may indicate prediction based on a reference picture list 1. The bi-prediction may indicate prediction based on the reference picture list 0 and the reference picture list 1. For example, the inter prediction type information may include an inter_pred_idc syntax element.

The decoding apparatus may derive motion information of the current block based on the selected candidate (S1240). For example, the decoding apparatus may derive L0 motion information and L1 motion information based on the selected candidate as the inter prediction type is derived as bi-prediction. For example, the L0 motion information may include an L0 reference picture index, an L0 motion vector, etc. The L1 motion information may include an L1 reference picture index, an L1 motion vector, etc. The L0 reference picture index may include information indicating a reference picture in the reference picture list 0. The L1 reference picture index may include information indicating a reference picture in the reference picture list 1.

The decoding apparatus may generate L0 prediction samples and L1 prediction samples of the current block based on the motion information (S1250). For example, when an inter prediction type of the current block is derived as bi-prediction, a reference picture list 0 and a reference picture list 1 may be used for the prediction of the current block. For example, the L0 prediction samples may indicate prediction samples of the current block derived based on the reference picture list 0. The L1 prediction samples may indicate prediction samples of the current block derived based on the reference picture list 1.

For example, the candidates may include a spatial merge candidate. For example, when the selected candidate is a spatial merge candidate, L0 motion information and L1 motion information may be derived based on the spatial merge candidate. The L0 prediction samples and the L1 prediction samples may be generated based on the L0 motion information and the L1 motion information.

For example, the candidates may include a temporal merge candidate. For example, when the selected candidate is the temporal merge candidate, L0 motion information and L1 motion information may be derived based on the temporal merge candidate. The L0 prediction samples and the L1 prediction samples may be generated based on the L0 motion information and the L1 motion information.

For example, the candidates may include a pair-wise candidate. For example, when the selected candidate is a pair-wise candidate, L0 motion information and L1 motion information may be derived based on the pair-wise candidate. The L0 prediction samples and the L1 prediction samples may be generated based on the L0 motion information and L1 motion information. For example, the pair-wise candidate may be derived based on different two candidates included in candidates included in the merge candidate list.

Alternatively, for example, the merge candidate list may be a sub-block merge candidate list. An affine merge candidate, a sub-block merge candidate or an SbTMVP candidate may be selected. In this case, the affine merge candidate of a sub-block unit may be called a sub-block merge candidate.

For example, the candidates may include a sub-block merge candidate. For example, when the selected candidate is the sub-block merge candidate, L0 motion information and L1 motion information may be derived based on the sub-block merge candidate. The L0 prediction samples and the L1 prediction samples may be generated based on the L0 motion information and the L1 motion information. For example, the sub-block merge candidate may include control point motion vectors (CPMVs). The L0 prediction samples and the L1 prediction samples may be generated by performing prediction in a sub-block unit based on the CPMVs.

In this case, the CPMV may be derived based on one of neighboring blocks of the control point (CP) of a current block. For example, the CP may be two, three or four, and may be located at least some of a top-left (or top-left corner), top-right (or top-right corner), bottom-left (or bottom-left corner) or bottom-right (or bottom-right corner) of the current block. Only one CP may be present at each location.

For example, the CP may be a CP0 located at the top-left of the current block. In this case, the neighboring blocks may include a top-left corner neighboring block of the current block, a left neighboring block adjacent to the bottom side of the top-left corner neighboring block and a top neighboring block adjacent to the right side of the top-left corner neighboring block. Alternatively, the neighboring blocks may include the $A_2$ block, the $B_2$ block or the $B_3$ block in FIG. 8.

Alternatively, for example, the CP may be a CP1 located at the top-right of the current block. In this case, the neighboring blocks may include a top-right corner neighboring block of the current block and a top neighboring block adjacent to the left side of the top-right corner neighboring block. Alternatively, the neighboring blocks may include the $B_0$ block or the $B_1$ block in FIG. 8.

Alternatively, for example, the CP may be a CP2 located at the bottom-left of the current block. In this case, the neighboring blocks may include a bottom-left corner neighboring block of the current block and the left neighboring block adjacent to the top of the bottom-left corner neighboring block. Alternatively, the neighboring blocks may include the $A_0$ block or the $A_1$ block in FIG. 8.

Alternatively, for example, the CP may be a CP3 located at the bottom-right of the current block. In this case, the CP3 may be called an RB. In this case, the neighboring blocks may include a col block of the current block or a bottom-right corner neighboring block of the col block. In this case, the col block may include a collocated block of the current block within a reference picture different from a current picture where the current block is located. Alternatively, the neighboring block may include the T block in FIG. 8.

Alternatively, for example, the candidates may include an SbTMVP candidate. For example, when the selected candidate is the SbTMVP candidate, L0 motion information and L1 motion information may be derived based on a left neighboring block of the current block. The L0 prediction samples and the L1 prediction samples may be generated based on the L0 motion information and the L1 motion information. For example, the L0 prediction samples and the L1 prediction samples may be generated by performing prediction in a sub-block unit.

The decoding apparatus may generate prediction samples of the current block based on the L0 prediction samples, the L1 prediction samples and weight information (S1260). For example, the weight information may be derived based on weight index information. For example, the weight information may include information for a weighted average of the L0 prediction samples or the L1 prediction samples. That is, the weight index information may indicate index information for a weight used for the weighted average. The weighted average may be performed based on the weight index information. For example, the weight index information may include information indicating any one of three or five weights. For example, the weighted average may indicate a weighted average in a Bi-prediction with CU-level weight (BCW) or a bi-prediction with weighted average (BWA).

For example, the candidates may include a temporal merge candidate. The weight index information may be derived as 0. That is, the weight index information for the temporal merge candidate may be derived as 0. In this case, the weight index information of 0 may indicate that weights in respective reference directions (i.e., an L0 prediction direction and an L1 prediction direction in bi-prediction) are the same. Alternatively, for example, the candidates may include a temporal merge candidate. The weight index information may be derived based on weight index information of a col block. That is, the weight index information for the temporal merge candidate may be derived based on the weight index information of the col block. In this case, the col block may include a collocated block of the current block within a reference picture different from a current picture where the current block is located.

Alternatively, for example, the candidates may include a pair-wise candidate. The weight index information may be derived as weight index information of one of different two candidates within a merge candidate list used to derive the pair-wise candidate. That is, the weight index information for the pair-wise candidate may be derived as weight index information of one of different two candidates within a merge candidate list used to derive the pair-wise candidate. Alternatively, for example, the weight index information may be derived based on weight index information of the two candidates.

Alternatively, for example, the merge candidate list may be a sub-block merge candidate list. An affine merge candidate, a sub-block merge candidate or an SbTMVP candidate may be selected. In this case, the affine merge candidate of a sub-block unit may be called a sub-block merge candidate.

For example, the candidates may include a sub-block merge candidate. The weight index information may be derived based on weight index information of a specific block among neighboring blocks of the CP of a current block. That is, the weight index information for the sub-block merge candidate may be derived based on weight index information of a specific block among neighboring blocks of the CP of the current block. In this case, the specific block may be a block used to derive a CPMV for the CP. Alternatively, the specific block may be a block having an MV used as a CPMV among neighboring blocks of the CP of a current block.

For example, the CP may be a CP0 located at the top-left of the current block. In this case, the weight index information may be derived based on weight index information of a top-left corner neighboring block of the current block, weight index information of a left neighboring block adjacent to the bottom side of the top-left corner neighboring block or weight index information of a top neighboring block adjacent to the right side of the top-left corner neighboring block. Alternatively, the weight index information may be derived based on weight index information of the $A_2$ block, weight index information of the $B_2$ block or weight index information of the $B_3$ block in FIG. 8.

Alternatively, for example, the CP may be a CP1 located at the top-right of the current block. In this case, the weight index information may be derived based on weight index information of a top-right corner neighboring block of the current block or weight index information of a top neighboring block adjacent to the left side of the top-right corner neighboring block. Alternatively, the weight index information may be derived based on weight index information of the $B_0$ block or weight index information of the $B_1$ block in FIG. 8.

Alternatively, for example, the CP may be a CP2 located at the bottom-left of the current block. In this case, the weight index information may be derived based on weight index information of a bottom-left corner neighboring block of the current block or weight index information of a left neighboring block adjacent to the top of the bottom-left corner neighboring block. Alternatively, the weight index information may be derived based on weight index information of the $A_0$ block or weight index information of the $A_1$ block in FIG. 8.

Alternatively, for example, the CP may be a CP3 located at the bottom-right of the current block. In this case, the CP3 may be called an RB. In this case, the weight index information may be derived based on weight index information of a col block of the current block or weight index information of a bottom-right corner neighboring block of the col block. In this case, the col block may include a collocated block of the current block within a reference picture different from a current picture where the current block is located. Alternatively, the weight index information may be derived based on weight index information of the T block in FIG. 8.

Alternatively, for example, the CP may include a plurality of CPs. For example, the plurality of CPs may include at least two of a CP0, a CP1, a CP2 or an RB. In this case, the weight index information may be derived based on weight index information that is most redundant among pieces of weight index information of specific blocks used to derive the respective CPMVs. Alternatively, the weight index information may be derived based on weight index information having the highest frequency of occurrence among the pieces of weight index information of the specific blocks. That is, the weight index information may be derived based on weight index information of specific blocks used to derive a CPMV of each of a plurality of CPs.

Alternatively, for example, the candidates may include an SbTMVP candidate. The weight index information may be derived based on weight index information of a left neighboring block of the current block. That is, the weight index information for the SbTMVP candidate may be derived based on weight index information of the left neighboring block. Alternatively, for example, the candidates may include an SbTMVP candidate. The weight index information may be derived as 0. That is, the weight index information for the SbTMVP candidate may be derived as 0. In this case, the weight index information of 0 may indicate that weights in respective reference direction (i.e., an L0 prediction direction and an L1 prediction direction in bi-prediction) are the same. Alternatively, for example, the candidates may include an SbTMVP candidate. The weight index information may be derived based on weight index information of a center block within a col block. That is, the weight index information for the SbTMVP candidate may be derived based on weight index information of a center block within a col block. In this case, the col block may include a collocated block of the current block within a reference picture different from a current picture where the current block is located. The center block may include a bottom-right sub-block among four sub-blocks located at the center of the col block. Alternatively, for example, the candidates may include an SbTMVP candidate. The weight index information may be derived based on weight index information of each of sub-blocks of a col block. That is, the weight index information for the SbTMVP candidate may be derived based on weight index information of each of the sub-blocks of the col block.

Although not illustrated in FIG. 12, for example, the decoding apparatus may derive residual samples based on residual-related information included in the image information. Furthermore, the decoding apparatus may generate reconstruction samples based on the prediction samples and the residual samples. A reconstruction block and a reconstruction picture may be derived based on the reconstruction samples.

For example, the decoding apparatus may obtain image information, including all or some of the pieces of aforementioned information (or syntax elements) by decoding a bitstream or encoded information. Furthermore, the bitstream or the encoded information may be stored in a computer-readable storage medium, and may cause the aforementioned decoding method to be performed.

In the aforementioned embodiment, the methods have been described based on the flowcharts in the form of a series of steps or blocks, but a corresponding embodiment is not limited to the order of steps. Any step may occur as a step and order different from that described above or may occur simultaneously with a different step and order. Furthermore, those skilled in the art may understand that the steps illustrated in the flowchart are not exclusive and another step may be included or one or more step of a flowchart may be deleted without affecting the scope of the embodiments of this document.

A method according to the aforementioned embodiments of this document may be implemented in a software form, and the encoding apparatus and/or the decoding apparatus according to this document may be included in an apparatus for performing image processing, for example, TV, a computer, a smartphone, a set-top box or a display device.

In this document, when embodiments are implemented in a software form, the aforementioned method be implemented as a module (process, function, etc.) for performing the aforementioned function. The module may be stored in the memory and executed by the processor. The memory may be placed inside or outside the processor and connected to the processor by various well-known means. The processor may include application-specific integrated circuits (ASICs), other chipsets, logic circuits and/or data processing devices. The memory may include read-only memory (ROM), random access memory (RAM), flash memory, memory cards, storage media and/or other storage devices. That is, the embodiments described in this document may be implemented and performed on a processor, a micro processor, a controller or a chip. For example, the function units illustrated in the drawings may be implemented and performed on a computer, a processor, a micro processor, a controller or a chip. In this case, information (e.g., information on instructions) or an algorithm for such implementation may be stored in a digital storage medium.

Furthermore, the decoding apparatus and the encoding apparatus to which an embodiment(s) of this document is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a virtual reality (VR) device, an augmented reality (AR) device, a video telephony device, transportation means terminal (e.g., a vehicle (including autonomous vehicle) terminal, an aircraft terminal, and a vessel terminal), and a medical video device, and may be used to process a video signal or a data signal. For example, the over the top (OTT) video device may include a game console, a Blu-ray player, Internet access TV, a home theater system, a smartphone, a tablet PC, and a digital video recorder (DVR).

Furthermore, the processing method to which an embodiment(s) of the present disclosure is applied may be produced in the form of a program executed by a computer, and may be stored in a computer-readable recording medium. Multimedia data having a data structure according to an embodiment(s) of the present disclosure may also be stored in a computer-readable recording medium. The computer-readable recording medium includes all types of storage devices in which computer-readable data is stored. The computer-readable recording medium may include a Blu-ray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment(s) of the present disclosure may be implemented as a computer program product using a program code. The program code may be performed by a computer according to an embodiment of the present disclosure. The program code may be stored on a carrier readable by a computer.

Figure 14:
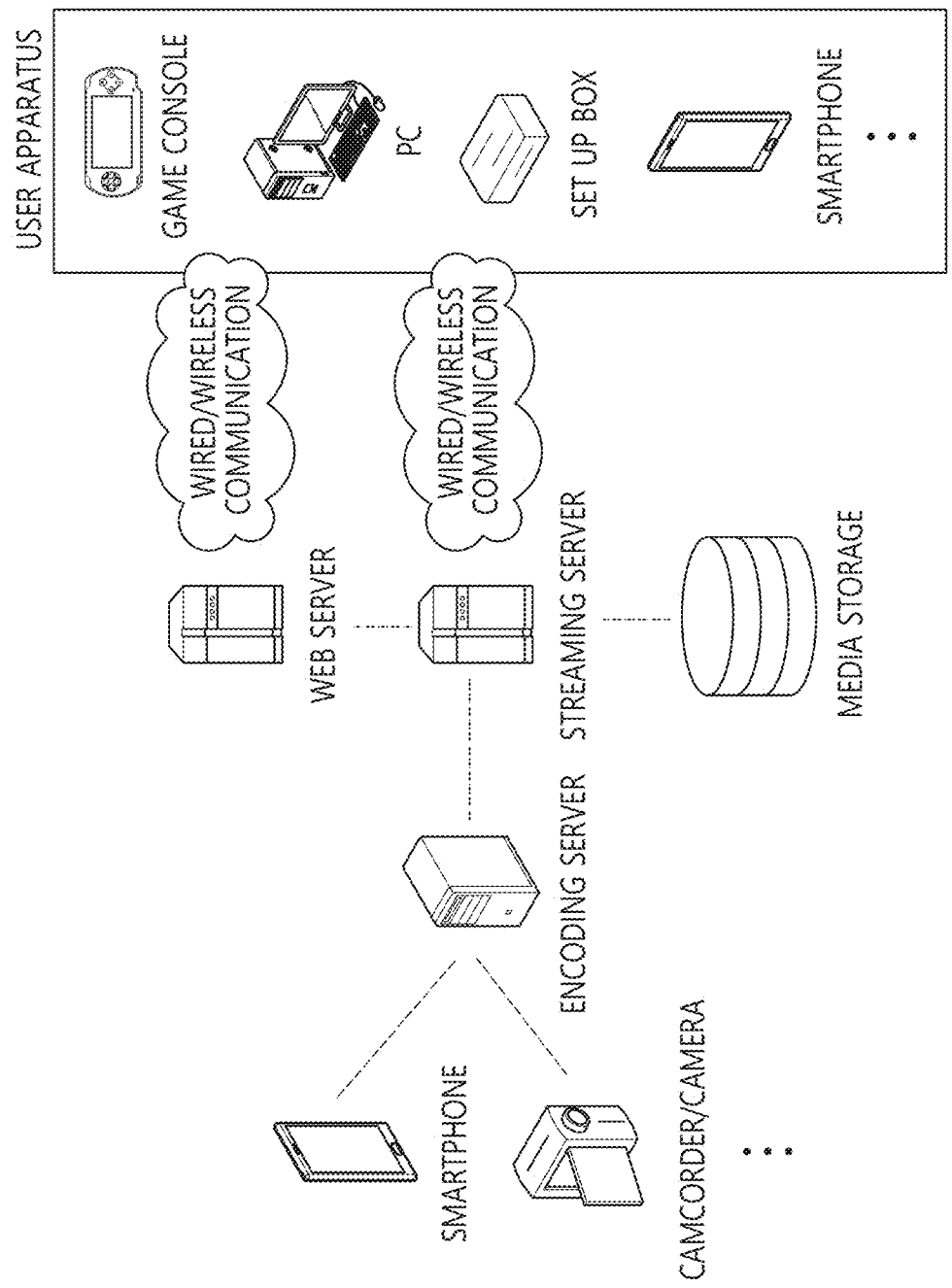
FIG. 14 illustrates an example of a content streaming system to which embodiments disclosed in this document may be applied.

FIG. 14 illustrates an example of a content streaming system to which embodiments disclosed in this document may be applied.

Referring to FIG. 14, the content streaming system to which embodiments of this document are applied may basically include an encoding server, a streaming server, a web server, a media repository, a user device and a multimedia input device.

The encoding server functions to generate a bitstream by compressing content received from multimedia input devices, such as a smartphone, a camera, and a camcorder, into digital data and to transmit the bitstream to the streaming server. For another server, if multimedia input devices, such as a smartphone, a camera, and a camcorder directly generate a bitstream, the encoding server may be omitted.

The bitstream may be generated by an encoding method or a bitstream generation method to which embodiments of this document are applied. The streaming server may temporally store a bitstream in a process of transmitting or receiving the bitstream.

The streaming server serves to transmit the multimedia data to the user device based on the user request through the web server, and the web server serves as a medium which informs the user of what services are available. When the user requests the desired service to the web server, the web server delivers the user's request to the streaming server, and the streaming server transmits the multimedia data to the user. At this time, the content streaming system may include a separate control server, and in this case, the control server serves to control commands/responses between the devices within the content streaming system.

The streaming server may receive the contents from the media storage and/or the encoding server. For example, when receiving the contents from the encoding server, the streaming server may receive the contents in real time. In this case, to provide the smooth streaming service, the streaming server may store the bitstream for a predetermined time.

Examples of the user device may include a portable phone, a smartphone, a laptop computer, a digital broadcast terminal, a personal digital assistants (PDA), a portable multimedia player (PMP), a navigation device, a slate PC, a tablet PC, an ultrabook, a wearable device (e.g., a smart watch, a smart glass, a head-mounted display (HMID)), digital TV, a desktop computer, a digital signage, or the like.

The servers within the content streaming system may be operated by a distribution server. In this case, data received by each server may be distributed and processed.

The claims described in this specification may be combined in various ways. For example, technical characteristics of a method claim in this specification may be combined and implemented as an apparatus. Technical characteristics of an apparatus claim in this specification may be combined and implemented as a method. Furthermore, a technical characteristic of a method claim and a technical characteristic of an apparatus claim in this specification may be combined and implemented as an apparatus. A technical characteristic of a method claim and a technical characteristic of an apparatus claim in this specification may be combined and implemented as a method.

What is claimed is:

1. A decoding apparatus for image decoding, the decoding apparatus comprising:
   a memory; and
   at least one processor connected to the memory, the at least one processor configured to:
   receive image information comprising inter prediction mode information through a bitstream;
   generate a merge candidate list of a current block based on the inter prediction mode information;
   select a candidate among candidates included in the merge candidate list;
   derive motion information of the current block based on the selected candidate;
   generate L0 prediction samples and L1 prediction samples based on the derived motion information; and
   generate prediction samples of the current block based on the L0 prediction samples, the L1 prediction samples and weight information, wherein the weight information is derived based on weight index information for the selected candidate,
   wherein the candidates include an inherited affine merge candidate and a constructed affine merge candidate,
   wherein the inherited affine merge candidate is derived based on control point motion vectors (CPMVs) of a neighboring block of the current block,
   wherein the constructed affine merge candidate includes CPMVs of control points (CPs),
   wherein based on the constructed affine merge candidate including a CPMV for a CP0 and a bi-prediction being applied to the current block, weight index information for the constructed affine merge candidate is fixed to be equal to weight index information of a specific block among neighboring blocks of the CP0 of the current block, wherein the CP0 is related to a top-left corner of the current block,
   wherein the specific block is a block used for deriving the CPMV for the CP0, and
   wherein the constructed affine merge candidate is inserted after the inherited affine merge candidate in the merge candidate list.

2. The decoding apparatus of claim 1, wherein the neighboring blocks include a top-left corner neighboring block of the current block, a left neighboring block adjacent to a bottom side of the top-left corner neighboring block, and a top neighboring block adjacent to a right side of the top-left corner neighboring block.

3. The decoding apparatus of claim 1, wherein:
   the candidates include a pair-wise candidate,
   the pair-wise candidate is derived based on different two candidates of the candidates, and
   weight index information for the pair-wise candidate is derived based on weight index information of one of the two candidates.

4. The decoding apparatus of claim 1, wherein:
   the candidates include a sub-block-based temporal merge candidate, and
   weight index information for the sub-block-based temporal merge candidate is derived based on weight index information of a left neighboring block of the current block.

5. The decoding apparatus of claim 1, wherein:
   the candidates include a sub-block-based temporal merge candidate, and
   weight index information for the sub-block-based temporal merge candidate is derived as 0.

6. The decoding apparatus of claim 1, wherein:
   the candidates include a sub-block-based temporal merge candidate,
   weight index information for the sub-block-based temporal merge candidate is derived based on weight index information of a center block within a col block,
   the col block includes a collocated block of the current block within a reference picture different from a current picture where the current block is located, and
   the center block is a bottom-right sub-block among four sub-blocks located at a center of the col block.

7. The decoding apparatus of claim 1, wherein:
   the candidates include a sub-block-based temporal merge candidate,
   weight index information for the sub-block-based temporal merge candidate is derived based on weight index information of each of sub-blocks of a col block, and
   the col block includes a collocated block of the current block within a reference picture different from a current picture where the current block is located.

8. An encoding apparatus for image encoding, the encoding apparatus comprising:
   a memory; and
   at least one processor connected to the memory, the at least one processor configured to:
   determine an inter prediction mode of a current block and generate inter prediction mode information indicating the inter prediction mode;
   generate a merge candidate list of the current block based on the inter prediction mode;
   select one of candidates included in the merge candidate list and generate selection information indicating the selected candidate; and
   encode image information comprising the inter prediction mode information and the selection information,
   wherein the candidates include an inherited affine merge candidate and a constructed affine merge candidate,
   wherein the constructed affine merge candidate includes control point motion vectors (CPMVs),
   wherein the inherited affine merge candidate is derived based on control point motion vectors (CPMVs) of a neighboring block of the current block,
   wherein the constructed affine merge candidate includes CPMVs of control points (CPs), wherein based on the constructed affine merge candidate including a CPMV for a CP0 and a bi-prediction being applied to the current block, weight index information for the constructed affine merge candidate is fixed to be equal to weight index information of a specific block among neighboring blocks of the CP0 of the current block, wherein the CP0 is related to a top-left corner of the current block, wherein the specific block is a block used for deriving the CPMV for the CP0, and wherein the constructed affine merge candidate is inserted after the inherited affine merge candidate in the merge candidate list.

9. An apparatus for transmitting data for an image, the apparatus comprising:

at least one processor configured to obtain a bitstream of image information including residual information, wherein the bitstream is generated by performing determining an inter prediction mode of a current block and generating inter prediction mode information indicating the inter prediction mode, generating a merge candidate list of the current block based on the inter prediction mode, selecting one of candidates included in the merge candidate list and generating selection information indicating the selected candidate, and encoding image information comprising the inter prediction mode information and the selection information; and a transmitter configured to transmit the data comprising the bitstream, wherein the candidates include an inherited affine merge candidate and a constructed affine merge candidate, wherein the constructed affine merge candidate includes control point motion vectors (CPMVs), wherein the inherited affine merge candidate is derived based on control point motion vectors (CPMVs) of a neighboring block of the current block, wherein the constructed affine merge candidate includes CPMVs of control points (CPs), wherein based on the constructed affine merge candidate including a CPMV for a CP0 and a bi-prediction being applied to the current block, weight index information for the constructed affine merge candidate is fixed to be equal to weight index information of a specific block among neighboring blocks of the CP0 of the current block, wherein the CP0 is related to a top-left corner of the current block, wherein the specific block is a block used for deriving the CPMV for the CP0, and wherein the constructed affine merge candidate is inserted after the inherited affine merge candidate in the merge candidate list.

* * * * *